United States Patent
Hamada et al.

(10) Patent No.: US 8,139,926 B2
(45) Date of Patent: Mar. 20, 2012

(54) REPRODUCTION APPARATUS, REPRODUCTION METHOD, REPRODUCTION PROGRAM, RECORD MEDIUM, AND DATA STRUCTURE

(75) Inventors: Toshiya Hamada, Saitama (JP); Yasushi Fujinami, Tokyo (JP); Tatsuya Kakumu, Tokyo (JP); Koji Ihara, Chiba (JP); Shusuke Utsumi, Tokyo (JP); Akihiko Ueda, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1233 days.

(21) Appl. No.: 11/289,272

(22) Filed: Nov. 30, 2005

(65) Prior Publication Data

US 2006/0158969 A1 Jul. 20, 2006

(30) Foreign Application Priority Data

Dec. 2, 2004 (JP) ................................. 2004-350192

(51) Int. Cl.
- *H04N 5/84* (2006.01)
- *G06F 9/34* (2006.01)
- *G06F 13/00* (2006.01)
- *G06F 15/16* (2006.01)
- *G06F 21/00* (2006.01)
- *G11B 7/24* (2006.01)
- *G11B 19/04* (2006.01)
- *G11B 21/08* (2006.01)

(52) U.S. Cl. .................. 386/334; 369/30.04; 369/30.09; 369/30.28; 369/53.21; 369/275.3; 705/58; 709/201; 711/154; 711/170; 711/205

(58) Field of Classification Search .................. 386/126, 386/E9.036, E9.013; 369/30.09, 30.28, 30.04, 369/53.21, 275.3; 375/E7.019; 705/58; 709/201; 711/154, 170, 205; 348/E5.105, 348/E5.108, E5.112

See application file for complete search history.

(56) References Cited

U.S. PATENT DOCUMENTS

| | | | | |
|---|---|---|---|---|
| 5,691,972 A | * | 11/1997 | Tsuga et al. | 369/275.3 |
| 7,350,238 B2 | * | 3/2008 | Abe et al. | 726/29 |
| 7,533,224 B2 | * | 5/2009 | Takashima | 711/154 |
| 2001/0014906 A1 | * | 8/2001 | Yamada et al. | 709/201 |
| 2004/0120226 A1 | * | 6/2004 | Ryu | 369/30.09 |
| 2005/0050047 A1 | * | 3/2005 | Laronne et al. | 707/9 |
| 2006/0227973 A1 | * | 10/2006 | Takashima et al. | 380/277 |

FOREIGN PATENT DOCUMENTS

| | | |
|---|---|---|
| JP | 2002-135709 | 5/2002 |
| JP | 2004-5805 | 1/2004 |
| JP | 2004-304767 | 10/2004 |

* cited by examiner

*Primary Examiner* — Thai Tran
*Assistant Examiner* — Syed Hasan
(74) *Attorney, Agent, or Firm* — Oblon, Spivak, McClelland, Maier & Neustadt, L.L.P.

(57) ABSTRACT

A reproduction apparatus has a player section, a content reproduction section, an interface section. The player section has a read section reading data from the record medium on which the content data containing at least one of a video data stream and an audio data stream and a reproduction control program controlling the reproduction of the content data are recorded, an input section accepting an input from a user, and an output section outputting the reproduced content data. The content reproduction section reproduces the content data according to the reproduction control program. The interface section interfaces among the content reproduction section, the reproduction control program, and the player section. When a command representing an end of the reproduced content data is described in the reproduction control program, the reproduction control program supplies the command to the interface section and the interface section executes a process corresponding to the command.

9 Claims, 58 Drawing Sheets

Fig. 4

| STATE | DESCRIPTION |
|---|---|
| PLAY | REPRESENTS THAT PLAY LIST HAS BEEN SELECTED AND BEING REPRODUCED. PLAY STATE IS DEVIDED INTO SUB-STATES INCLUDING NORMAL REPRODUCTION, VARIABLE SPEED REPRODUCTIONS SUCH AS FAST FORWORD, REWIND, AND PAUSE. |
| STOP | REPRESENTS THAT PLAY LIST IS NOT BEING REPRODUCED. PLAY LIST HAS NOT BEEN SELECTED. |

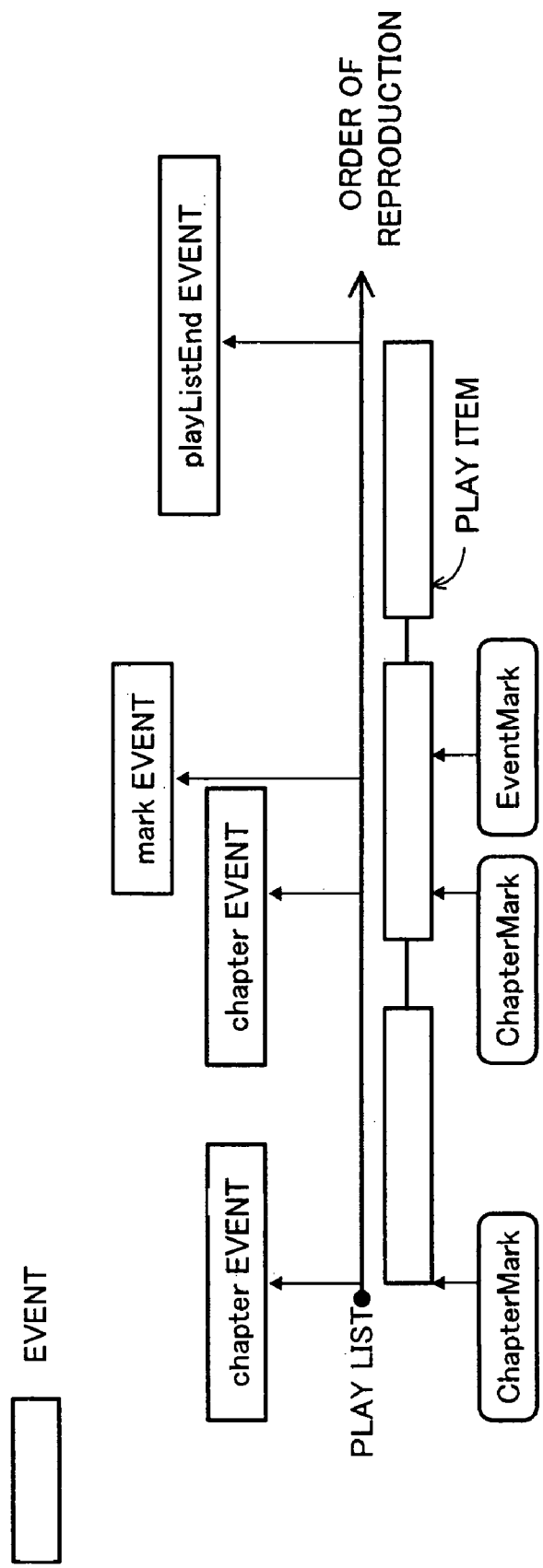

Fig. 7A  READ-ONLY PARAMETERS

| NAME | DESCRIPTION |
|---|---|
| scriptVersion | VERSION OF UMD VIDEO SCRIPT |
| audioChannelCapability | NUMBER OF AUDIO CHANNELS THAT UMD VIDEO PLAYER CAN REPRODUCE |
| languageCode | MENU DISPLAY LANGUAGE CODE THAT IS SET IN UMD VIDEO PLAYER |
| audioLanguageCode | AUDIO LANGUAGE CODE THAT IS SET IN UMD VIDEO PLAYER |
| subtitleLanguageCode | SUBTITLE LANGUAGE CODE THAT IS SET IN UMD VIDEO PLAYER |

Fig. 7B  PLAYER STATES

| NAME | DESCRIPTION |
|---|---|
| playListNumber | PLAY LIST NUMBER OF PLAY LIST THAT IS CURRENTLY BEING REPRODUCED |
| chapterNumber | CHAPTER NUMBER OF CHAPTER THAT IS CURRENTLY BEING REPRODUCED |
| videoNumber | VIDEO STREAM NUMBER OF VIDEO STREAM THAT IS CURRENTLY BEING REPRODUCED |
| audioNumber | AUDIO STREAM NUMBER OF AUDIO STREAM THAT IS CURRENTLY BEING REPRODUCED |
| subtitleNumber | SUBTITLE STREAM NUMBER OF SUBTITLE STREAM THAT IS CURRENTLY BEING REPRODUCED |
| playListTime | ELAPSED TIME AFTER PLAY LIST IS REPRODUCED WHEN BEGINNING OF PLAY LIST IS 0 |
| audioFlag | ON/OFF OF AUDIO REPRODUCTION AND DUAL MONAURAL L/R |
| subtitleFlag | ON/OFF OF SUBTITLE DISPLAY |

Fig. 8

| NAME | DESCRIPTION |
|---|---|
| play() | REPRODUCE VIDEO DATA |
| playChapter() | DESIGNATE CHAPTER AND REPRODUCE VIDEO DATA FROM DESIGNATED CHAPTER |
| resume() | START REPRODUCTION WITH RESUME INFORMATION |
| stop() | STOP REPRODUCTION |
| pause() | PAUSE REPRODUCTION |
| playStep() | REPRODUCE VIDEO DATA FRAME BY FRAME |
| changeStream() | CHANGE EXISTING VIDEO STREAM, AUDIO STREAM, AND/OR SUBTITLE STREAM TO ANOTHER STREAM |
| getPlayerStatus() | OBTAIN PLAY STATE, STOP STATE, PAUSE STATE, OR THE LIKE OF MOVIE PLAYER |
| changeResumeInfo() | CHANGE CONTENTS OF RESUME INFORMATION |
| reset() | STOP REPRODUCTION AND CLEAR RESUME INFORMATION |
| setPos() | SET DISPLAY POSITION OF VIDEO DATA |
| getPos() | OBTAIN DISPLAY POSITION OF VIDEO DATA |
| setSize() | SET DISPLAY SIZE OF VIDEO DATA |
| getSize() | OBTAIN DISPLAY SIZE OF VIDEO DATA |

Fig. 9

| KEY NAME | DESCRIPTION |
| --- | --- |
| VK_PLAY | REPRODUCTION |
| VK_STOP | STOP |
| VK_PAUSE | PAUSE |
| VK_FAST_FORWARD | FAST FORWARD |
| VK_FAST_REVERSE | FAST REVERSE |
| VK_SLOW_FORWARD | SLOW (FORWARD) |
| VK_SLOW_REVERSE | SLOW (REVERSE) |
| VK_STEP_FORWARD | STEP REPRODUCTION (FORWARD) |
| VK_STEP_REVERSE | STEP REPRODUCTION (REVERSE) |
| VK_NEXT | NEXT |
| VK_PREVIOUS | PREVIOUS |
| VK_ANGLE | ANGLE CHANGE |
| VK_SUBTITLE | SUBTITLE CHANGE |
| VK_AUDIO | AUDIO CHANGE |
| VK_VIDEO_ASPECT | VIDEO ASPECT RATIO CHANGE |

Fig. 10

| KEY NAME | DESCRIPTION |
|---|---|
| VK_UP | UP |
| VK_DOWN | DOWN |
| VK_RIGHT | RIGHT |
| VK_LEFT | LEFT |
| VK_UP_RIGHT | UPPER RIGHT |
| VK_UP_LEFT | UPPER LEFT |
| VK_DOWN_RIGHT | LOWER RIGHT |
| VK_DOWN_LEFT | LOWER LEFT |
| VK_MENU | MENU |
| VK_ENTER | ENTER |
| VK_RETURN | RETURN |
| VK_COLORED_KEY_1 | COLORED FUNCTION KEY 1 |
| VK_COLORED_KEY_2 | COLORED FUNCTION KEY 2 |
| VK_COLORED_KEY_3 | COLORED FUNCTION KEY 3 |
| VK_COLORED_KEY_4 | COLORED FUNCTION KEY 4 |
| VK_COLORED_KEY_5 | COLORED FUNCTION KEY 5 |
| VK_COLORED_KEY_6 | COLORED FUNCTION KEY 6 |

Fig. 11A

| Fig. 11 |
|---|
| Fig. 11A |
| Fig. 11B |
| Fig. 11C |

| CONTROL COMMAND ACCORDING TO USER'S OPERATION | DESCRIPTION |
|---|---|
| uo_timeSearch(playListTime) | START REPRODUCTION FROM DESIGNATED TIME OF PLAY LIST THAT IS BEING REPRODUCED. playListTime REPRESENTS TIME OF PLAY LIST WHEN BEGINNING IS 0. THIS COMMAND DOES NOT DESIGNATE PLAY LIST NUMBER. THUS, TIME IS DESIGNATED IN RANGE OF PLAY LIST THAT IS BEING REPRODUCED. |
| uo_play() | START REPRODUCTION AT FORWARD 1X SPEED. START POSITION IS DECIDED WITH RESUME INFORMATION. WHITHOUT RESUME INFORMATION, USER'S OPERATION IS INVALIDATED. THIS COMMAND CORRESPONDS TO METHOD play() WITHOUT playListNumber. playListNumber IS NOT DESIGNATABLE BY USER'S OPERATION. |
| uo_playChapter(chapterNumber) | START REPRODUCTION FROM DESIGNATED CHAPTER IN PLAY LIST THAT IS BEING REPRODUCED. WITHOUT CHAPTER, THIS COMMAND STARTS REPRODUCTION FROM BEGINNING OF CHAPTER THAT IS BEING REPRODUCED. THIS COMMAND CORRESPONDS TO METHOD playChapter() WITHOUTchapterNumber. |

Fig. 11B

| | |
|---|---|
| uo_playPrevChapter() | START REPRODUCTION FROM BEGINNING OF IMMEDIATELY PRECEDING CHAPTER. |
| uo_playNextChapter() | START REPRODUCTION FROM BEGINNING OF IMMEDIATELY FOLLOWING CHAPTER. |
| uo_jumpToEnd() | JUMP TO END OF PLAY LIST. THIS COMMAND CORRESPONDS TO USER'S OPERATION THAT CAUSES MOVIE PLAYER TO STOP REPRODUCTION AND GENERATE playListEnd EVENT. SCRIPT PROGRAM EXECUTES onPlayListEnd EVENT HANDLER. |
| uo_forwardScan(speed) | START FORWARD REPRODUCTION AT SPEED DESIGNATED BY speed. speed DEPENDS ON IMPLEMENTATION OF UMD VIDEO PLAYER. |
| uo_backwardScan(speed) | START BACKWARD REPRODUCTION AT SPEED DESIGNATED BY speed. speed DEPENDS ON IMPLEMENTATION OF UMD VIDEO PLAYER. |

Fig. 11C

| | |
|---|---|
| uo_playStep(forward) | START STEP FORWARD REPRODUCTION. |
| uo_playStep(backward) | STARD STEP BACKWARD REPRODUCTION. |
| uo_pauseOn() | PAUSE REPRODUCTION. |
| uo_pauseOff() | CANCEL PAUSE STATE. |
| uo_setAudioEnabled(boolean) | TURN ON/OFF AUDIO STREAM. audioFlag IS CHANGED. |
| uo_setSubtitleEnabled(boolean) | TURN ON/OFF SUBTITLE STREAM. subtitleFlag IS CHANGED. |
| uo_angleChange() | CHANGE DISPLAY ANGLE. WHEN MOVIE PLAYER IS INFORMED OF USER'S OPERATION, MOVIE PLAYER INFORMS SCRIPT PROGRAM OF angleChange EVENT. |
| uo_audioChange(audioStreamNumber) | CHANGE AUDIO STREAM TO BE REPRODUCED TO ANOTHER AUDIO STREAM. |
| uo_changeAudioChannel(value) | CHANGE NUMBER OF AUDIO CHANNELS. CHANGE EXISTING CHANNEL TO ANOTHER CHANNEL IN DUAL MONO MODE. audioFlag NEEDS TO BE ACCORDINGLY CHANGED. |
| uo_subtitleChange(subtitleStreamNumber) | CHANGE SUBTITLE STREAM TO BE REPRODUCED TO ANOTHER SUBTITLE STREAM. |

Fig. 12

| EVENT | DESCRIPTION |
|---|---|
| menu | JUMP TO MENU |
| exit | EVENT THAT NATIVE PLATFORM ISSUES WHEN NATIVE IMPLEMENTATION PLATFORM COMPLETES UMD VIDEO APPLICATION. |
| resourceChanged | EVENT OF WHICH SCRIPT LAYER IS INFORMED WHEN EXISTING RESOURCE FILE IS CHANGED TO ANOTHER RESOURCE FILE. |
| up,down,left,right focusIn, focusOut, push, cancel | EVENTS THAT OCCUR WHILE BUTTON DISPLAYED ON SCREEN IS FOCUSED. |
| autoPlay, continuePlay | EVENTS THAT CAUSE SCRIPT TO START EXECUTION. |

Fig. 13

| EVENT NAME | EVENT HANDLER NAME CORRESPONDING TO EVENT NAME | DESCRIPTION |
|---|---|---|
| mark | onMark() | EXECUTED WHEN EVENT-MARK IS DETECTED. |
| playListEnd | onPlayListEnd() | EXECUTED WHEN REPRODUCTION OF PLAY LIST IS COMPLETED. |
| chapter | onChapter() | EXECUTED WHEN CHAPTER-MARK IS DETECTED. |
| angleChange | onAngleChange() | EXECUTED WHEN ANGLE CHANGE IS DESIGNATED BY USER'S OPERATION. |
| audioChange | onAudioChange() | EXECUTED WHEN AUDIO CHANGE IS DESIGNATED BY USER'S OPERATION. |
| subtitleChange | onSubtitleChange() | EXECUTED WHEN SUBTITLE CHANGE IS DESIGNATED BY USER'S OPERATION. |

Fig. 14

| EVENT NAME | EVENT HANDLER NAME CORRESPONDING TO EVENT NAME | DESCRIPTION |
|---|---|---|
| menu | onMenu() | JUMP TO MENU. |
| exit | onExit() | EVENT THAT NATIVE IMPLEMENTATION PLATFORM ISSUES WHEN IT COMPLETES UMD VIDEO APPLICATION. |
| resourceChanged | onResourceChanged() | DESCRIBE PROCESS PERFORMED AFTER EXISTING RESOURCE FILE IS CHANGED TO ANOTHER RESOURCE FILE. |
| autoPlay, continuePlay | onAutoPlay(), onContinuePlay() | CAUSES SCRIPT TO START EXECUTION. |

Fig. 17

```
Controller.onAutoPlay = function(){
    //Play PlayList # 1 FBI warning.
    movieplayer.play(1);
} movieplayer.onPlayListEnd = function(event_info){
    if(event_info.playListNumber == 1){
        // play feature film after FBI warning ends.
        movieplayer.play(2);
    }else{
        // transit to top menu after feature film ends.
        resource.pagetable["top_menu"].open();
    }
}

Controller.onMenu = function(){
    // transfer to top menu with display menu user operation.

resource.pagetable["top_menu"].open();
} movieplayer.onMark = function(event_info){
    //display dialog when event mark encountered.
    if(event_info.mark_data == 1){
        resource.pagetable["dialog_window_1"].open();
    }
    ...
}
```

Fig. 19

| SYNTAX | NO. OF BITS | MNEMONIC |
|---|---|---|
| "PLAYLIST.DAT" { | | |
|    name_length | 8 | uimsbf |
|    name_string | 8*255 | bslbf |
|    number_of_PlayLists | 16 | uimsbf |
|    for(i=0; i<number_of_PlayLists; i++){ | | |
|      PlayList(){ // A PlayList() | | |
|        PlayList_data_length | 32 | uimsbf |
|        // ATTRIBUTE INFORMATION | | |
|        reserved_for_word_alignment | 15 | bslbf |
|        capture_enable_flag_PlayList | 1 | bslbf |
|        PlayList_name_length | 8 | uimsbf |
|        PlayList_name_string | 8*255 | bslbf |
|        // | | |
|        number_of_PlayItems | 16 | uimsbf |
|        for (i=0; i<number_of_PlayItems; i++) { | | |
|          PlayItem() | | |
|        } | | |
|        PlayListMark() | | |
|      } | | |
|    } | | |
| } | | |

*Fig. 20*

| SYNTAX | NO. OF BITS | MNEMONIC |
|---|---|---|
| PlayItem() { | | |
| length | 16 | uimsbf |
| Clip_Information_file_name_length | 16 | uimsbf |
| Clip_Information_file_name | 8*Clip_Information_file_name_length | bslbf |
| reserved_for_word_alignment | 15 | bslbf |
| IN_time | 33 | uimsbf |
| reserved_for_word_alignment | 15 | bslbf |
| OUT_time | 33 | uimsbf |
| } | | |

Fig. 21

| SYNTAX | NO. OF BITS | MNEMONIC |
|---|---|---|
| PlayListMark() { | | |
|     length | 32 | uimsbf |
|     number_of_PlayList_marks | 16 | uimsbf |
|     for(i=0; i < number_of_PlayList_marks; i++) { | | |
|         Mark(){ | | |
|             mark_type | 8 | uimsbf |
|             mark_name_length | 8 | uimsbf |
|             ref_to_PlayItem_id | 16 | uimsbf |
|             reserved_for_word_alignment | 15 | bslbf |
|             mark_time_stamp | 33 | uimsbf |
|             entry_ES_stream_id | 8 | uimsbf |
|             entry_ES_private_stream_id | 8 | uimsbf |
|             mark_data | 32 | bslbf |
|             mark_name_string | 8*24 | bslbf |
|         } | | |
|     } | | |
| } | | |

*Fig. 22*

| mark_type | STREAM CODING |
|---|---|
| 0 | RESERVED |
| 1 | CHAPTER MARK |
| 2 | EVENT MARK |
| 3-255 | RESERVED |

Fig. 24

| SYNTAX | NO. OF BITS | MNEMONIC |
|---|---|---|
| XXXXX.CLP{ | | |
|     reserved_for_word_alignment | 15 | bslbf |
|     presentation_start_time | 33 | uimsbf |
|     reserved_for_word_alignment | 15 | bslbf |
|     presentation_end_time | 33 | uimsbf |
|     reserved_for_word_alignment | 7 | bslbf |
|     capture_enable_flag_Clip | 1 | bslbf |
|     number_of_streams | 8 | uimsbf |
|     for (i = 0;i < number_of_streams;i++) { | | |
|         StreamInfo(){ | | |
|             length | 16 | uimsbf |
|             stream_id | 8 | uimsbf |
|             private_stream_id | 8 | uimsbf |
|             StaticInfo() | | |
|             reserved_for_word_alignment | 8 | bslbf |
|             number_of_DynamicInfo | 8 | uimsbf |
|             for (j = 0;j < number_of_DynamicInfo;j++) { | | |
|                 reserved_for_word_alignment | 15 | bslbf |
|                 pts_change_point | 33 | uimsbf |
|                 DynamicInfo() | | |
|             } | | |
|         } //end of oneStreamInfo | | |
|     } | | |
|     EP_map() | | |
| } | | |

*Fig. 25*

| TYPE OF ELEMENTARY STREAM | stream_id | private_stream_id |
|---|---|---|
| VIDEO | 0xE0~0xEF | (NONE) |
| ATRAC AUDIO | 0xBD | 0x00~0x0F |
| LPCM AUDIO | 0xBD | 0x10~0x1F |
| SUBTITLE | 0xBD | 0x80~0x9F |

*Fig. 26*

| SYNTAX | NO. OF BITS | MNEMONIC |
|---|---|---|
| StaticInfo() { | | |
|     if (stream == VIDEO ) { | | |
|         reserved_for_word_alignment | 16 | bslbf |
|         picture_size | 4 | uimsbf |
|         frame_rate | 4 | uimsbf |
|         reserved_for_word_alignment | 7 | bslbf |
|         cc_flag | 1 | bslbf |
|     } else if (stream == AUDIO ) { | | |
|         audio_language_code | 16 | bslbf |
|         channel_configuration | 8 | uimsbf |
|         reserved_for_word_alignment | 3 | bslbf |
|         lfe_existence | 1 | bslbf |
|         sampling_frequency | 4 | uimsbf |
|     } else if (stream == SUBTITLE) { | | |
|         subtitle_language_code | 16 | bslbf |
|         reserved_for_word_alignment | 15 | bslbf |
|         configurable_flag | 1 | uimsbf |
|     } | | |
| } | | |

Fig. 27

| SYNTAX | NO. OF BITS | MNEMONIC |
|---|---|---|
| DynamicInfo(i,j) { | | |
|     reserved_for_word_alignment | 8 | bslbf |
|     if (stream == VIDEO){ | | |
|         reserved_for_word_alignment | 4 | bslbf |
|         display_aspect_ratio | 4 | uimsbf |
|     } else if (stream == AUDIO ) { | | |
|         reserved_for_word_alignment | 4 | bslbf |
|         channel_assignment | 4 | uimsbf |
|     } else if ( stream == SUBTITLE) { | | |
|         reserved_for_word_alignment | 8 | bslbf |
|     } | | |
| } | | |

Fig. 28

| SYNTAX | NO. OF BITS | MNEMONIC |
|---|---|---|
| EP_map(){ | | |
|     reserved_for_word_alignment | 8 | bslbf |
|     number_of_stream_id_entries | 8 | uimsbf |
|     for (k=0; k<number_of_stream_id_entries; k++) { | | |
|         stream_id | 8 | bslbf |
|         private_stream_id | 8 | bslbf |
|         number_of_EP_entries | 32 | uimsbf |
|         for (i=0; i<number_of_EP_entries; i++) { | | |
|             reserved_for_word_align | 15 | bslbf |
|             PTS_EP_start | 33 | uimsbf |
|             RPN_EP_start | 32 | uimsbf |
|         } | | |
|     } | | |
| } | | |

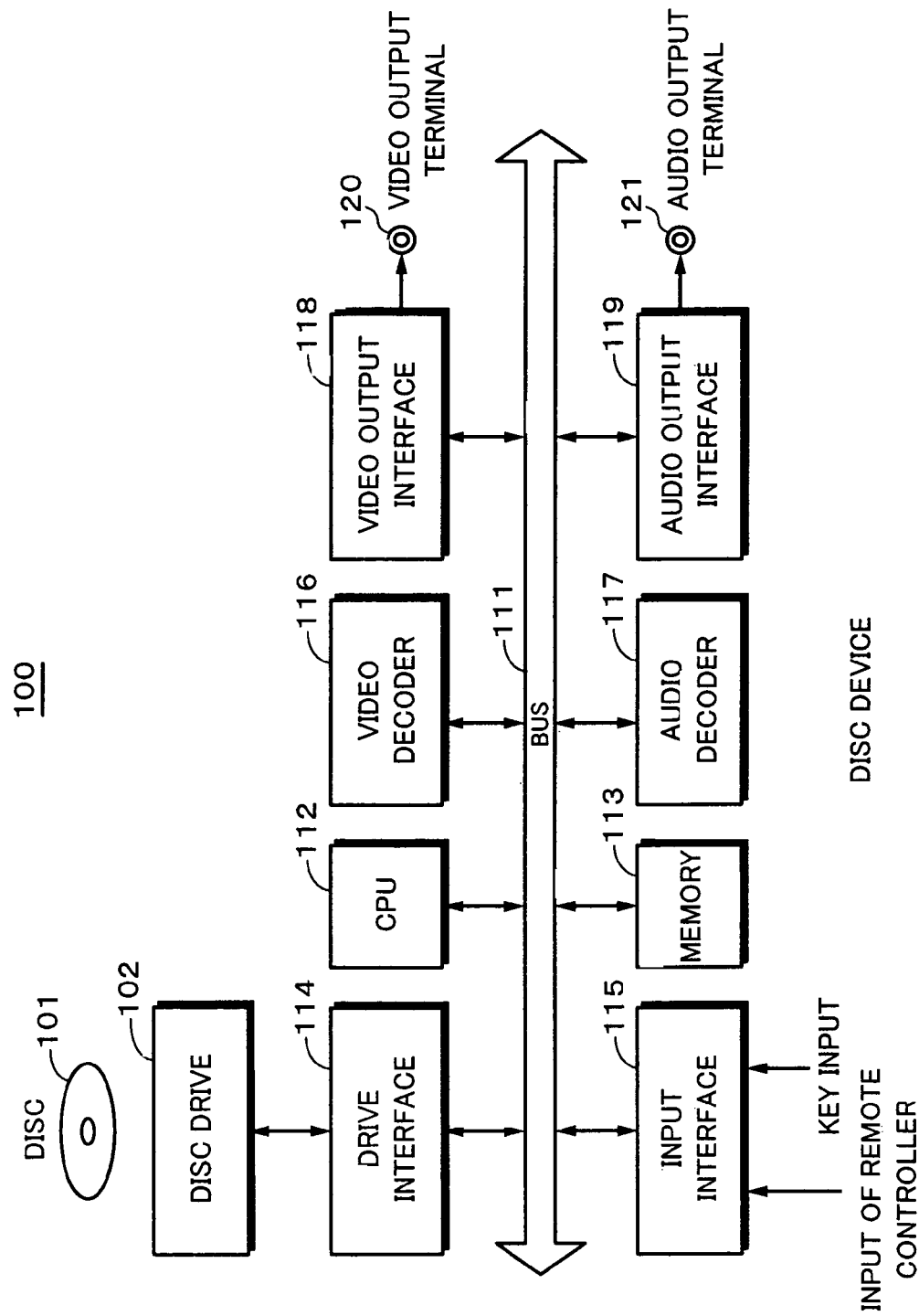

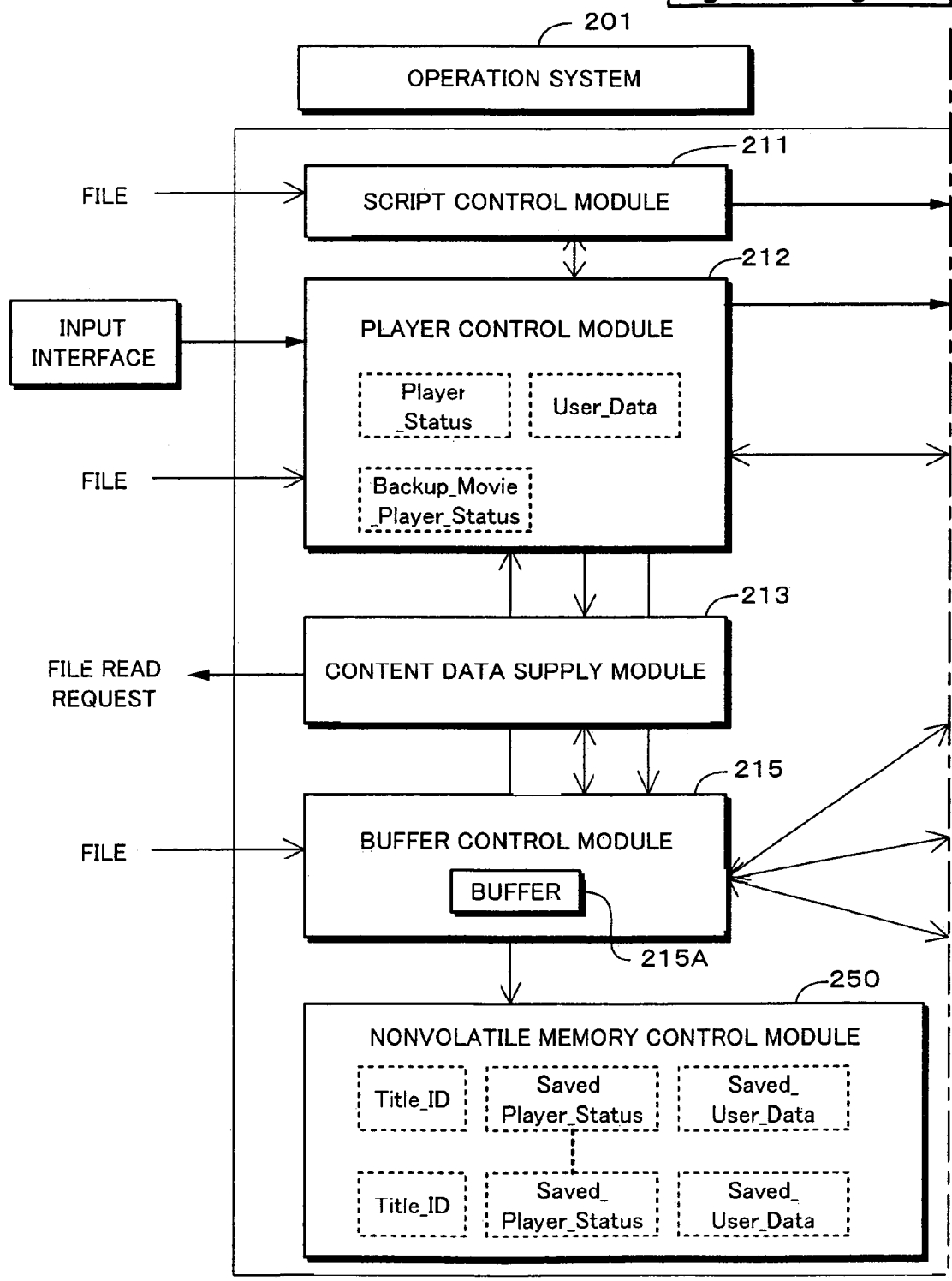

Fig. 32

| EXISTING STATE | | STATE AFTER EXECUTION OF METHOD | | | |
| --- | --- | --- | --- | --- | --- |
| | | NEMU | NORMAL | NEMU | NORMAL |
| | | STOP | STOP | PLAY | PLAY |
| MENU | STOP | stop(), resume() | stop() | play() | play(), resume() |
| NORMAL | STOP | stop() | stop(), resume() | play() | play(), resume() |
| NEMU | PLAY | stop() | stop() | play(), resume() | play(), resume() |
| MORMAL | PLAY | stop() | stop() | play() | play(), resume() |

*Fig. 35*

| REPRODUCTION METHOD OF PLAY LIST | OPERATIONS AT BEGINNING AND END OF PLAY LIST |
|---|---|
| FORWARD DIRECTION | WHEN PLAY LIST COMES TO END, PLAYER PAUSES AND CONTINUES TO DISPLAY LAST PICTURE OF PLAY LIST. (IN HIGH SPEED REPRODUCTION MODE, PLAYER DISPLAYS LAST PICTURE OF PLAY LIST EVEN IF LAST PICTURE OF PLAY LIST IS NOT JUMP POINT.) |
| REVERSE DIRECTION | WHEN PLAY LIST COMES TO END, PLAYER PAUSES AT BEGINNING OF PLAY LIST. |

Fig. 40

| EXISTING STATE | | STATE AFTER EXECUTION OF METHOD | | | | | |
|---|---|---|---|---|---|---|---|
| | | MENU | NORMAL | NORMAL | MENU | MENU | NORMAL |
| | | STOP | STOP | STOP | PLAY | PLAY | PLAY |
| MENU | STOP | – | – | – | – | – | – |
| NORMAL | STOP | – | – | – | – | – | – |
| MENU | PLAY | STATE CHANGE WITH stop(), BACKUP | STATE CHANGE WITH stop(), BACKUP | – | – | – | – |
| NORMAL | PLAY | – | STATE CHANGE WITH stop(), BACKUP | – | STATE CHANGE WITH play(), BACKUP | – | – |

Fig. 42

| EXISTING STATE | | STATE AFTER EXECUTION OF METHOD | | | |
|---|---|---|---|---|---|
| | | NEMU | NORMAL | NEMU | NORMAL |
| | | STOP | STOP | PLAY | PLAY |
| MENU | STOP | — | — | — | STATE CHANGE, RESTORATION, AND DISCARD WITH EXECUTION OF resume() |
| NORMAL | STOP | — | — | — | STATE CHANGE, RESTORATION, AND DISCARD WITH EXECUTION OF resume() |
| MENU | PLAY | — | — | — | STATE CHANGE, RESTORATION, AND DISCARD WITH EXECUTION OF resume() |
| NORMAL | PLAY | — | — | — | (NOT DEFINED) |

Fig. 43

| EXISTING STATE | | STATE AFTER EXECUTION OF METHOD | | | |
|---|---|---|---|---|---|
| | | MENU STOP | NORMAL STOP | MENU PLAY | NORMAL PLAY |
| MENU | STOP | – | – | – | PLAY |
| NORMAL | STOP | – | – | – | STATE CHANGE AND DISCARD WITH EXECUTION OF PLAY |
| MENU | PLAY | – | – | – | STATE CHANGE AND DISCARD WITH EXECUTION OF PLAY |
| NORMAL | PLAY | – | – | – | STATE CHANGE AND DISCARD WITH EXECUTION OF PLAY |
| | | | | | (NOT DEFINED) |

*Fig. 44*

| EXISTING STATE | | STATE AFTER EXECUTION OF METHOD | | | |
|---|---|---|---|---|---|
| | | MENU | NORMAL | MENU | NORMAL |
| | | STOP | STOP | PLAY | PLAY |
| MENU | STOP | DISCARD WITH resumeInfoClearFlag=True | DISCARD WITH resumeInfoClearFlag=True | – | – |
| NORMAL | STOP | DISCARD WITH resumeInfoClearFlag=True | DISCARD WITH resumeInfoClearFlag=True | – | – |
| MENU | PLAY | DISCARD WITH resumeInfoClearFlag=True | DISCARD WITH resumeInfoClearFlag=True | – | – |
| NORMAL | PLAY | DISCARD WITH resumeInfoClearFlag=True | DISCARD WITH resumeInfoClearFlag=True | – | – |

Fig. 46

| PLYER STATE | DESCRIPTION |
|---|---|
| GENERATION | WHEN MOVIE PLAYER IS GENERATED, PLAYER STATE IS ALSO GENERATED. WHEN MOVIE PLAYER IS GENERATED, PLAYER STATE IS INITIALIZED. PROPERTY THAT REPRESENTS STATE OF MOVIE PLAYER REPRESENTS STOP STATE. OTHER PROPERTIES ARE INDEFINITE. |
| CHANGE OF VALUE | (1) AS REPRODUCTION STATE CHANGES, CONTENTS OF PLAYER STATE CHANGE.<br>(2) CONTENTS OF RESUME INFORMATION ARE RESTORED. |
| LOAD OF VALUE WITH METHOD | VALUE CAN BE LOADED WITH METHOD getPlayerStatus() |
| ELIMINATION | MOVIE PLAYER IS COMPLETED (ELIMINATED) |

Fig. 47A

| Fig. 47 |
|---|
| Fig. 47A |
| Fig. 47B |

| STATE OF RESUME INFORMATION | DESCRIPTION |
|---|---|
| GENERATION | WHEN MOVIE PLAYER OBJECT IS GENERATED, MEMORY AREA FOR RESUME INFORMATION IS ALLOCATED. WHEN MOVIE PLAYER IS GENERATED, RESUME INFORMATION IS INITIALIZED. WHEN RESUME INFORMATION IS INITIALIZED, CONTENTS OF RESUME INFORMATION ARE DISCARDED. WHEN MOVIE PLAYER IS INITIALIZED, UMD VIDEO PLAYER ACCOMMODATING NONVOLATILE MEMORY LOADS RESUME INFORMATION FROM NONVOLATILE MEMORY. AT THIS POINT, UMD VIDEO PLAYER LOADS USER DATA FROM NONVOLATILE MEMORY. |
| BUCKUP (BACKUP OF PLAYER STATE) | WHEN MOVIE PLAYER CHANGES EXISTING STATE, STATE [NORMAL, PLAY] TO ANOTHER STATE, PLAYER STATE IS BACKED UP TO RESUME INFORMATION. |
| CHANGE | PARAMETERS WITH RESPECT TO STREAM, videoNumber,audioNumber,audioFlag, subtitleNumber, AND subtitleFlag CAN BE CHANGED WITH changeResumeInfo(). |
| DISCARD (NO.1) | WHEN REPRODUCTION OF PLAY LIST IS STARTED IN NORMAL MODE, CONTENTS OF RESUME INFORMATION ARE DISCARDED. BEFORE DISCARDING, RESUME INFORMATION MAY BE OR MEY NOT BE RESTORED. |

Fig. 47B

| | |
|---|---|
| DISCARD (NO.2) | WHEN METHOD stop() WITH resumeInfoClearFlag=True IS EXECUTED, CONTENES OF RESUME INFORMATION ARE DISCARDED. |
| RESTORATION OF PLAYER STATE | WHEN RESUME INFORMATION IS STORED, WITH METHOD resume(), PLAYER STATE IS RESTORED. |
| LOAD OF VALUE WITH METHOD | SCRIPT CAN LOAD VALUE WITH METHOD getResumeInfo(). WHEN RESUME INFORMATION THAT HAS BEEN DISCORDED IS READ, playStatus BECOMES 0. THUS, IT CAN BE DETERMINED WHETHER RESUME INFORMATION IS STORED. |
| ELIMINATION | WHEN MOVIE PLAYER IS COMPLETED (ELIMINATED), RESUME INFORMATION IS ALSO ELIMINATED. WHEN MOVIE PLAYER IS COMPLETED (ELIMINATED), UMD VIDEO PLAYER ACCOMMODATING NONVOLATILE MEMORY SAVES RESUME INFORMATION TO NONVOLATILE MEMORY. AT THIS POINT, UMD VIDEO PLAYER ALSO SAVE USER DATA TO NONVOLATILE MEMORY. |

Fig. 48

| STATE OF USER DATA | DESCRIPTION |
|---|---|
| GENERATION | WHEN MOVIE PLAYER OBJECT IS GENERATED, MEMORY AREA FOR USER DATA IS ALLOCATED. WHEN MOVIE PLAYER IS GENERATED, USER DATA ARE INITIALIZED. WHEN USER DATA ARE INITIALIZED, CONTENTS OF USER DATA ARE CLEARED (ARRAY HAVING LENGTH OF 0 IS RETURNED WITH getUserData()). WHEN MOVIE PLAYER IS INITIALIZED, UMD VIDEO PLAYER ACCOMMODATING NONVOLATILE MEMORY LOADS USER DATA FROM NONVOLATILE MEMORY. AT THIS POINT, UMD VIDEO PLAYER ALSO LOADS RESUME INFORMATION FROM NONVOLATILE MEMORY. |
| BACKUP | WHEN METHOD setUserData() IS EXECUTED, USER DATA ARE BACKED UP. WITH METHOD setUserData(), INTEGER TYPE ARRAY HAVING LENGTH OF 64 (MAXIMUM) IS BACKED UP TO USER DATA AREA. |
| LOAD | USER DATA CAN BE LOADED WITH METHOD getUserData(). WHEN USER DATA ARE STORED, ARRAY HAVING LENGTH OF 0 IS RETURNED. |
| CLEAR OF CONTENTS | SCRIPT DOES NOT HAVE METHOD THAT CLEARS CONTENTS OF USER DATA. WHEN USER DATA AREA IS OVERWRITTEN, CONTENTS OF USER DATA CAN BE CHANGED. |
| ELIMINATION | WHEN MOVIE PLAYER IS COMPLETED (ELIMINATED), USER DATA ARE ALSO ELIMINATED WHEN MOVIE PLAYER IS COMPLETED (ELIMINATED). UMD VIDEO PLAYER ACCOMMODATING NONVOLATILE MEMORY SAVES USER DATA TO NONVOLATILE MEMORY. AT THIS POINT, UMD VIDEO PLAYER ALSO SAVES RESUME INFORMATION TO NONVOLATILE MEMORY. |

| SYNTAX | Controller.end() |
|---|---|
| ARGUMENT | NONE |
| RETURN VALUE | BOOLEAN TYPE. RETURN VALUE THAT REPRESENTS WHETHER UMD VIDEO PLAYER COMPLETES OPERATION FOR CONTENT WITHOUT PLAYER'S UNIQUE OPERATION. RETURN VALUE "true" REPRESENTS THAT UMD VIDEO PLAYER DOES NOT EXECUTE PLAYER'S UNIQUE FUNCTION AFTER EXECUTION OF EVENT HANDLER. RETURN VALUE "false" REPRESENTS THAT UMD VIDEO PLAYER EXECUTES PLAYER'S UNIQUE FUNCTION AFTER EXECUTION OF EVENT HANDLER. |

REPRODUCTION APPARATUS, REPRODUCTION METHOD, REPRODUCTION PROGRAM, RECORD MEDIUM, AND DATA STRUCTURE

CROSS REFERENCES TO RELATED APPLICATIONS

The present invention contains subject matter related to Japanese Patent Application JP 2004-350192 filed in the Japanese Patent Office on Dec. 2, 2004, the entire contents of which being incorporated herein by reference.

BACKGROUND OF THE INVENTION

1. Field of the Invention

The present invention relates to a reproduction apparatus that allows the reproduction control for programs recorded on a large capacity record medium to be easily performed and to a reproduction method thereof, a reproduction program thereof, a record medium thereof, and a data structure thereof.

2. Description of the Related Art

So far, an interactive function that displays a menu screen and sub menu screens for various settings and buttons (button images) on the menu screens for user's data inputs and that executes a selected function has been accomplished for sell packages that are packages of which video data and audio data such as a movie, a drama, a music concert, or the like is recorded on a record medium such as a DVD.

Now, Compact Disc-Digital Audio (CD-DA) that is a typical example of such cell packages will be described. One CD-DA generally contains a plurality of tracks of music data. Each track is assigned a number. When a normal reproduction is performed, music data are successively reproduced in the ascending order of track numbers. After music data with the largest track number have been reproduced, the reproduction is stopped.

In addition to the normal reproduction operation, which reproduces music data in the order of track numbers, many CD player models have other reproduction functions such as a random reproduction, a shuffle reproduction, and a disc repeat reproduction that reproduce music data in the order of other than track numbers. The random reproduction is a function that randomly selects a track of music data from those recorded on a disc and reproduces the selected track of music data after the completion of the reproduction of a particular track of music data. The shuffle reproduction is a function that reproduces music data recorded on the disc irrespective of the order of track numbers and stops the reproduction after the completion of the reproduction of all tracks of music data recorded on the disc. In the normal reproduction, the disc repeat reproduction repeats the normal reproduction from the beginning track of music data after the completion of the reproduction of the last track of music data. In the shuffle reproduction, the disc repeat reproduction changes the reproduction order of track numbers and reproduces the music data in the changed order.

In the CD-DA, the arrangement of music data is designated by only track numbers. Thus, it is clear that the beginning of a content is the beginning of music data with track number #1 and the end of the content is the end of music data with the largest track number.

On the other hand, there is a system that performs a reproduction control for contents of video data and audio data recorded on a record medium according to commands or programs recorded thereon. For example, a plurality of contents such as a main part of a movie, a preview, a movie making scene, a menu, and so forth are recorded on a DVD-video disc. When the contents are reproduced from the disc, their reproductions are controlled according to the commands and programs. Patent Document 1 discloses a technology that performs a reproduction control for contents according to such commands and programs.

[Patent Document 1] Japanese Patent Application Laid-Open Publication No. 2004-304767

SUMMARY OF THE INVENTION

However, in such a system, which performs a reproduction control according to commands and programs, it was difficult for a player to detect an end of a content.

When an end credit portion of a movie is reproduced, it can be predicted that the content comes to the end. However, actually, the end of the end credit portion is not always the end of the content. For example, if a program that is executed upon the completion of the end credit portion causes a menu screen to appear, it can be thought that a pair of a menu screen and a main part of a movie is a content. Thus, it cannot be determined that the end of the main part of a movie be the end of the content. In addition, a reproduction control program may be thought of as a part of a content.

Thus, if a content contains a reproduction control program, it is very difficult to determine the end of the content. In other words, the "end of a content" depends on how the content creator recognizes the content. Thus, only the content creator knows the end of the content.

The DVD-video standard does not define a means that allows the content side to inform the player side that a particular part of a content is the "end of a content." Thus, it is difficult for the DVD player that reproduces data from a DVD-video disc to accomplish the player's unique functions.

For example, the player may not have the repeat function that repetitively reproduces a content. Instead, the player may repetitively reproduce only a single title (one sequential program chain) to directly and continuously reproduce a content from the beginning to the end. Thus, it was difficult to accomplish player's unique functions.

In view of the foregoing, it would be desirable to provide a reproduction apparatus that allows player's unique functions to be easily accomplished when the reproduction control for contents is performed according to a reproduction control program, a reproduction method thereof, a reproduction program thereof, a record medium thereof, and a data structure thereof.

According to an embodiment of the present invention, there is provided a reproduction apparatus that reproduces content data recorded on a record medium. The reproduction apparatus has a player section, a content reproduction section, an interface section The player section has a read section that reads data from the record medium on which the content data containing at least one of a video data stream and an audio data stream and a reproduction control program controlling the reproduction of the content data are recorded, an input section that accepts an input from a user, and an output section that outputs the content data that are reproduced. The content reproduction section reproduces the content data according to the reproduction control program. The interface section interfaces among the content reproduction section, the reproduction control program, and the player section When a command that represents an end of the content data that are reproduced is described in the reproduction control program, the reproduction control program supplies the command to the interface section and the interface section executes a process corresponding to the command.

According to an embodiment of the present invention, there is provided a reproduction method of reproducing content data from a record medium. The content data are reproduced from the record medium according to a reproduction control program that is read from the record medium on which the content data containing at least one of a video data stream and an audio data stream and the reproduction control program controlling the reproduction of the content data are recorded. The content reproduction step, the reproduction control program, and a player section having a read section that reads data from the record medium, an input section that accepts an input from a user, and an output section that outputs the content data that are reproduced are interfaced. When a command that represents an end of the content data that are reproduced is described in the reproduction control program, the reproduction control program supplies the command to the interface step and the interface step executes a process corresponding to the command.

According to an embodiment of the present invention, there is provided a reproduction program that causes a computer device to execute a reproduction method of reproducing content data from a record medium. The content data are reproduced from the record medium according to a reproduction control program that is read from the record medium on which the content data containing at least one of a video data stream and an audio data stream and the reproduction control program controlling the reproduction of the content data are recorded. The content reproduction step, the reproduction control program, and a player section having a read section that reads data from the record medium, an input section that accepts an input from a user, and an output section that outputs the content data that are reproduced are interfaced. When a command that represents an end of the content data that are reproduced is described in the reproduction control program, the reproduction control program supplies the command to the interface step and the interface step executes a process corresponding to the command.

According to an embodiment of the present invention, there is provided a record medium from which data are readable by a computer device and on which a reproduction program is recorded, the reproduction program causing the computer device to execute a reproduction method of reproducing content data from a record medium. The content data are reproduced from the record medium according to a reproduction control program that is read from the record medium on which the content data containing at least one of a video data stream and an audio data stream and the reproduction control program controlling the reproduction of the content data are recorded. The content reproduction step, the reproduction control program, and a player section having a read section that reads data from the record medium, an input section that accepts an input from a user, and an output section that outputs the content data that are reproduced are interfaced. When a command that represents an end of the content data that are reproduced is described in the reproduction control program, the reproduction control program supplies the command to the interface step and the interface step executes a process corresponding to the command.

According to an embodiment of the present invention, there is provided a record medium from which data are readable by a computer device and on which content data containing at least one of a video stream and an audio stream and a reproduction control program controlling the reproduction of the content data are recorded. The reproduction control program and the content data according to the reproduction control program are reproduced. A player section having a read section that reads data from the record medium, an input section that accepts an input from a user, and an output section that outputs the content data that are reproduced is interfaced. A command that represents an end of the reproduced content data is described to the interface step.

According to an embodiment of the present invention, there is provided a signal having a data structure of which content data containing at least one of a video stream and an audio stream and a reproduction control program controlling the reproduction of the content data are multiplexed, that is transmissible and receivable through a communication line, and that is processible by a computer device. The content data are reproduced according to the reproduction control program. A command that informs the computer device of an end of the content data is described in the content data, the command being read by the computer device while the computer device is reproducing the content data.

According to an embodiment of the present invention, the reproduction apparatus has a player section, a content reproduction section, an interface section. The player section has a read section configured to read data from the record medium on which the content data containing at least one of a video data stream and an audio data stream and a reproduction control program controlling the reproduction of the content data are recorded, an input section configured to accept an input from a user, and an output section configured to output the content data that are reproduced. The content reproduction section reproduces the content data according to the reproduction control program. The interface section interfaces among the content reproduction section, the reproduction control program, and the player section. When a command that represents an end of the content data that are reproduced is described in the reproduction control program, the reproduction control program supplies the command to the interface section and the interface section executes a process corresponding to the command. Thus, although the content data are reproduced according to the reproduction control program, when the player section is informed of an end of the content, the player section can perform a unique reproduction operation.

According to an embodiment of the present invention, the content data are reproduced from the record medium according to a reproduction control program that is read from the record medium on which the content data containing at least one of a video data stream and an audio data stream and the reproduction control program controlling the reproduction of the content data are recorded. The content reproduction step, the reproduction control program, and a player section having a read section configured to read data from the record medium, an input section configured to accept an input from a user, and an output section configured to output the content data that are reproduced are interfaced. When a command that represents an end of the content data that are reproduced is described in the reproduction control program, the reproduction control program supplies the command to the interface step and the interface step executes a process corresponding to the command. Thus, although the content data are reproduced according to the reproduction control program, when the player section is informed of an end of the content, the player section can perform a unique reproduction operation.

According to an embodiment of the present invention, a reproduction control program and content data according to the reproduction control program are reproduced from a record medium from which data are readable by a computer device and on which the content data containing at least one of a video stream and an audio stream and the reproduction control program controlling the reproduction of the content data are recorded. A player section having a read section configured to read data from the record medium, an input section configured to accept an input from a user, and an output section configured to output the content data that are reproduced is interfaced. A command that represents an end of the reproduced content data is described to the interface step. Thus, although the content data are reproduced according to the reproduction control program, when the player section is informed of an end of the content, in the computer device that reproduces data from the record medium, the player section can perform a unique reproduction operation.

According to an embodiment of the present invention, in a data structure, content data containing at least one of a video stream and an audio stream and a reproduction control program controlling the reproduction of the content data are multiplexed. The data structure is transmissible and receivable through a communication line. The data structure is processible by a computer device. The content data are reproduced according to the reproduction control program. A command that informs the computer device of an end of the content data is described in the content data, the command being read by the computer device while the computer device is reproducing the content data. Thus, although the content data are reproduced according to the reproduction control program, when the player section is informed of an end of the content, in the computer device that process data that has this data structure, the player section can perform a unique reproduction operation.

As described above, according to an embodiment of the present invention, a script program that performs a reproduction control for a content explicitly informs the player of an end of the content. Since the player receives the information that represents the end of the content, the player can easily accomplish a unique reproduction control function that is executed after the end of the content.

An operation of the player to be performed at an end of a content can be designated according to for example a setting of the player of whether the disc repeat function has been set and the state of the content of whether a menu screen is provided. Thus, an improper situation for example appearance of a black screen, which results from lack of the consideration for the user, can be prevented from taking place. In addition, a user-friendly interface can be provided.

When the content creator only describes method end at a portion that he or she wants to designate as an end of a content, the player automatically performs a proper process without need to provide a complicated program. Thus, a lot of time and effort to create the content can be saved.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which:

FIG. 4 is a schematic diagram describing a play state and a stop state of the movie player;

FIG. 6 is a schematic diagram showing examples of events that occur during the reproduction of a play list;

FIG. 7A and FIG. 7B are lists of examples of properties that a movie player object has;

FIG. 8 is a list of examples of methods that the movie player object has;

FIG. 9 is a list of examples of user's key inputs;

FIG. 10 is a list of examples of user's key inputs;

FIG. 11 is a list of examples of control commands according to key inputs;

FIG. 12 is a list of examples of events according to key inputs;

FIG. 13 is a list of examples of event handlers;

FIG. 14 is a list of examples of event handlers;

FIG. 17 is a schematic diagram showing an example of a script program;

FIG. 19 is an example of syntax that represents the overall structure of file "PLAYLIST.DAT";

FIG. 20 is an example of the internal structure of block PlayItem( );

FIG. 21 is an example of the internal structure of block PlayListMark( );

FIG. 22 is a list describing field mark_type of block Mark( );

FIG. 24 is a list of an example of syntax that represents the overall structure of clip AV stream file "XXXXX.CLP";

FIG. 25 is a list describing the correlation of elementary streams of block StreamInfo( );

FIG. 26 is a list of an example of the internal structure of block StaticInfo( );

FIG. 27 is a list of an example of the internal structure of block DynamicInfo( );

FIG. 28 is a list of an example of the internal structure of block EP_map( );

FIG. 29 is a block diagram showing an example of the structure of a disc reproduction apparatus according to an embodiment of the present invention;

FIG. 32 is a list of combinations of the existing state and changed state by methods for each of four states of the movie player;

FIG. 35 is a list of examples of operations of the movie player when a play list that the movie player reproduces comes to the beginning or end;

FIG. 40 is a list of backups of player states;

FIG. 42 is a list describing restoration and discard of resume information;

FIG. 43 is a list describing restoration and discard of resume information;

FIG. 44 is a list describing restoration and discard of resume information;

FIG. 46 is a list of an example of the life cycle of player states;

FIG. 47 is a list of an example of the life cycle of resume information;

FIG. 48 is a list of an example of the life cycle of user data;

FIG. 51 is a schematic diagram showing an example of specifications of method end( );

DETAILED DESCRIPTION OF THE PREFERRED EMBODIMENTS

Figure 1:
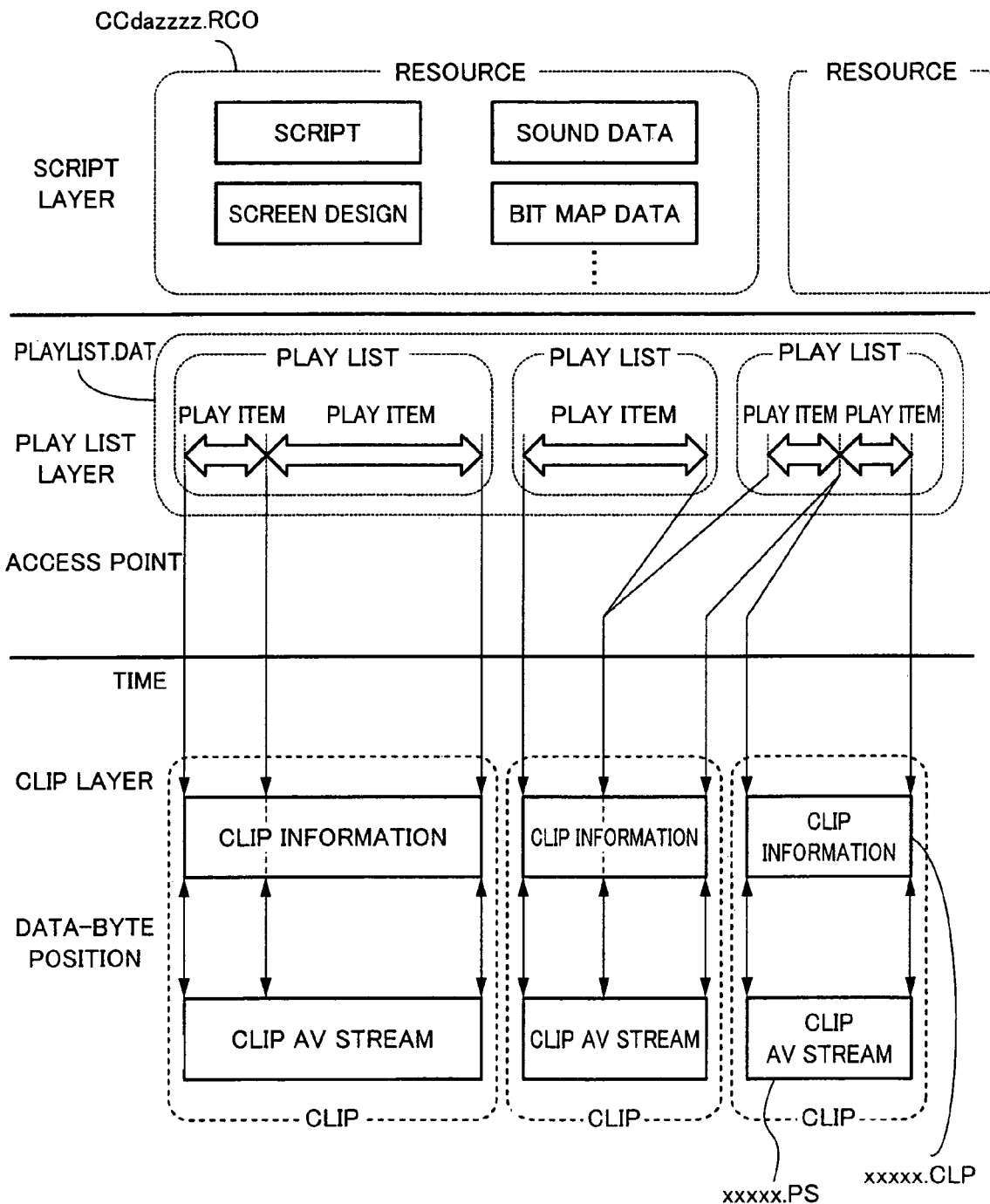
FIG. 1 is a schematic diagram showing the structure of layers according to the UMD Video Standard.

Next, embodiments of the present invention will be described in the following order.
1. UMD Video Standard
2. Player mode according to UMD Video Standard
3. Event model of movie player
4. Movie player object
5. Example of script program
6. File management structure
7. Display reproduction apparatus
8. State change model of movie player
8-1. Definitions of states of movie player
8-2. Methods that cause movie player to change states
8-3. Operation of movie player during reproduction of play list
8-4. Reproduction resume function of movie player
8-5. Life cycles of individual data
9. Process at end of content
1. UMD Video Standard For easy understanding, a system according to an embodiment of the present invention will be described. According to this embodiment of the present invention, a player model is described in a scrip language referred to as the ECMA script. The ECMA script is a cross platform script language based on JavaScript (registered trademark of Sun Microsystems, Inc.) defined by the European Computer Manufacturers Association (ECMA). The ECMA script has high compatibility with HTML documents and can define original objects. Thus, the ECMA script is suitable for a player model of this embodiment of the present invention.

In other words, the DVD Video of the related art uses non-general-purpose commands defined in the DVD Video standard to describe a control program that accomplishes interactive functions. A control program is dispersedly embedded in a plurality of files, at plurality of positions of a data file, or in an AV file. The conditions and order in which an embedded control program is executed are defined in the DVD standard.

In the DVD Video system, it is difficult to structures a general-purpose content creation system. Thus, contents are created using a template with which a story is created according to a prepared scenario. When complicated contents are created, it is necessary to use a custom-made content creation system instead of a template. According to this embodiment of the present invention, to solve such a problem, the ECMA script, which is a general-purpose and extensible script language, is used to control AV contents.

In the following description, the standard of this embodiment of the present invention is referred to as the Universal Media Disc Video Standard (UMD is a registered trademark of Sony Computer Entertainment Inc.). The script portion of the UMD Video Standard is referred to as the UMD Video Script Standard.

Next, the UMD Video Standard will be described in brief. FIG. 1 shows the structure of layers of the UMD Video Standard. The UMD Video Standard defines three layers—a script layer, a play list layer, and a clip layer. According to this structure, a stream is managed.

The UMD Video Standard deals with MPEG2 packetized elementary streams of video data, audio data, and subtitle data that have been digitally encoded as an MPEG2 stream of which they are multiplexed. The MPEG2 stream of which elementary streams of video data, audio data, and subtitle data are multiplexed is referred to as a clip AV stream. The clip AV stream is contained in a clip AV stream file. When a clip AV stream file is recorded, a clip information file is correspondingly created in the relationship of one to one. A set of a clip information file and a clip AV file that corresponds to the clip information file is referred to as a clip.

A clip is a unit of data that are recorded at a time on a disc. The reproduction order of clips is managed in the play list layer that is an upper layer of the clip layer. The play list layer is a layer that designates the reproduction path of clips. The play list layer contains at least one play list (PlayList). A play list is a group of play items (PlayItems). A play item contains one pair of an in point and an out point that represent the reproduction range of a clip. With a plurality of play items, clips can be reproduced in any order. Play items can designate the same clip. An in point and an out point of a clip AV stream file are designated by time stamps (clip internal times). The time stamps are converted into byte positions of a clip AV stream with information of a clip information file.

A play list is just a structure in which play items that represent all or part of clips are reproduced in a designated order. With only a play list, it is difficult to accomplish a branch of the reproduction of clips and interactivity to the user. According to this embodiment of the present invention, a plurality of play lists are contained together in one file "PLAYLIST.DAT."

The script layer is described in a UMD video script of which a language specification ECMA script is extended. The UMD video script is a script of which the ECMA script is extended to accomplish original functions for the UMD Video.

The script layer is an upper layer of the play list layer. The script layer is composed of a sequence of commands that cause the player to reproduce a play list and that sets the player. With commands in the script layer, a play list reproduction can be accomplished in such a manner that one of streams according to a plurality of languages is selected or play items are reproduced according to a play list selected according to a predetermined condition. An example of an application that uses the play list reproduction that has such a conditional branch is a multi story. The script layer accomplishes an interactive function to the user.

According to this embodiment of the present invention, the script layer is composed of a file referred to as a resource file. The resource file contains script data (script program) described according to the real ECMA scrip, sound data for sound effects for button operations, a screen design composed of image data for a background image of a menu screen, and image data (bit map data) with which GUI parts such as button images are displayed.

There may be a plurality of resource files. According to this embodiment of the present invention, resource files are assigned file names according to a predetermined naming rule. For example, extension "RCO" of the file name represents that the file is a resource file.

2. Player Model According to UMD Video Standard

Next, a model of a reproduction apparatus (player) that reproduces data according to the UMD Video Standard (this mode is referred to as the player model) will be described. The player reads a resource file, a play list file, and a clip information file from a disc. Thereafter, the player reads clip AV stream files from the disc in the reproduction order defined in the resource file, the play list file, and the clip information file and reproduce video data, audio data, subtitle data, and so forth from the clip AV stream files.

According to the language specification of a script program, a functional block that reproduces a play list is implemented as an object of the script program. In the UMD Video Standard, an object that reproduces a play list is referred to as the movie player object. Commands that cause the player to reproduce a play list and set the player are methods that the movie player object has. The movie player object is controlled by methods in the script layer. At this point, a function that allows the movie player object to inform the script layer of a state change and a reproduction position is needed. This function corresponds to an operation of which the movie player object issues an event to a script program. A process corresponding to the event is described as an event handler.

When a model of which information is sent from the movie player object to the script program with events and the script program controls the movie player object with objects is created, the script program can control the reproduction of a clip AV stream.

Figure 2:
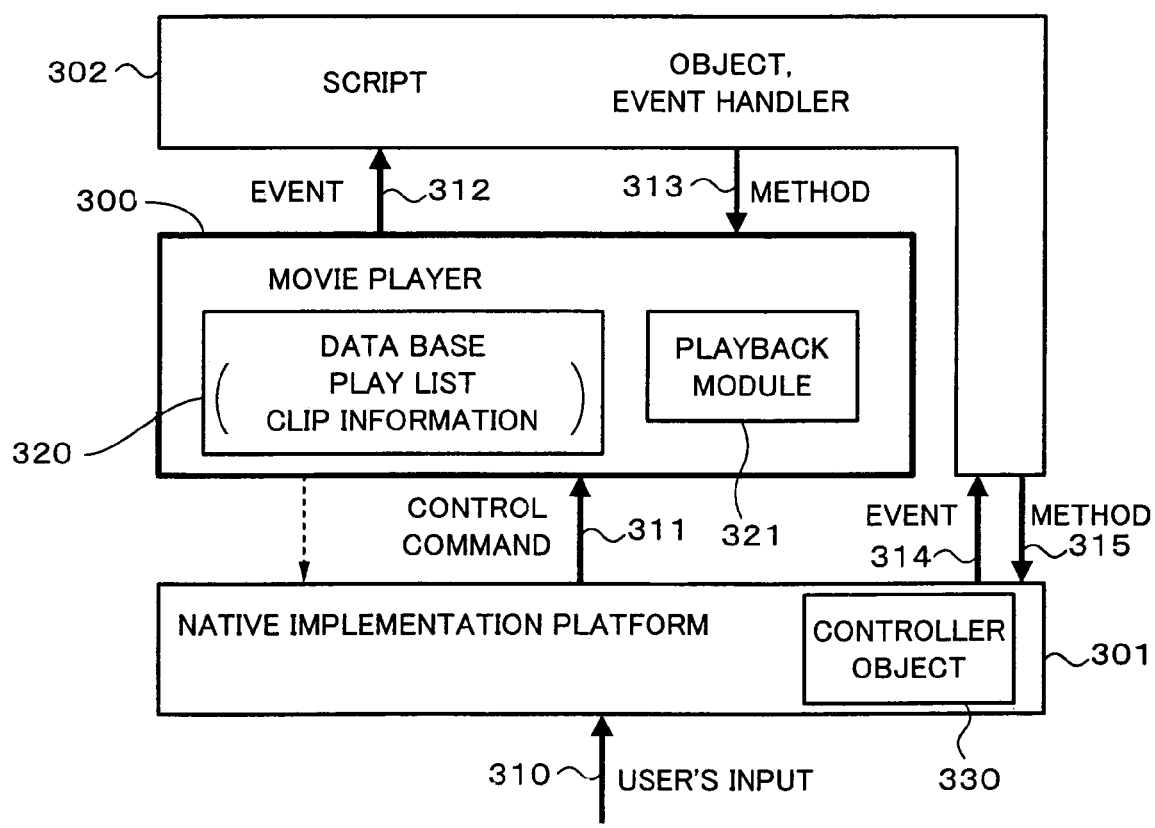
FIG. 2 is a schematic diagram showing an example of a player model according to an embodiment of the present invention.

FIG. 2 schematically shows an example of the player model of this embodiment of the present invention. A movie player 300 is a module that reproduces video data, audio data, and subtitle data according to the UMD Video Standard. The above-described movie player object is an object contained in a script program that operates movie objects. In other words, a movie player object is an abstracted implementation module that accomplishes the functions of the movie player and that is handled by a script program.

In addition, since the movie player 300 and the movie player object are thought to be substantially the same, they will be described with the same reference numeral.

In FIG. 2, the movie player 300 reads a clip AV stream file with a method received from a lower layer (native implementation platform 301 shown in FIG. 2) according to a user's input 310 and with a method received from an upper layer (script layer) according to a database of play lists and clip information and decodes and displays the clip AV stream.

The inside of the movie player object 300 depends on the implementation of the UMD video player that reproduces the UMD Video. The script layer 302 provides the movie player object 300 with an application programming interface (API) that uses methods and properties as black-boxed objects. In this example, the UMD video player represents a real device that implements a movie player. All UMD video players implement a movie player according to the UMD Video Standard and have reproduction compatibility therewith.

As shown in FIG. 2, the movie player object 300 has three input/output paths that are a path that accepts a control command 311 from the native implementation platform 301, a path that informs the script layer 302 of an event 312, and a path that accepts the method 313 from the script layer 302.

The control command 311 is a command that controls the operation of the movie player 300 and that is received from the native implementation platform 301. The native implementation platform 301 is an interface between a device unique portion of the UMD video player as a real device and the movie player 300. The event 312 is a script event that is sent from the movie player 300 to the script layer 302. The method 313 is a method with which a script program of the script layer 302 issues a command to the movie player 300.

The movie player object 300 contains a database 320 of play lists and clip information according to the UMD Video Standard. The movie player 300 invalidates (masks) the user's input 310 and converts a reproduction position designated with time into a byte position of the clip AV stream according to the database 320.

A playback module 321 in the movie player object 300 decodes the clip AV stream, which is an MPEG2 program stream (PS) of which video data, audio data, and subtitle data are multiplexed. The playback module 321 has two states that are a play state and a stop state and changes one state to the other state with a control command and a method (see FIG. 3). It should be noted that a clip AV stream is not limited to an MPEG2 PS. For example, the model can treat an MPEG2 transport stream (TS) to be the same as an MPEG2 PS The script layer 302 is a layer that executes a script program according to the UMD Video Standard, controls the movie player object 300, and displays a screen. The script layer 302 accomplishes a scenario that the content creator side intends to create. The script layer 302 issues the method 313 to the movie player object 300 and receives the event 312 therefrom. The script layer 302 exchanges a key event 314 corresponding to the users input 310 and the method 315 that causes the native implementation platform 301 to display a screen with the native implementation platform 301.

The native implementation platform 301 also has various functions that are not defined in the UMD Video Standard. According to this embodiment of the present invention, there is the method 315 with which the script layer 302 issues a command to the native implementation platform 301, an object of which a function is abstracted is defined in the native implementation platform 301. The script program considers the method 315 to be included in the object. This is because a method is included in an object. Thus, a controller object 330 is defined in the native implementation platform 301. The method 315 is defined to be a method of the controller object 330.

For example, buttons on a menu screen are displayed by the native implementation platform 301 with the method 315 supplied from the script program of the script layer 302 to the native implementation platform 301. When the user selects or decides one of the buttons, the native implementation platform 301 informs the script layer 302 of the key event 314 corresponding to the user's input 310. The script program in the script layer 302 performs a process for the key event 314 corresponding to the user's input 310.

The roles of the movie player 300 and the script layer 302 are designated so that while the movie player 300 decodes video data, audio data, and subtitle data and controls the display of the decoded data, the script layer 302 places and displays part images (hereinafter referred to as GUI parts) that compose the graphical user interface (GUI) such as buttons and processes corresponding to selection and decision of GUI parts.

The native implementation platform 301 is a platform for which the movie player object 300 and the script program operate. When the real UMD video player is a hardware device, the UMD video player implements the native implementation platform 301 to mediate processes between the hardware and the movie player 300.

For example, the native implementation platform 301 accepts the user's input 310 from the user and determines whether the accepted user's input 310 is a command for the movie player object 300 or a command for a displayed button in the script layer 302. When the determined result represents that the user's input 310 is a command for the movie player 300, the native implementation platform 301 converts the user's input 310 into the control command 311 that is an internal control command for the movie player 300 and issues the control command to the movie player 300.

On the other hand, when the determined result represents that the user's input 310 is a command for a displayed GUI part in the script layer 302, the native implementation platform 301 informs the script layer 302 of the key event 314 corresponding to the user's input 310. The native implementation platform 301 can display a button image on the screen with the method 315 issued from the script layer 302 according to the user's input 310. In other words, the native implementation platform 301 and the script layer 302 can directly exchange an event and a method not through the movie player 300.

In addition, the native implementation platform 301 can access the properties of the movie player 300 and check the state of the movie player 300.

Figure 3:
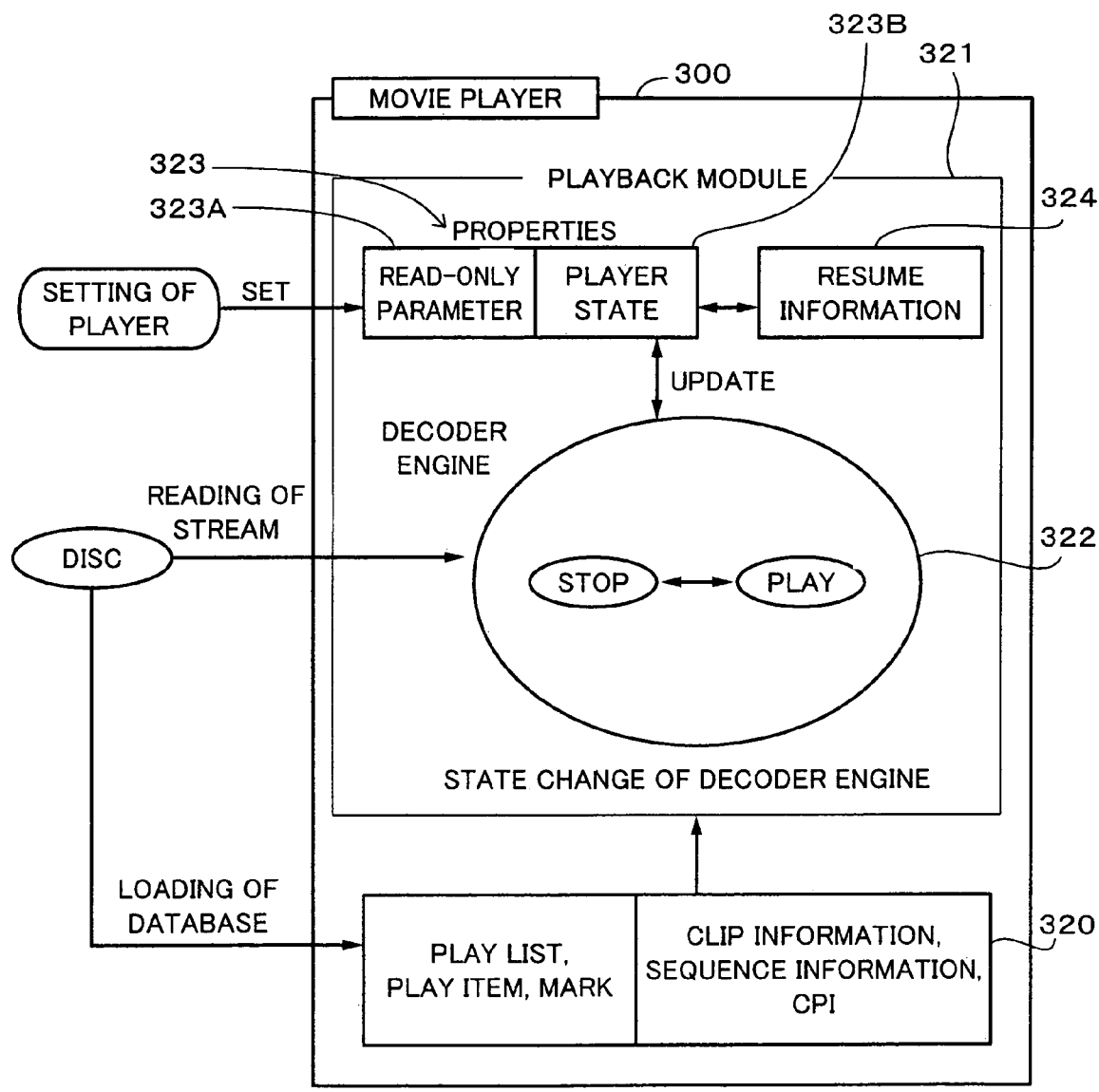
FIG. 3 is a schematic diagram showing an example of the internal structure of a movie player.

Next, the movie player 300 will be described in details. FIG. 3 shows an example of the internal structure of the movie player 300. As described above, the movie player 300 is composed of the database 320 and the playback module 321. The database 320 is an area that stores information of a play list read from the disc and information of clips, namely clip information.

The playback module 321 is composed of a decoder engine 322 and a property 323. The property 323 is a value that represents the state of the playback module 321. The property 323 has two types of properties 323A (read-only parameters) whose values depend on the initial setting of the movie player 300 like a language code and a property 323B (player state) whose value varies depending on the state of the playback module 321.

The values of the properties 323A, whose values depend on the initial setting, are set by a native system for example a real device. Thus, the values of the properties 323A are not changed by a play list, clip information, and a script program. The values of the properties 323A can be read only from a script program. In contrast, the value of the property 323B, which represents the state of the playback module 321, can be read from a script program. In addition, the value of the property 323B can be written from a particular script program.

In this operation model, it is assumed that a play list and clip information are pre-loaded from the disc before a clip AV stream is reproduced. Instead, the operations of the movie player model may be accomplished in another implementation.

The movie player object 300 reproduces a play list designated by the script layer 302 or the native implementation platform 301. For example, the movie player 300 references the database 320 and obtains the reproduction position of the clip AV stream as the byte position of the file according to the designated play list. In the playback module 321, the decoder engine 322 controls the decoding of the clip AV stream according to the information of the reproduction position.

As shown in FIG. 4, the movie player 300 has two states that are a play state and a stop state depending on the reproduction state of a play list. The play state represents that a play list is designated and it is being reproduced. The play state includes a normal reproduction, variable speed reproductions such as a double speed reproduction and a ½-speed reproduction, a fast forward, a fast reverse, and a pause. A so-called step reproduction, of which each frame is forward reproduced and reverse reproduced, is a state of which the pause state and the play state are repeated. The stop state represents that a play list is not being reproduced. In the stop state, a play list is not selected and the value of the player state that represents "currently reproduced play list number" is indefinite.

The state of the movie player 300 depends on the state change between the play state and the stop state of the decoder engine 322 of the movie player 300. The value of the property 323B is updated according to the state change of the decoder engine 322.

Resume information 324 stores the state that exits immediately before the stop state occurs. After the movie player 300 decodes a play list, when the movie player 300 is in the play state, if the state of the movie player 300 is changed to the stop state, the resume information 324 stores the state that exists immediately before the stop state occurs. In addition, the resume information 324 can be stored in a nonvolatile memory of the player as hardware for each title of the disc. The disc has unique identification information (referred to as a title ID) for each title. The resume information 324 and the identification information are correlatively stored. Thus, when the state of the disc having the title according to the identification information is changed from the stop state to the play state, data can be reproduced from the position at which the stop state occurred according to the resume information 324.

3. Event Model of Movie Player

Next, an event model of the movie player 300 will be described. In the play state that the movie player 300 reproduces a play list, the movie player 300 generates various events. The events execute process programs that are described as scripts and referred to as event handlers. The event handlers are methods called upon the occurrence of events. A program execution model that starts executing a process program upon the occurrence of an event is referred to as an event driven model. In the event driven model, an irregular event occurs. When the event occurs, a predetermined program is executed. According to this embodiment of the present invention, a script program controls the operations of the movie player object 300 with an event handler group.

Figure 5:
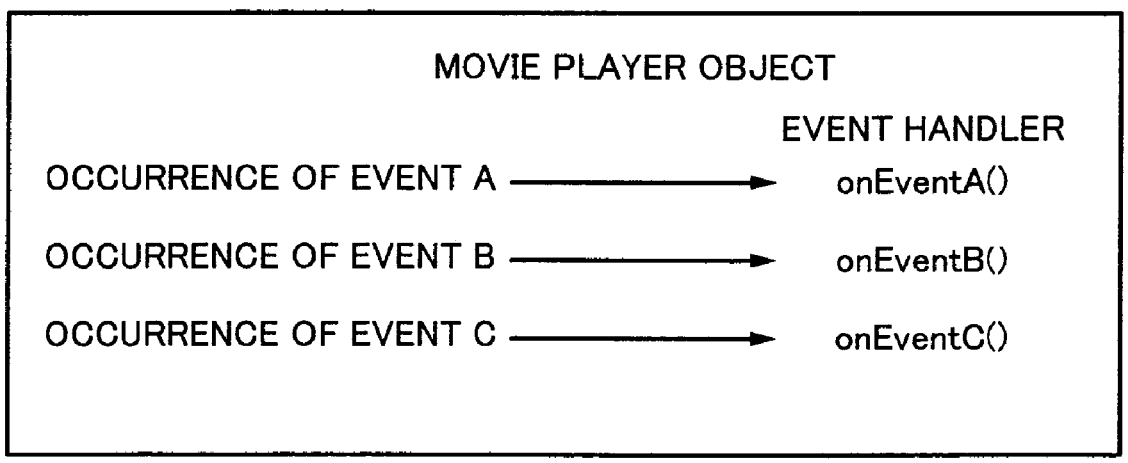
FIG. 5 is a schematic diagram showing an event model of the movie player according to an embodiment of the present invention.

FIG. 5 schematically shows an event model of the movie player 300 of this embodiment of the present invention. In FIG. 5, event handlers onEventA( ), onEventB( ), and onEventC( ) are interfaces. The contents of the event handlers are described as scripts. The contents of the event handlers are created and implemented by for example the content creator side. In the UMD Video Scrip Standard, an event handler is provided for each event of which the movie player object 300 informs the script program. In the example shown in FIG. 5, it is decided that a process program executed upon the occurrence of event A is event handler onEventA( ). This applies to event B and event C. Thus, when event B occurs, event handler onEventB( ) that corresponds thereto is executed. When event C occurs, event handler onEventC( ) that corresponds thereto is executed.

Since the system side selects an event handler called upon the occurrence of an event, the content creator side does not need to describe a process that determines what event occurred in a script program.

FIG. 6 shows examples of events that occur while a play list is being reproduced. Since chapter mark ChapterMark is described at the beginning of play list PlayList, when the play list is reproduced from the beginning, event Chapter corresponding to the chapter mark occurs. Whenever the existing chapter is changed to another chapter, the script layer 302 is informed of event Chapter and the corresponding event handler onChapter is executed. When reproduction time for event mark EventMark elapses, a corresponding mark event occurs. At the end of the play list, the movie player 300 pauses the reproduction of the play list and informs the script layer 302 of event PlayListEnd. The script layer 302 side causes the movie player 300 to start reproducing another play list with the corresponding event handler onPlayListEnd( ). In such a manner, the movie player 300 continues to reproduce a sequence of play lists in the order that the content creator side intended.

In such a manner, while the player is operating, various events occur. When an upper level program is informed of the occurrence of an event, the upper level program can know the state of the player. When the upper level program provides programs (event handlers) that are executed corresponding to events of which it is informed, it can handle various events. Events and event handlers will be described later.

When the content creator side has not described an event handler, the upper level program executes an operation (default event handler) that is built in the player and that is defined in the standard or ignores the event. When it is not necessary for a particular event to perform any process, if an event handler according to the event is not described, the event can be actively ignored.

As event models, there may be an event listener model, a single-method model, and so forth. In the event listener model, an object registers a listener according to a predetermined event to a player object. When an event that occurs in the player object is an event that has been registered, the player object transmits the event to the object that has registered the event. The object executes a method that corresponds to the event. In the single-method model, one method is called whenever an event occurs.

The event model of this embodiment of the present invention is simpler than the event listener model that needs processes such as an event registration process and an event deletion process. The single-method model needs to know what event occurred and describe in the method a preprocess that changes a process routine prepared for each event that occurs. Since the method is implemented by the content creator side, even if the model is simple, the load of the content creator side increases. In addition, whenever an event occurs, since one large process program (method) is called, a large memory area will be used and the execution speed will become slow. Thus, since the model of this embodiment of the present invention provides process programs (event handlers) for individual events, it can be said that this model is superior to the other models at these points.

4. Movie Player Object

Next, the external specifications of the movie player object 300 will be described. Generally, an object defined according to the ECMA Script Language Specifications has properties and methods. Like this object, as shown in FIG. 2 and FIG. 3, the movie player object 300 of this embodiment of the present invention has properties and methods. When an external object designates the object name and the property name of a target object, the external object can directly read and write the designated property of the target object. Instead, when method setXXX( ) (where "XXX" represents the property name) that sets the property value and method getXXX( ) that reads the property value are defined, the methods can read and write this property of the other object.

FIG. 7A and FIG. 7B show lists of examples of properties that the movie player object 300 has. These properties correspond to the property 323 shown in FIG. 3. FIG. 7A shows examples of properties that belong to the read-only parameters 323A shown in FIG. 3. Property scriptVersion represents the version of the UMD video script. Property audioChannelCapability represents the number of audio channels that the UMD video player can reproduce. Property languageCode represents the language code of the menu display language that is set to the UMD video player. Property audioLanguageCode represents the language code of the audio language that is set to the UMD video player. Property subtitleLanguageCode represents the language code of the subtitle language that is set to the UMD video player.

When a disc is loaded into the movie player 300, a scrip file that is read from the disc is decided according to the language code represented by property languageCode that is set in the read-only parameters 323A. If the disc loaded into the movie player 300 does not have a script file according to the language, a default script file is read from the disc. For example, a file at the beginning of a plurality of script files is read as a default script file from the disc.

FIG. 7B shows examples of properties that belong to the player state 323B shown in FIG. 3. Property playListNumber represents the play list number of a play list that is currently being reproduced. Property chapterNumber represents the chapter number of a chapter that is currently being reproduced. Property videoNumber represents the video stream number of a video stream that is currently being reproduced. Property audioNumber represents the audio stream number of an audio stream that is currently being reproduced. Property subtitleNumber represents the subtitle stream number of a subtitle stream that is currently being reproduced. Property playListTime represents elapsed time after the play list is reproduced when the beginning of the play list is 0. Property audioFlag represents ON/OFF of the audio reproduction and dual monaural LR. Property subtitleFlag represents ON/OFF of the subtitle display.

The dual monaural is a mode of which left and right (L, R) channels of stereo audio are independently used as monaural audio channels.

When the movie player 300 is in the play state or the pause state, each property that belongs to the player state 323B represents these information. When the movie player 300 is changed to the stop state, each property that belongs to the player state 323B is backed up as the resume information 324. At this point, the contents of the player state 323B may be cleared.

FIG. 8 shows a list of examples of methods that the movie player object 300 has. The methods correspond to the method 313 shown in FIG. 2. Method play( ) reproduces video data. Method playChapter( ) designates a chapter and reproduces video data of the designated chapter. Method resume( ) starts reproducing video data with the resume information 324. Method stop( ) stops reproducing video data. Method pause( ) pauses the reproduction of video data. Method playStep( ) reproduces video data frame by frame. Method changeStream( ) changes the existing stream of a video stream, an audio stream, and/or a subtitle stream to another stream. Method getPlayerStatus( ) obtains the play state, the stop state, the pause state, or the like of the movie player 300. Method changeResumeInfo( ) changes the contents of the resume information 324. Method reset( ) stops the reproduction of video data and clears the contents of the resume information 324.

According to the UMD Video Standard, video data can be displayed at a part of the display screen. The following four methods are methods that display video data at a part of the display screen. Method setPos( ) sets the display position of video data. Method getPos( ) obtains the display position of video data. Method setSize( ) sets the display size of video data. Method getSize( ) obtains the display size of video data.

In reality, the movie player 300 and the native implementation platform 301 are integrated. In other words, the movie player 300 UMD and the native implementation platform 301 correspond to hardware as the UMD player that loads a disc and reproduces video data from the disc and software that controls the UMD player. What portions are hardware and software depend on the implemented structure. For example, when the UMD player is a personal computer or the like, the other portions except for the disc dive are composed of software. When a single UMD player is used, besides the disc drive, for example a video decoder, an audio decoder, and so forth may be composed of hardware. Thus, methods, commands, and events are not always explicitly exchanged between the movie player 300 and the native implementation platform 301 as shown in FIG. 2.

On the other hand, with respect to key inputs of the user, as shown in FIG. 2, the user's input 310 is received by the native implementation platform 301 at the first. In other words, the native implementation platform 301 receives a key input of the user as the user's input 310. The native implementation platform 301 determines whether the user's input 310 is a command to the movie player 300 or an event to a script program in the script layer 302. Depending on the determined result, the native implementation platform 301 issues the control command 311 or the key event 314 and informs the corresponding upper layer (movie player 300 or the script layer 302) of the issued control command 311 or key event 314.

FIG. 9 and FIG. 10 show examples of key inputs as the user's input 310. In FIG. 9 and FIG. 10, keys with prefix "VM" are virtual keys.

FIG. 9 shows examples of key inputs with respect to the operations of the movie player 300. Key VK_PLAY provides a function corresponding to a play key that starts the reproduction. Key VK_STOP provides a function corresponding to a stop key that stops the reproduction. Key VK_PAUSE provides a function corresponding to a pause key that pauses the reproduction. Key VK_FAST_FORWARD provides a function corresponding to a fast forward key that performs the fast forward reproduction. Key-VK_FAST_REVERSE provides a function corresponding to a fast reverse key that performs the fast reverse reproduction. Key VK_SLOW_FORWARD provides a function corresponding to a slow (forward) key that performs the forward slow reproduction. Key VK_SLOW_REVERSE provides a function corresponding to a slow (reverse) key that performs the reverse slow reproduction. Key VK_STEP_FORWARD provides a function corresponding to a step (forward) key that performs the forward step reproduction. Key VK_STEP_REVERSE provides a function corresponding to a step (reverse) key that performs the reverse step reproduction.

Key VK_NEXT provides a function corresponding to a next designation key that inputs a value that represents "next." Key VK_PREVIOUS provides a function corresponding to a previous designation key that inputs a value that represents "previous." With key VK_NEXT and key VK_PREVIOUS, the user can designate a jump to for example the next chapter and the previous chapter, respectively.

Key VK_ANGLE provides a function corresponding to an angle change key that designates an angle change for multi-angle video data. Key VK_SUBTITLE provides a function corresponding to a subtitle change key that designates English subtitle, Japanese subtitle, and subtitle ON/OFF. Key VK_AUDIO provides a function corresponding to an audio change key that designates an audio mode such as surround mode or bilingual mode. Key VK_VIDEO_ASPECT provides a function corresponding to an aspect change key that changes an aspect ratio of video data.

FIG. 10 shows examples of key inputs with respect to the menu operations. Key VK_UP provides a function corresponding to an up direction designation key that inputs a value that represents "up." Key VK_DOWN provides a function corresponding to a down direction designation key that inputs a value that represents "down." Key VK_RIGHT provides a function corresponding to a right direction designation key that inputs a value that represents "right." Key VK_LEFT provides a function corresponding to a left direction designation key that inputs a value that represents "left." Key VK_UP RIGHT provides a function corresponding to an upper right direction designation key that inputs a value that represents "upper right." Key VK_UP_LEFT provides a function corresponding to an upper left direction designation key that inputs a value that represents "upper left." Key VK_DOWN_RIGHT provides a function corresponding to a lower right direction designation key that inputs a value that represents "lower right." Key VK_DOWN_LEFT provides a function corresponding to a lower left direction designation key that inputs a value that represents "lower left." With these direction keys, the user can cause for example the cursor to move on the display.

Key VK_MENU provides a function corresponding to a menu key that displays a menu. Key VK_ENTER provides a function corresponding to an enter key that completes a command input or a data input. Key VK_RETURN provides a function that returns the process by one step.

Key VK_COLORED_KEY_1 provides a function corresponding to a colored function key 1. Key VK_COLORED_KEY_2 provides a function corresponding to a colored function key 2. Key VK_COLORED_KEY_3 provides a function corresponding to a colored function key 3. Key VK_COLORED_KEY_4 provides a function corresponding to a colored function key 4. Key VK_COLORED_KEY_5 provides a function corresponding to a colored function key 5. Key VK_COLORED_KEY_6 provides a function corresponding to a colored function key 6.

Since the functions of the key inputs shown in FIG. 9 are different in their roles from those of the key inputs shown in FIG. 10, the native implementation platform 301 needs to select destinations that are informed of the key inputs. As described above, key inputs shown in FIG. 9 designate the reproduction operations of video data, audio data, and subtitle data. When the native implementation platform 301 receives one of the key inputs shown in FIG. 9 as the user's input 310, the native implementation platform 301 converts the received key input into a command shown in FIG. 11 and informs the movie player 300 of the converted command.

On the other hand, since the key inputs shown in FIG. 10 are the user's input 310 to the GUI, the script layer 302, which composes a screen and places buttons, needs to be informed of these inputs. When the native implementation platform 301 receives a key input shown in FIG. 10 as the user's input 310, the native implementation platform 301 converts the key input into the event 314 shown in FIG. 2 and informs the script layer 302 of the event 314. FIG. 12 shows examples of the events 314 according to the key inputs.

FIG. 9 and FIG. 10 also show key inputs with respect to stream changes such as key VK_ANGLE, key VK_SUBTITLE, and key VK_AUDIO. First, with these keys, the user input 310 is informed of the user input 310. The movie player 300 informs a script program of an event that represents that the movie player 300 has issued a stream change request. The script program causes the movie player 300 to change the existing stream for example an audio stream or a subtitle stream to another stream with a stream change method. Thus, these keys are key inputs of which the native implementation platform 301 needs to inform the movie player 300.

Next, commands shown in FIG. 11 will be described in detail. Command uo_timeSearch(playListTime) starts reproduction from a designated time of a play list that is being reproduced. Argument playListTime represents the time of the play list when the beginning of the play list is 0. Since this command does not designate a play list number, the time represented by argument playListTime is a designated time in the range of the play list that is being reproduced. Command uo_play( ) starts reproduction at normal reproduction speed. The start position is decided according to the resume information 324. When there is no resume information 324, this user's operation is invalidated. This command corresponds to the execution of method play( ) without the play list number. With this command, the user is incapable of designating a play list number.

Command uo_playChapter(chapterNumber) starts reproduction from a chapter designated by argument chapterNumber in a play list that is being reproduced. Without the chapter number, this command starts reproduction from the beginning of the chapter that is being reproduced. This command corresponds to method playChapter( ) without the chapter number. Command uo_playPrevChapter( ) starts reproduction from the immediately preceding chapter. Command uo_playNextChapter( ) starts reproduction from the immediately following chapter.

Command uo_jumpToEnd( ) jumps to the end of the play list. This command corresponds to a user's operation that' stops the reproduction and generates event playListEnd. With this command, the script layer 302 executes event handler onPlayListEnd. Command uo_forwardScan(speed) starts forward reproduction at a reproduction speed designated by argument speed. Command uo_backwardScan (speed) starts backward reproduction at a reproduction speed designated by argument speed. Argument speed of these commands uo_forwardScan(speed) and uo_backwardScan (speed) depends on the implementation of the UMD video player.

Command uo_playStep(forward) starts step forward reproduction. Command uo_playStep(backward) starts step backward reproduction Command uo_pauseOn( ) pauses reproduction Command uo_pauseOff( ) cancels the pause state of reproduction.

Command uo_setAudioEnabled(Boolean) turns ON/OFF an audio stream. When this command is executed, the value of flag audioFlag is correspondingly changed. Command uo_setSubtitleEnabled(Boolean) turns ON/OFF a subtitle stream. When this command is executed, the value of flag'subtitleFlag is correspondingly changed. Command uo_angleChange( ) changes a display angle. When the movie player 300 is informed of this command corresponding to the user's operation, the movie player 300 informs the script layer 302 of event angleChange. Command uo_audiochange (audioStreamNumber) changes an audio stream to be reproduced. Command uo_changeAudioChannel(value) changes the number of audio channels or changes one channel to the other channel in the dual monaural reproduction. When this command is executed, the value of flag audioFlag is correspondingly changed. Command uo_subtitleChange(subtitleStreamNumber) changes the existing subtitle stream to another subtitle stream.

Next, the relationship between events shown in FIG. 12 and methods of the movie player 300 will be described in detail. Event menu jumps to a menu. The native implementation platform 301 informs the script layer 302 rather than the movie player 300 of this event. When the script layer 302 receives event menu, the script layer 302 executes event handler onMenu. Event exit is an event that the native implementation platform 301 issues when it completes an UMD video application. When the script layer 302 receives event exit, the script layer 302 executes event handler onExit.

Event resourceChanged is an event that the native implementation platform 301 generates when the existing resource file is changed to another resource file. When the script layer 302 receives event resourceChanged, the script layer 302 executes event handler onResourceChanged.

Event up, event down, event left, event right, event focusIn, event focusOut, event push, and event cancel are events that occur when button images as GUI parts on the screen are focused. The native implementation platform 301 informs the script layer 302 rather than the movie player 300 of these events. When a button image is focused, for example the cursor displayed on the screen represents the coordinates of the button image so that the button image can be selected. Event up, event down, event left, and event right occur when an up button image, a down button image, a left button image, and a right button image are focused, respectively. Event focusIn occurs when any button image is focused. Event focusOut occurs when any focused button image is defocused. Event push occurs when a press operation is performed for any focused button image. Event cancel occurs when a cancel operation is performed against the press operation for any button image.

Event autoPlay and event continuePlay are events that cause the script layer 302 to start executing a script. Event autoPlay is an event that causes a script to automatically start execution when a disc is loaded. Event continuePlay causes a script to resume execution to the position at which the execution of a script was stopped according to for example the resume information 324 when a disc is loaded.

There are programs that are executed when events shown in FIG. 12 occur. These programs corresponding to the events are referred to as event handlers. Events and event handlers can be correlated using for example names. The name of an event handler is created by adding a prefix "on" to the name of the corresponding event. FIG. 13 and FIG. 14 show examples of event handlers. When the content creator describes the contents of event handlers, the UMD video player can perform various operations that the content creator intends.

FIG. 13 shows examples of events that the movie player object 300 has and event handlers that correspond thereto. Events shown in FIG. 13 correspond to the event 312 shown in FIG. 2. The movie player 300 informs the script layer 302 of the events shown in FIG. 13. The event handlers are kinds of interfaces. The contents of the event handlers are implemented by the content creator using for example a script language. Since the event handlers have such a structure, when events occur, operations that the content creator intends can be accomplished.

Event mark and event handler onMark( ) are executed when an event mark is detected. An event mark is embedded in for example a play list. While the movie player 300 is reproducing a play list, the movie player 300 detects an event-mark from the play list. When the movie player 300 detects the event-mark, the movie player 300 informs the script layer 302 of event mark. The script layer 302 executes event handler onMark( ) corresponding to event mark. Likewise, event playListEnd and event handler onPlayListEnd( ) are executed when the reproduction of a play list is completed. Event chapter and event handler onChapter( ) are executed when a chapter-mark is detected. A chapter mark is embedded in for example a play list and detected by the movie player 300 while it is reproducing the play list.

Event angleChange and event handler onAngleChange( ) are executed when an angle change is designated by a user's operation. For example, when key input VK_ANGLE is input to the native implementation platform 301 by a user's operation as the user's input 310, the native implementation platform 301 converts the user's input 310 into command uo_angleChange( ) and supplies it to the movie player 300. The movie player 300 generates event angleChange corresponding to command uo_angleChange and supplies event angleChange to the script layer 302. The script layer 302 executes event handler onAngleChange( ) corresponding to event angleChange. Likewise, event audiochange and event handler onAudioChange( ) are executed when the audio change is designated by a user's operation. Event subtitleChange and event handler onSubtitleChange( ) are executed when a subtitle change is designated by a user's operation.

FIG. 14 shows examples of event handlers that the controller object 330 has. The event handlers shown in FIG. 14 are event handlers that belong to the controller object 330 of the native implementation platform 301. When the native implementation platform 301 informs the script layer 302 of the event handlers, the script layer 302 executes them.

Event menu and event handler onMenu( ) jump to a menu. Event menu is an event of which the native implementation platform 301 informs the script layer 302 when the menu key is pressed by a user's operation The script layer 302 receives this event, executes event handler onMenu( ) corresponding thereto, and arranges and displays GUI parts that compose a menu screen with event handler onMenu( ). Event exit and event handler onExit( ) are an event and the corresponding event handler. When the native implementation platform 301 completes a UMD video application, the native implementation platform 301 generates event exit.

When the completion of the operation of the UMD video player is designated by for example a user's operation, the native implementation platform 301 informs the script layer 302 of event exit. When the script layer 302 receives event exit, the script performs an exit process with event handler onExit( ).

Event resourceChanged and event handler onResourceChanged( ) are an event and the corresponding event handler. After the native implementation platform 301 has changed the existing resource file to another resource file, the native implementation platform 301 generates event resourceChanged.

Event autoPlay, event handler onAutoPlay( ), event continuePlay, and event handler onContinuePlay( ) cause a script to start execution.

Besides event handlers for the controller object 330, there are event handlers for buttons. However, event handlers for buttons do not closely relate to this embodiment of the present invention, their description will be omitted.

Figure 15:
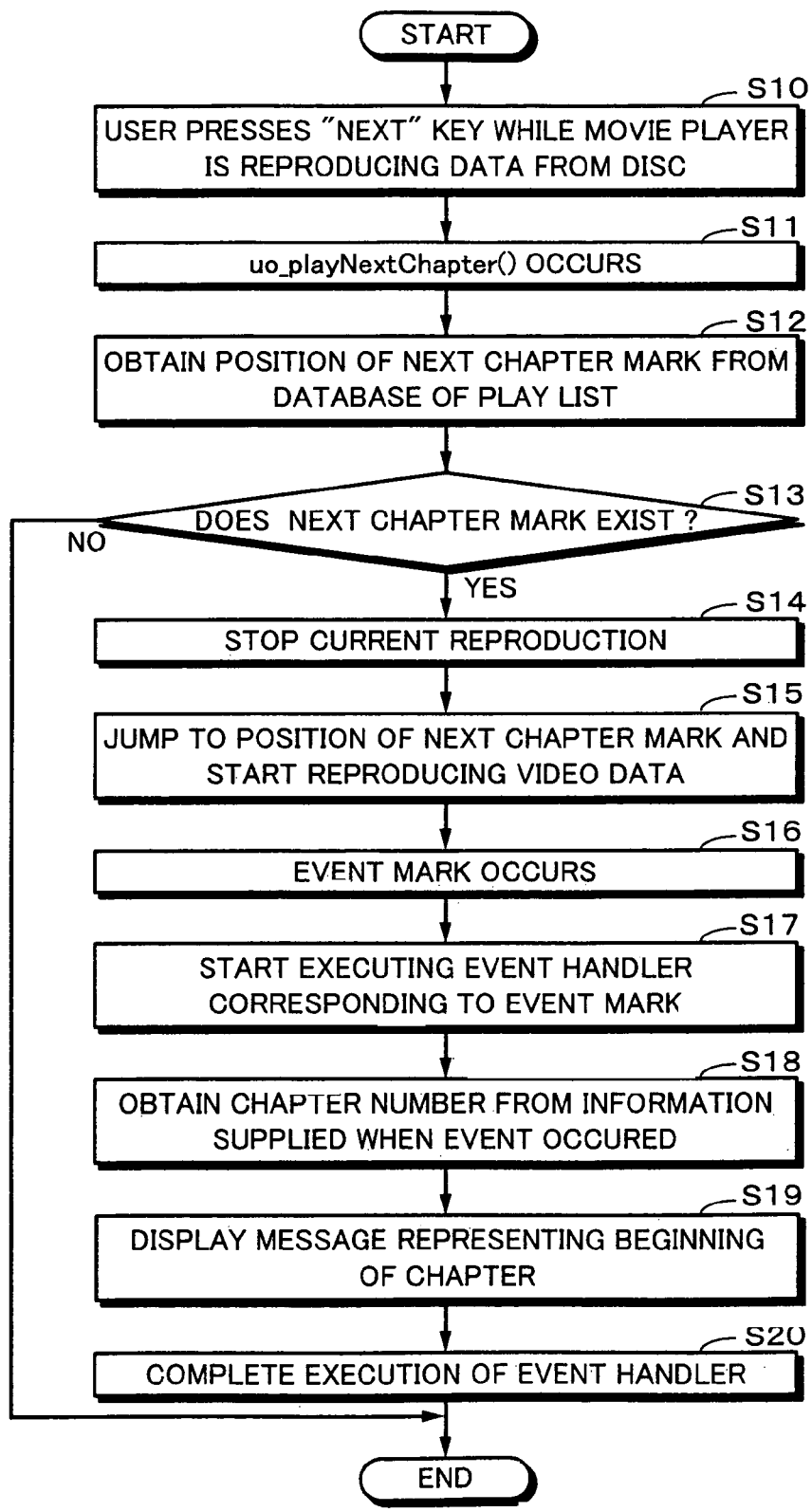
FIG. 15 is a flow chart showing an example of a process that a provided program executes upon the occurrence of a user's input event.

Next, with reference to a flow chart shown in FIG. 15, an example of a process that executes a provided program upon the occurrence of an event of a user's input will be described in brief. FIG. 15 shows an example of which while the UMD video player is normally reproducing data from a disc, when the user presses a key to causes the UMD video player to reproduce the next chapter (for example, "next" key), the UMD video player jumps to the next chapter according to the key input, starts reproducing data from the next chapter, and displays a provided message on the screen.

While the UMD video player is normally reproducing data from the disc, when the user presses the key "next" on the remote control commander of the UMD video player (at step 510), key VK_NEXT is supplied as the user's input 310 to the native implementation platform 301. The native implementation platform 301 generates user command uo_playNextChapter( ) corresponding to the user's input 310 (at step S11). The native implementation platform 301 informs the movie player 300 of user command uo_playNextChapter( ).

When the movie player 300 receives command uo_playNextChapter( ) the movie player 300 searches the database 320 for the position of the next chapter mark based on the current reproduction position according to play list information (at step S12). At step S13, it is determined whether the next chapter mark exists. When the determined result represents that the next chapter mark does not exist, the movie player 300 does not jump to the next chapter, but continues the current reproduction operation.

In contrast, when the determined result at step S13 represents that the next chapter mark exists, the flow advances to step S14. At step S14, the movie player 300 stops the current reproduction and obtains the byte position of the next chapter mark in the clip AV stream file from feature point information of the clip information file of the database 320. At step S15, the movie player 300 accesses the obtained byte position of the file and starts reproducing the stream from the position.

After step S16, a process that displays a message that informs the user that the existing chapter was changed to the next chapter on the screen is performed. When the existing chapter is changed to the next chapter and the reproduction is started from the beginning of the next chapter, event chapter occurs (at step S16). For example, the movie player 300 detects a chapter-mark at the beginning of the chapter and generates event chapter. The movie player 300 informs the script layer 302 of event chapter. In addition, the movie player 300 informs the script layer 302 of the chapter number of the chapter to be jumped. The script layer 302 starts executing an event handler corresponding to the informed event, for example event handler onChapter( ) (at step S17).

In this example, it is assumed that an operation that displays a message that represents that the chapter was changed on the screen is described in the event handler. A script in the script layer 302 executes the event handler, obtains the chapter number of which the movie player 300 informed the script layer 302 when the event occurred (at step S18), and causes the native implementation platform 301 to display a predetermined message that represents for example the beginning of the chapter of the obtained chapter number on the screen. Accordingly, the native implementation platform 301 displays the message on the screen (at step S19) and completes the process of the event handler (at step S20).

In the foregoing process, when the user operates the key "next", which causes the movie player 300 to start reproducing data from the next chapter, the movie player 300 jumps to the next chapter. When the movie player 300 starts reproducing the next chapter, the movie player 300 displays a message that represents the beginning of the next chapter on the screen.

Thus, an event of a user's input causes the state of the movie player 300 to be changed and a new event to occur. With new events, the movie player 300 can perform various processes.

The player model can reproduce video data, audio data, and subtitle data. With events that the content creator intended so that they occur at times during the reproduction and corresponding event handlers that are executed corresponding to the events, operations that he or she intended can be accomplished. In addition, when a user operation is preformed of the player while it is reproducing a play list, the native implementation platform 301 supplies to the movie player 300 a control command corresponding to the user input 310 as the user's operation so that the existing state of the player is changed to another state that the user desired. In addition, the native implementation platform 301 informs the script in the script layer 302 of an event corresponding to the user's input 310 as the user's operation to the player. As a result, the operations of the player that the content creator provided can be accomplished corresponding to user's operations.

Since the player model has such a structure, the user can reproduce video data, audio data, and subtitle data and interactively operate them.

5. Example of Script Program

Figure 16:
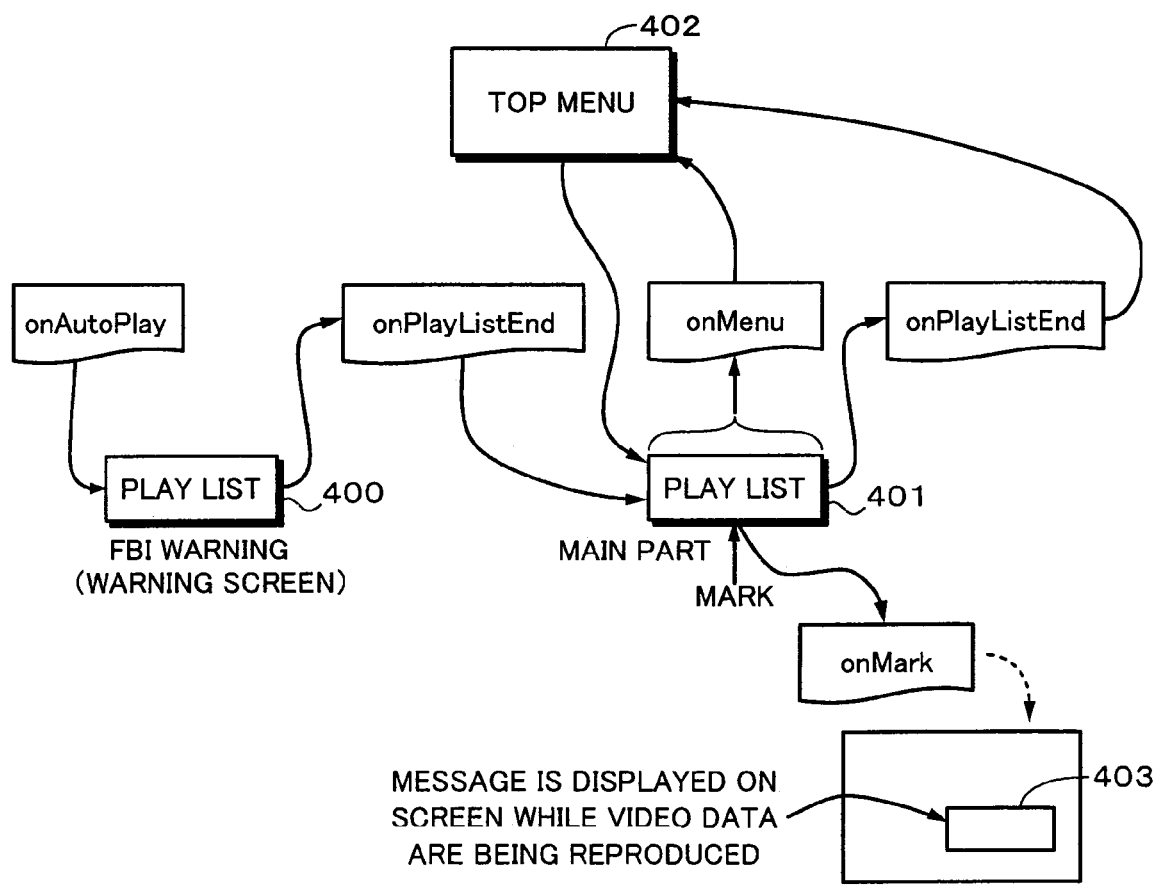
FIG. 16 is a schematic diagram describing an example of a script program.

Next, an example of a script program in the script layer 302 will be described. It is assumed that the content creator created a flow of reproduction of a content as shown in FIG. 16. The content shown in FIG. 16 has as display elements play lists 400 and 401, a top menu 402, and a message 403. The play list 400 is used to display a warning message that is automatically displayed when a disc is loaded. The play list 401 is a main part of a movie as an example of the content. The top menu 402 has GUI parts such as buttons with which for example the user causes the script to reproduce the play list 401. The message 403 is displayed at any time during the reproduction of the play list 401.

In addition, in the structure shown in FIG. 16, several event handlers are provided. When a disc is loaded into the UMD video player, event handler onAutoPlay( ) automatically reproduces the play list 400 from the disc and displays a warning message on the screen. Event handler onPlayListEnd( ) is an event handler that is called when the reproduction of the play list is completed. In the example shown in FIG. 16, when the reproduction of the play list 400 or the play list 401 is completed, event handler onPlayListEnd( ) is called. In other words, event handler onPlayListEnd( ) determines whether the reproduction of a play list is completed. When the reproduction of the play list 400 is completed, event handler onPlayListEnd( ) starts reproduction of the play list 401. When the reproduction of the play list 401 is completed, event handler onPlayListEnd calls the top menu 402.

Event handler onMenu( ) is called when the user operates the menu key. Event handler onMenu( ) calls the top menu 402 and displays it on the screen Event handler onMark( ) is executed when time designated by mark Mark elapsed during the execution of a play list. In the example shown in FIG. 16, mark Mark is set in the play list 401. During the execution of the play list 401, when time designated by mark Mark elapses, the message 403 is displayed on the screen.

In the example shown in FIG. 16, when a disc is loaded into the UMD video player, event handler onAutoPlay is called. Event handler onAutoPlay reproduces the play list 400 and displays a warning message on the screen. After the reproduction time of the play list 400 has elapsed, the play list 400 comes to the end and event handler onPlayListEnd is called. Event handler onPlayListEnd determines that the play list 400 has been completely reproduced and reproduces the next play list 401. When the user operates the menu key while the play list 401 is being reproduced, event handler onMenu is called. Event handler onMenu displays the top menu 402 on the screen. Event handler onMenu starts reproducing the play list 401 from the beginning corresponding to a predetermined operation on the top menu 402. When the reproduction time of the play list 401 has elapsed for time designated by mark Mark, event handler onMark is called. Event handler onMark displays the message 403 on the screen. When the play list 401 has been completely reproduced, event handler onPlayListEnd is called. Event handler onPlayListEnd determines that the play list 401 has been completely reproduced and displays the top menu 402 on the screen.

FIG. 17 shows an example of a script program that accomplishes the operation shown in FIG. 16. As described above, the script program has event handlers and executes them upon the occurrence of corresponding events. The script program is stored in resource file "SCRIPT.DAT" with extension "RCO."

Method "movieplayer.play( )" causes the movie player 300 to reproduce a play list. The play list number of a play list to be reproduced is described in parentheses ( ) as an argument. When the play list has been completely reproduced, event playListEnd occurs. When event playListEnd occurs, the script calls event handler movieplayer.onPlayListEnd( ). At this point, event playListEnd and object event_info are supplied to the script. The play list number of a play list that has been completely reproduced and so forth are stored in object event_info. The script can change the next operation corresponding to the content of object event_info.

6. File Management Structure

Figure 18:
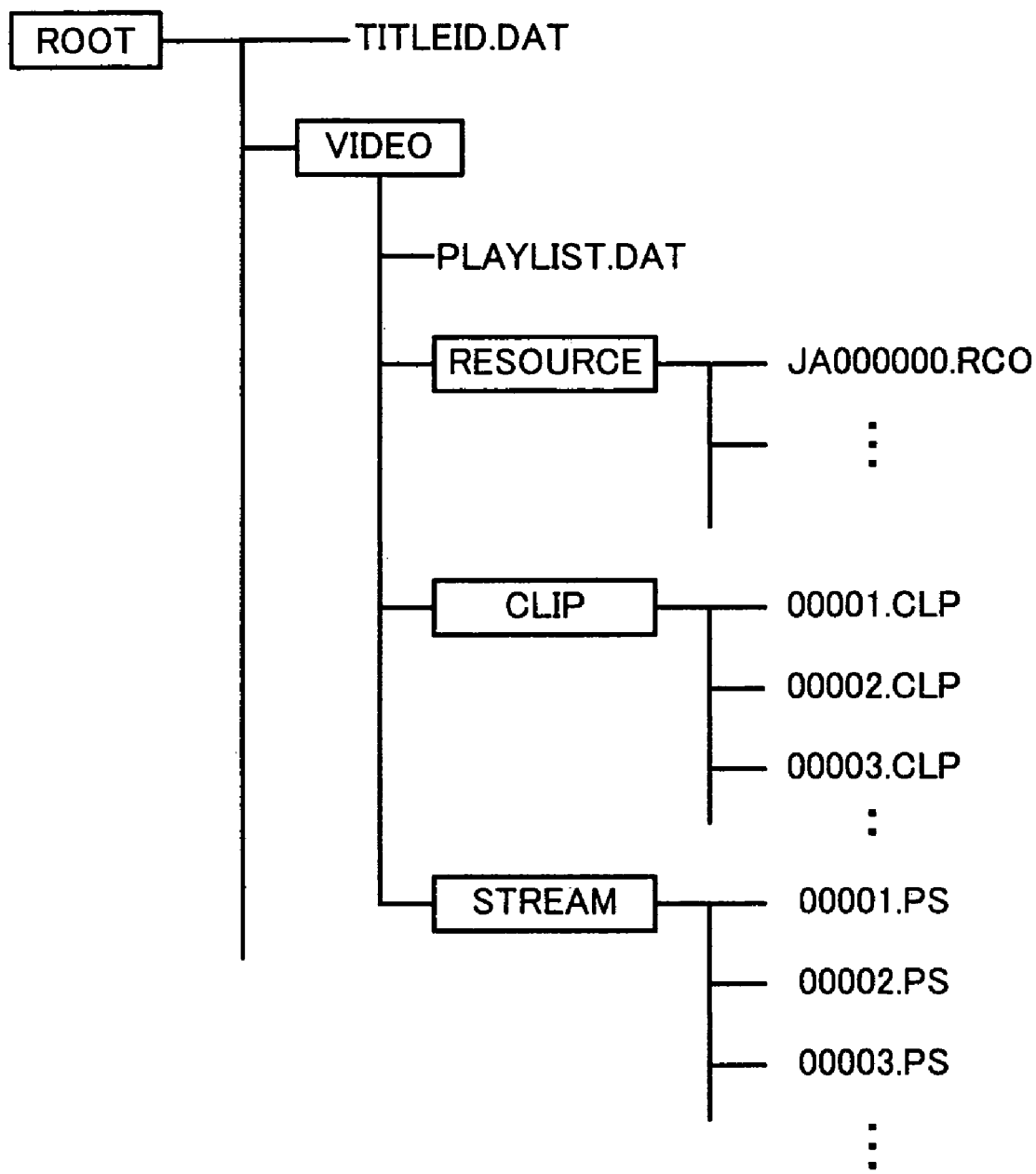
FIG. 18 is a schematic diagram showing an example of a management structure for files according to the UMD Video Standard.

Next, with reference to FIG. 18, the file management structure according to the UMD Video Standard will be described. Files are hierarchically managed in a directory structure and recorded on a disc. A disc file system standardized by International Organization for Standardization (ISO) 9660, Universal Disk Format (UDF), or the like may be used.

File "TITLEID.DAT" and directory "VIDEO" are placed under the root directory. Directory "RESOURCE," directory "CLIP," directory "STREAM," and file "PLAYLIST.DAT" are placed under directory "VIDEO."

File "TITLEID.DAT" is a file that stores a title identifier that differs in each title (type of content). One disk has one file "TITLEID.DAT."

Resource file "JA000000.RCO" is placed under directory "RESOURCE." As described above, in addition to a script program that composes the script layer 302, data that compose a menu screen, for example part data such as image data and sound data, are contained in the resource file. One resource file is normally placed under directory "RESOURCE." Instead, a plurality of resource files may be placed under directory "RESOURCE." A plurality of resource files are created for a plurality of menus that are different in languages. In this case, however, one resource file is used at a time.

A resource file has a file name having a period as a delimiter and fixed extension "RCO" that a resource file. The character string followed by the period represents the contents of the resource file. The file name of a resource file has a format of "CCdannn RCO." The first two characters "CC" represent a language code of the resource file. The next character "d" is a flag that represents whether the language code is a default language. The next character "a" represents the aspect ratio of the display screen. The next four characters "nnnn" represent an identification number. The identification number is assigned so that file names of resource files are not redundant.

According to the naming rule of a resource file, the file name thereof represents the language attribute of resource data and the aspect ratio of the display screen. A resource file is properly selected according to the file name.

At least one clip information file is placed under directory "CLIP." A clip information file has a file name composed of a character string portion having five to several characters such as "00001" (in this example, numerals), a period as a delimiter, and an extension portion such as "CLP.". Extension portion "CLP" represents that the file is a clip information file.

At least one clip AV stream file is placed under directory "STREAM." A clip AV stream file has a file name composed of a character string portion having several to five characters such as "00001" (in this example, numerals), a period as a delimiter, and an extension portion such as "PS." Extension portion "PS" represents that the file is a clip AV stream file. According to this embodiment of the present invention, a clip AV stream file is an Moving Pictures Experts Group 2 (MPEG2) program stream of which a video stream, an audio stream, and a subtitle stream are multiplexed and contained in a file identified by extension portion "PS."

As described above, a clip AV stream file is a file of which video data and audio data are compression-encoded and time-division multiplexed. Thus, when the clip AV stream file is read and decoded, video data and audio data are obtained. A clip information file is a file that describes the characteristics of a clip AV stream file. Thus, a clip information file and a clip AV stream file are correlated. According to this embodiment of the present invention, since the character string portions having several to five characters of the file names of the clip information file and the clip AV stream file are the same, the relationship therebetween can be easily obtained.

As described above, a resource file contains a script file that describes a script program. A resource file contains a program that causes reproduction states for a disc to be interactively changed according to this embodiment of the present invention. A resource file is read before other files are read from the disc.

File "PLAYLIST.DAT" is a play list file that describes a play list that designates the reproduction order of a clip AV stream. Next, with reference to FIG. 24 to FIG. 26, the internal structure of file "PLAYLIST.DAT" will be described. FIG. 24 shows an example of syntax that represents the overall structure of file "PLAYLIST.DAT." In this example, the syntax is described in the C language, which is used as a descriptive language for programs of computer devices. This applies to tables that represent other syntaxes.

Field name_length has a data length of 8 bits and represents the length of the name assigned to the play list file. Field name_string has a data length of 255 bytes and represents the name assigned to the play list file. In field name_string, the area from the beginning for the byte length represented by field name_length is used as a valid name. When the value of field "name_length" is "10," 10 bytes from the beginning of field name_string is interpreted as a valid name.

Field number_of_PlayLists has a data length of 16 bits and represents the number of blocks PlayList( ) that follow. Field number_of_PlayLists is followed by a for loop. The for loop describes blocks PlayList( ) corresponding to field number_of_PlayLists. Block PlayList( ) is a play list itself.

Next, an example of the internal structure of block PlayList( ) will be described. Block PlayList( ) starts with field PlayList_data_length. Field PlayList_data_length has a data length of 32 bits and represents the data length of block PlayList( ), including field PlayList_data_length. Field PlayList_data_length is followed by field reserved_for_word_alignment having a data length of 15 bits and flag capture_enable_flag_PlayList having a data length of 1 bit. Field reserved_for_word_alignment and flag capture_enable flag_PlayList having a data length of 1 bit align data in 16 bits in block PlayList( ).

Flag capture_enable_flag_PlayList is a flag that represents whether a moving picture that belongs to block PlayList( ) including flag capture_enable_flag_PlayList is permitted to be secondarily used. When the value of flag capture_enable_flag_PlayList is for example "1," it represents that the moving picture that belongs to PlayList( ) is permitted to be secondarily used in the player.

In the foregoing example, flag capture_enable_flag_PlayList has a data length of 1 bit. Instead, flag capture_enable_flag_PlayList may have a data length of a plurality of bits that describe a plurality of secondary use permission levels. For example, flag capture_enable_flag_PlayList may have a data length of 2 bits. In this case, when the value of the flag is "0", the moving picture may not be perfectly prohibited from being secondarily used. When the value of the flag is "1," the moving picture may be permitted to be secondarily used in the case that the moving picture is compression-encoded with a predetermined resolution or lower such as 64 pixels×64 lines. When the value of the flag is "2," the moving picture may be perfectly permitted to be secondarily used without any restriction. Instead, when the value of bit 0 of the flag is "0," the moving picture may be permitted to be secondarily used in the content reproduction application. When the value of bit 1 of the flag is "1," the moving picture may be permitted to be secondarily used in another application (for example, wall paper image or a screen saver) in the movie player. In this case, the values of bits 0 and 1 of the flag may be used in combination.

Field PlayList_name_length has a data length of 8 bits and represents the length of the name assigned to block PlayList( ). Field PlayList_name_string has a data length of 255 bits and represents the name assigned to block PlayList( ). In Field PlayList_name_string, the area from the beginning for the byte length represented by field PlayList_name_string is used as a valid name.

Field number_of_PlayItems has a data length of 16 bits and represents the number of blocks PlayItem( ) that follow. Field number_of_PlayItems is followed by a for loop. The for loop describes blocks PlayItem( ) corresponding to field number_of_PlayItems. Block PlayItem( ) is a play item itself.

Blocks PlayItem( ) of block PlayList are assigned identification information (ID). For example, block PlayItem( ) described at the beginning of block PlayList( ) is assigned for example 0. Blocks PlayItem( ) are assigned serial numbers in the order of appearance such as 1, 2, and so forth. The serial numbers are used as identification information of blocks PlayItem( ). Argument i of the for loop repeated for blocks PlayItem( ) can be used as identification information for blocks PlayItem( ). Block PlayItem( ) is followed by block PlayListMark( ).

Next, with reference to FIG. 20, an example of the internal structure of block PlayItem( ) will be described. Block PlayItem( ) starts with field length. Field length has a data length of 16 bits and represents the length of block PlayItem( ). Field length is followed by field Clip_Information_file_name_length. Field Clip_Information_file_name_length has a data length of 16 bits and represents the length of the name of the clip information file corresponding to block PlayItem( ). Field Clip_Information_file_name has a variable data length in bytes and represents the name of the clip information file corresponding to block PlayItem( ). In field Clip_Information_file_name, the area from the beginning for the byte length represented by field Clip_Information_file_name is used as a valid name. When a clip information file is designated by field Clip_Information_file_name, a clip AV stream file corresponding to the clip information file can be identified according to the above-described relationship of the file names.

Field IN_time and field OUT_time have a data length of 33 bits each. Field IN_time and field OUT_time are time information that designate the reproduction start position and the reproduction end position of a clip AV stream file corresponding to the clip information file designated by field Clip_Information_file_name in block PlayItem( ). With information of field IN_time and field OUT_time, the reproduction start position other than the beginning of the clip AV stream file can be designated. Likewise, with information of field IN_time and field OUT_time, the reproduction end position other than the end of the clip AV stream file can be designated. Field reserved_for_word_alignment is an adjustment field that causes the data length of the data structure to become a multiple of 16 bits. Field reserved_for_word_alignment has a data length of 15 bits.

Next, with reference to FIG. 21, an example of the internal structure of block PlayListMark( ) will be described. Block PlayListMark( ) starts with field length. Field length has a data length of 32 bits and represents the length of block PlayListMark( ). Field length is followed by field number_of_PlayList_marks. Field number_of_PlayList_marks has a data length of 16 bits and represents the number of blocks Mark( ). Field number_of_PlayList_marks is followed by a for loop. The for loop describes blocks Mark( ) corresponding to field number_of_PlayList_marks.

Next, an example of the internal structure of block Mark( ) will be described. Block Mark( ) starts with field mark_type. Field mark_type has a data length of 8 bits and represents the type of block Mark( ) including field mark_type. According to this embodiment of the present invention, as shown in FIG. 22, two types of marks, a chapter mark and an event mark, are defined. A chapter is a search unit that divides a play list (block PlayList( )). A chapter mark represents the chapter position with time information An event mark is a Mark that causes an event to occur.

Field mark_name_length has a data length of 8 bits and represents the length of the name assigned to block Mark( ). Field mark_name_string at the last line of block Mark( ) represents the name assigned to block Mark( ). In field mark_name_string, the area from the beginning for the byte length represented by field mark_name_length is used as a valid name.

Four elements of field ref_to_PlayItem_id, field mark_time_stamp, field entry_ES_stream_id, and field entry_ES_private_stream_id correlate block Mark( ) defined in block PlayList( ) with a clip AV stream file. In other words, field ref_to_PlayItem_id has a data length of 16 bits and represents identification information of block PlayItem( ). Thus, field ref_to_PlayItem_id identifies a clip information file and a clip AV stream file.

Figure 23:
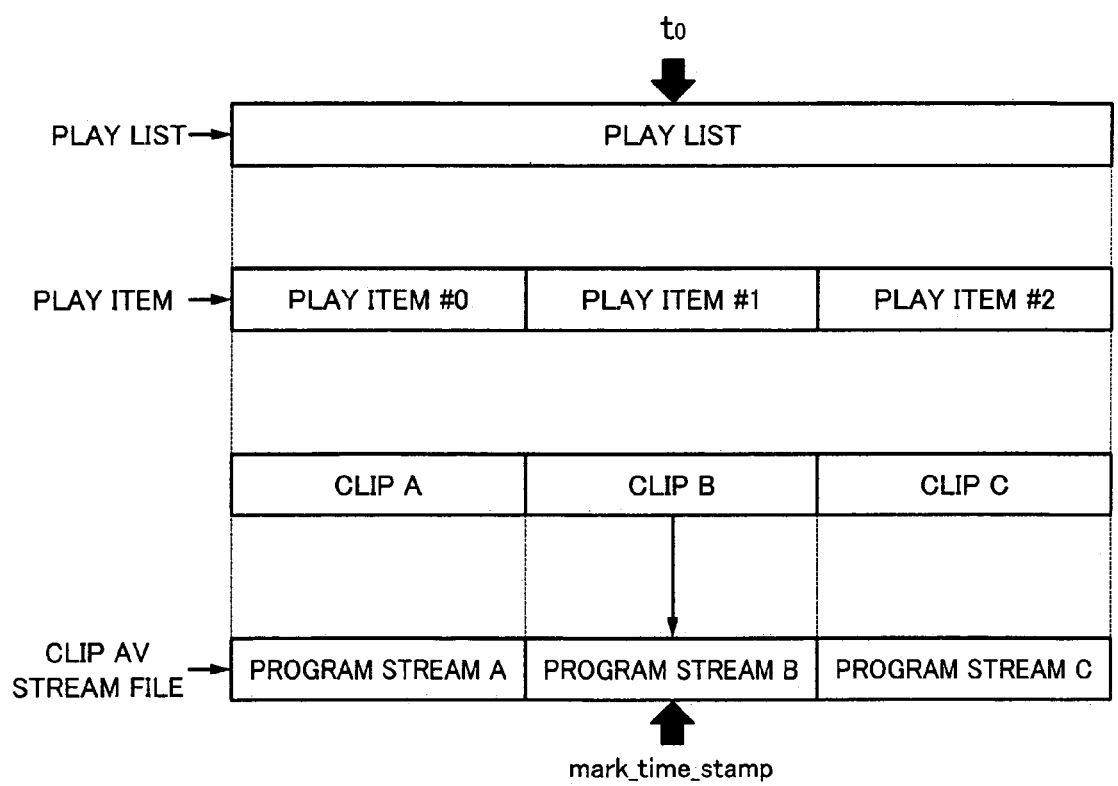
FIG. 23 is a schematic diagram describing the designation of a mark time in a clip AV stream file.

Field mark_time_stamp has a data length of 33 bits and designates the time of a mark in a clip AV stream file. Next, with reference to FIG. 23, field mark_time_stamp will be described in brief. In FIG. 23, a play list is composed of three play items assigned numbers 0, 1, and 2 (PlayItem(#0), PlayItem(#1), and PlayItem(#2)). It is assumed that time $t_0$ of the play list is contained in play item 1 (PlayItem(#1)). In addition, it is assumed that play items 0, 1, and 2 correspond to program streams A, B, and C of clip AV stream files through clip information files, respectively.

In this case, when a mark is designated to time $t_0$ of the play list, the value of field ref_to PlayItem_id is "1" that represents a play item including time $t_0$. In addition, time corresponding to time $t_0$ in the corresponding clip AV stream file is described in field mark_time_stamp.

Returning to the description of FIG. 21, field mark_time_stamp is followed by field entry_ES_stream_id and field entry_ES_private_stream_id. Field entry_ES_stream_id and field entry_ES_private_stream_id have a data length of 8 bits each. When block Mark( ) is correlated with a predetermined elementary stream, field entry_ES_stream_id and field entry_ES_private_stream_id identify the elementary stream. Field entry_ES_stream_id and field entry_ES_private_stream_id represent a stream ID (stream_id) of packets (packet( )) in which elementary streams are multiplexed and a private stream ID (private_stream_id) of a private packet header (private packet_header( )), respectively.

The stream ID (stream_id) of the packets (packet( )) and the private stream ID (private_stream_id) of the private packet header (private_packet_header( )) are based on provisions on a program stream of for example the MPEG2 system.

Field entry_ES_stream_id and field entry_ES_private_stream_id are used when the chapter structure of clip AV stream #0 is different from that of clip AV stream #1. When block Mark( ) is not correlated with a predetermined elementary stream, the values of these two fields are "0."

Next, with reference to FIG. 24 to FIG. 28, the internal structure of a clip information file will be described. As described above, clip information file "XXXXX.CLP" describes the characteristics and so forth of corresponding clip AV stream file "XXXXX.PS" placed under directory "STREAM."

FIG. 24 shows an example of syntax that represents the overall structure of clip AV stream file "XXXXX.CLP." Clip AV stream file "XXXXX.CLP" starts with field presentation_start_time and field presentation_end_time. Field presentation_start_time and field presentation_end_time have a data length of 33 bits each and represent the times of the beginning and end of the corresponding clip AV stream file. As time information, the presentation time stamp (PTS) of the MPEG2 system may be used. The PTS has an accuracy of 90 kHz.

Field presentation_start_time and field presentation_end_time are followed by field reserved_for_word_alignment that has a data length of 7 bits and flag capture_enable_flag_Clip that has a data length of 1 bits. Field reserved_for_word_alignment and flag capture_enable_flag_Clip having a data length of 1 bit align data in 16 bits in file "XXXXX.CLP." Flag capture_enable_flag_Clip is a flag that represents whether a moving picture contained in a clip AV stream file corresponding to file "XXXXX.CLP." is permitted to be secondarily used. For example, when the value of flag capture_enable_flag_Clip is for example "1," it represents that the moving picture of the clip AV stream file corresponding to file "XXXXX.CLP" is permitted to be secondarily used in the video player.

Field number_of_streams has a data length of 8 bits and represents the number of blocks StreamInfo( ) that follow. Field number_of_streams is followed by a for loop. The for loop describes blocks StreamInfo( ) corresponding to field number_of_streams. The for loop is followed by block EP_map( ).

Next, an example of the internal structure of block StreamInfo( ) will be described. Block StreamInfo( ) starts with field length. Field length has a data length of 16 bits and represents the length of block StreamInfo( ). Field length is followed by field stream_id and field private_stream that have a data length of 8 bits each. As shown in FIG. 25, block StreamInfo( ) is correlated with elementary streams. In the example shown in FIG. 25, when the value of field stream_id of block StreamInfo( ) is in the range from "0xE0" to "0xEF," block StreamInfo( ) is correlated with a video stream. When the value of field stream_id of block StreamInfo( ) is "0xBD," block StreamInfo( ) is correlated with an Adaptive Transform Acoustic Coding (ATRAC) audio stream, a Linear Pulse Code Modulation (LPCM) audio stream or a subtitle stream. When the value of field private_stream_id of block StreamInfo( ) is in the range from "0x00" to "0x0F," from "0x10" to "0x1F," and from "0x80" to "0x9F," block StreamInfo( ) is correlated with an ATRAC audio stream, an LPCM audio stream, and a subtitle stream, respectively.

In FIG. 25, "0x" represents hexadecimal notation. This notation applies to the following description.

Block StreamInfo( ) mainly describes two types of information, the first type not varying in a stream, the second type varying in a stream. Information that does not vary in a stream is described in block StaticInfo( ), whereas information that varies in a stream is described in block DynamicInfo( ) with change points designated with time information.

Block StaticInfo( ) starts with field reserved_for_word_alignment that has a data length of 8 bits. Field reserved_for_word_alignment aligns data in a byte in block StreamInfo( ). Field reserved_for_word_alignment is followed by field number_of_DynamicInfo. Field number_of_DynamicInfo has a data length of 8 bits and represents the number of blocks DynamicInfo( ) that follow. Field number_of_DynamicInfo is followed by a for loop. The for loop describes field pts_change_point and block DynamicInfo( ) repeated corresponding to field number_of_DynamicInfo.

Field pts_change_point has a data length of 33 bits and represents time at which information of block DynamicInfo( ) becomes valid with PTS. Time at which each stream starts is represented by field pts_change_point and is equal to field presentation_start_time defined in file "XXXXX.CLP."

Next, with reference to FIG. 26, an example of the internal structure of block StaticInfo( ) will be described. The contents of block StaticInfo( ) depend on the type of the corresponding elementary stream. The type of the corresponding elementary stream can be identified by the values of field stream_id and field private_stream_id as shown in FIG. 25. FIG. 26 shows block StaticInfo( ) whose contents vary depending on the type of an elementary stream, which is a video stream, an audio stream, or a subtitle stream using an if statement. Next, block StaticInfo( ) will be described according to the types of elementary streams. FIG. 26 shows block StaticInfo( ) that represents whether the type of the elementary stream is a video stream, an audio stream, or a subtitle stream using an if statement. Next, block StaticInfo( ) will be described according to the types of the elementary streams.

When the elementary stream is a video stream, block StaticInfo( ) is composed of field picture_size having a data length of 4 bits, field frame_rate having a data length of 4 bits, and flag cc_flag having a data length of 1 bit. Field picture_size and field frame_rate represent the picture size and the frame frequency of the video stream. Flag cc_flag represents whether the video stream contains a closed caption When the value of flag cc_flag is for example "1," the video stream contains a closed caption. Field reserved_for_word_alignment aligns data in 16 bits.

When the elementary stream is an audio stream, block StaticInfo( ) is composed of field audio_language_code having a data length of 16 bits, field channel_configuration having a data length of 8 bits, flag lfe_existance having a data length of 1 bit, and field sampling_frequency having a data length of 4 bits. Field audio_language_code represents a language code contained in the audio stream. Field channel_configuration represents a channel attribute of audio data such as monaural, stereo, multi-channel, or the like. Field lfe_existance represents whether the audio stream contains a low frequency emphasis channel. When the value of field lfe_existance is for example "1," the audio stream contains the low frequency emphasis channel. Field sampling_frequency represents the sampling frequency of audio data. Field reserved_for_word_alignment aligns data in 16 bits.

When the elementary stream is a subtitle stream, block StaticInfo( ) is composed of field subtitle_language_code having a data length of 16 bits and flag configurable_flag having a data length of 1 bit. Field subtitle_language_code represents a language code contained in the subtitle stream. Flag configurable_flag represents whether the size and position of characters of the subtitle stream that is displayed are permitted to be changed. When the value of flag configurable_flag is for example "1," it represents that the size and position of characters of the subtitle stream that is displayed are permitted to be changed. Field reserved_for_word_alignment aligns data in 16 bits.

Next, with reference to FIG. 27, an example of the internal structure of block DynamicInfo( ) will be described. Block DynamicInfo( ) starts with field reserved_for_word_alignment having a data length of 8 bits. Elements preceded by field reserved_for_word_alignment depend on the type of the elementary stream. The type of the elementary stream can be identified by the values of field stream_id and field private_stream_id described with reference to FIG. 25. FIG. 27 shows block DynamicInfo( ) whose contents vary depending on the type of an elementary stream, which is a video stream, an audio stream, or a subtitle stream using an if statement. Next, block DynamicInfo( ) will be described according to the types of elementary streams.

When the elementary stream is a video stream, block DynamicInfo( ) is composed of field display_aspect_ratio having a data length of 4 bits. Field display_aspect_ratio represents whether the display output aspect ratio of video data is 16:9 or 4:3. Field reserved_for_word_alignment aligns data in 16 bits.

When the elementary stream is an audio stream, block DynamicInfo( ) is composed of field channel_assignment having a data length of 4 bits. When the audio stream is composed of two channels, field channel_assignment represents whether the output is a stereo or a dual monaural. The dual monaural is used to reproduce for example bilingual audio data. Field reserved_for_word_alignment aligns data in 16 bits.

When the elementary stream is a subtitle stream, block DynamicInfo( ) is composed of field reserved_for_word_alignment. Field reserved_for_word_alignment aligns data in 16 bits. In other words, with respect to a subtitle stream, block DynamicInfo( ) does not define an attribute that dynamically varies.

Next, with reference to FIG. 28, an example of the internal structure of block EP_map( ) will be described. Block EP_map( ) represents a valid decode start position (referred to as an entry point or a random access point (RAP)) of a bit stream of each elementary stream with time information and position information. The position information may be the minimum access unit for a recording medium on which an elementary stream is recorded. Each elementary stream can be decoded from the position represented by block EP_map( ).

Since the valid decode start position of a fixed rate stream can be calculated, information such as block EP_map( ) is not necessary. On the other hand, for a variable rate stream and a stream whose data size varies in each access unit such as a stream according to the MPEG video compression-encoding system, block EP_map( ) is important information necessary for randomly accessing data.

Block EP_map( ) starts with field reserved_for_word_alignment having a data length of 8 bits. Field reserved_for_word_alignment aligns data in 16 bits. Field reserved_for_word_alignment is followed by field number_of_stream_id_entries. Field number_of_stream_id_entries has a data length of 8 bits and represents the number of elementary streams described in block EP_map( ). A first for loop describes field stream_id, field private_stream_id, and field number_of_EP_entries repeated corresponding to field number_of_stream_id_entries. In the first for loop, a second for loop describes field PTS_EP_start and field RPN_EP start repeated corresponding to field number_of EP_entries.

The first for loop describes field stream_id and field private_stream_id that have a data length of 8 bits each and identify the type of the elementary stream as shown in FIG. 25. Field stream_id and field private_stream_id are followed by field number_of_EP_entries. Field number_of_EP_entries has a data length of 32 bits and represents the number of entry points described in the elementary stream. The second for loop describes field PTS_EP_start and field RPN_EP_start repeated corresponding to field number_of_EP_entries.

Field PTS_EP_start and field RPN_EP_start have a data length of 33 bits each and represent entry points themselves. Field PTS_EP start represents time of an entry point in a clip AV stream file with the PTS. On the other hand, field RPN_EP_start represents the position of an entry point in a clip AV stream file in the unit of 2048 bytes.

According to this embodiment of the present invention, one sector as a disc access unit is 2048 bytes. Thus, field RPN_EP_start represents the position of an entry point of a clip AV stream file in sectors.

The valid reproduction start position of a video stream is immediately preceded by packet private_stream_2. Packet private_stream_2 is a packet that contains information that can be used to decode a video stream. Thus, the position of an entry point of a video stream is the position of pack pack( ) that contains packet private_stream_2.

Block EP_map correlates times of a clip AV stream and positions of a clip AV stream file. Thus, with time information (time stamp) of an access point of a clip AV stream, the clip AV stream file can be easily searched for a data address at which data are read. As a result, the disc can be smoothly accessed at random.

According to this embodiment of the present invention, in block EP_map( ), sets of time information and position information (sets of field PTS_EP_start and field RPN_EP_start in the second for loop) for each elementary stream are pre-registered in the ascending order (descending order). In other words, time information and position information have been rearranged in a predetermined direction. Thus, a binary search can be performed for the data.

According to this embodiment of the present invention, as described above, an elementary stream of video data is an elementary stream according to the MPEG2-Video Standard. However, this embodiment of the present invention is not limited to this example. For example, an elementary stream of video data may be an elementary stream according to the MPEG4-Visual Standard or the MPEG4-AVC Standard. Likewise, according to this embodiment of the present invention, as described above, an elementary stream of audio data is an elementary stream according to the ATRAC Audio System. However, this embodiment of the present invention is not limited to such an example. Instead, an elementary stream of audio data may be an elementary stream according to for example the MPEG1/2/4 Audio System.

7. Disc Reproduction Apparatus

Next, a disc reproduction apparatus according to an embodiment of the present invention will be described. FIG. 29 shows an example of the structure of a disc reproduction apparatus 100 according to an embodiment of the present invention. Connected to a bus 111 are a central processing unit (CPU) 112, a memory 113, a drive interface 114, an input interface 115, a video decoder 116, an audio decoder 117, a video output interface 118, and an audio output interface 119. Each section of the disc reproduction apparatus 100 can exchange a video stream, an audio stream various commands, data, and so forth with other sections through the bus 111.

In addition, a disc drive 102 is connected to the drive interface 114. The disc drive 102 exchanges data and commands with the bus 111 through the drive interface 114.

The CPU 112 has a read-only memory (ROM) and a random access memory (RAM) (not shown). The CPU 112 exchanges data and commands with each section of the disc reproduction apparatus 100 through the bus 111 according to a program and data pre-stored in the ROM and controls the entire disc reproduction apparatus 100. The RAM is used as a work memory of the CPU 112.

Although omitted in FIG. 29, the disc reproduction apparatus 100 can have a nonvolatile memory such as a flash memory that can rewrite data and hold it after the power of the disc reproduction apparatus 100 is turned off. The nonvolatile memory is connected to for example the bus 111 so that the CPU 112 writes data to the nonvolatile memory and reads data therefrom.

Supplied to the input interface 115 is an input signal that is input from an input device with which the user performs an input operation. The input device is for example a remote control commander with which the user remotely operates the disc reproduction apparatus 100 using for example an infrared signal and keys disposed on the disc reproduction apparatus 100. The input interface 115 converts an input signal supplied from the input device into a control signal for the CPU 112 and outputs the control signal.

Recorded on a disc 101 in the format shown in FIG. 18 to FIG. 28 are a play list, a script program, a clip information file, a clip AV stream file, and so forth. When the disc 101 is loaded into the disc drive 102, it reproduce them from the disc 101 automatically or according to a user's input operation. A script file, a play list file, and a clip information file that are read from the disc 101 are supplied to the CPU 112 and stored in for example a RAM of the CPU 112. The CPU 112 reads a clip AV stream file from the disc 101 according to data and a script program stored in the RAM.

The clip AV stream file, which is read from the disc 101, is temporarily stored in the memory 113. The video decoder 116 decodes a video stream and a subtitle stream of the clip AV stream file stored in the memory 113 according to a command received from the CPU 112. The CPU 112 performs an image process such as an enlargement process or a reduction process for the decoded video data and subtitle data, a synthesization process or an addition process for the video stream and subtitle stream, and obtains one stream of video data. The image process may be performed by the video decoder 116 and the video output interface 118. The video data are buffered in the memory 113 and supplied to the video output interface 118. The video output interface 118 converts the supplied video data into an analog video signal and supplies the analog video signal to a video output terminal 120.

Likewise, the audio decoder 117 decodes an audio stream of the clip AV stream file stored in the memory 113 according to a command received from the CPU 112. The decoded audio data are buffered in the memory 113 and supplied to the audio output interface 119. The audio output interface 119 converts the supplied audio data into for example an analog audio signal and supplies the analog audio signal to an audio output terminal 121.

In the example, each section shown in FIG. 29 is composed of independent hardware. However, this embodiment of the present invention is not limited to this example. In other words, the video decoder 116 and/or the audio decoder 117 may be composed of software that operates on the CPU 112.

The disc reproduction apparatus 100 has the CPU 112 and the memory and operates according to the program. Thus, it can be thought that the disc reproduction apparatus 100 is a kind of a computer device.

Figure 30B:
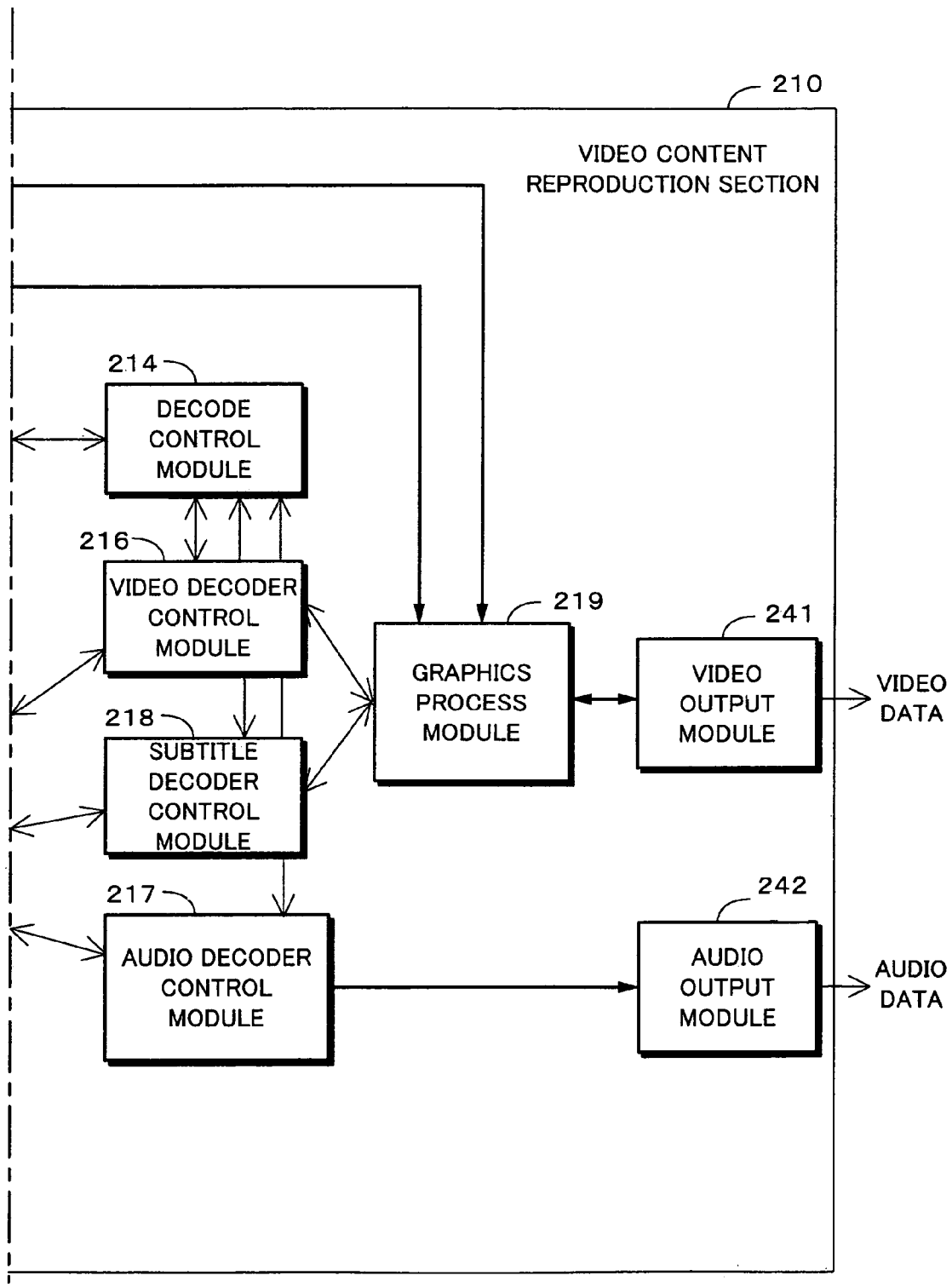
FIG. 30 is a functional block diagram describing an operation of the disc reproduction apparatus in detail.

FIG. 30 is a functional block diagram describing the operation of the disc reproduction apparatus 100 shown in FIG. 29 in detail. The disc reproduction apparatus 100 is mainly composed of an operation system 201 and a video content reproduction section 210. The video content reproduction section 210 is substantially a software program that operates on the operation system 201. Instead, the video content reproduction section 210 may be composed of software and hardware that integrally operate. In the following description, it is assumed that the video content reproduction section 210 is composed of software. In FIG. 30, the disc drive 102 is omitted.

When the power of the disc reproduction apparatus 100 is turned on, the operation system 201 initially starts up on the CPU 112 and performs necessary processes such as initial settings for each section, and reads an application program (in this example, the video content reproduction section 210) from the ROM. The operation system 201 provides basic services such as reading of a file from the disc 101 and interpreting of a file system to the video content reproduction section 210 while the video content reproduction section 210 is operating. For example, the operation system 201 controls the disc drive 102 through the drive interface 114 corresponding to a file read request supplied from the video content reproduction section 210 and reads data from the disc 101. The data that are read from the disc 101 are supplied to the video content reproduction section 210 under the control of the operation system 201.

The operation system 201 has a multitask process function that time-division controls a plurality of software modules virtually in parallel. In other words, each module that composes the video content reproduction section 210 shown in FIG. 30 can be operated in parallel by the multitask process function of the operation system 201.

Next, the operation of the video content reproduction section 210 will be described more specifically. The video content reproduction section 210 has other several internal modules and accomplishes the following functions.

(1) The video content reproduction section 210 determines whether the loaded disc 101 is a disc according to the UMD Video Standard (hereinafter this disc is referred to as the UMD video disc).

(2) When the determined result represents that the loaded disc 101 is the UMD video disc, the video content reproduction section 210 reads a resource file from the disc 101 and supplies the script file to a script control module 211.

(3) When the determined result represents that the loaded disc 101 is the UMD video disc, the video content reproduction section 210 also reads files that compose a database (namely, a play list file, a clip information file, and so forth) and supplies the files to a player control module 212.

Next, the operations of the modules of the video content reproduction section 210 will be described.

The script control module 211 stores the received resource file to for example a predetermined area of a RAM (not shown) of the CPU 112. The CPU 112 (script control module 211) reads the resource file from the RAM, interprets the resource file, and executes it. Instead, the resource file may be stored in a predetermine area of the memory 113 and when necessary, the resource file may be written to a RAM (not shown) of the CPU 112.

As described in the player model, GUIs that create and output images of the menu screen, move the cursor corresponding to a user's input, and change the menu screen are accomplished by a graphics process module 219 controlled according to the script program. At this point, with image data and sound data contained in the resource file stored in the memory 113, the menu screen and so forth are created. By executing the script program, the script control module 211 can control the player control module 212.

The player control module 212 references database information contained in files such as play list file "PLAYLIST.DAT" and clip information file "XXXXX.CLP" that are read from the disc 101 and performs the following controls to reproduce video contents from the disc 101.

(1) The player control module 212 analyzes database information such as a play list and clip information.

(2) The player control module 212 controls a content data supply module 213, a decode control module 214, and a buffer control module 215.

(3) The player control module 212 performs player state change controls such as a play state, a stop state, and a pause state and a reproduction control process such as a stream change according to a command received from the script control module 211 or the input interface 115.

(4) The player control module 212 obtains time information of a video stream that is being reproduced from the decode control module 214, displays time, and generates a mark event.

The content data supply module 213 reads content data such as a clip AV stream file from the disc 101 according to a command received from the player control module 212 and supplies the content data to the buffer control module 215. The buffer control module 215 stores the content data in the memory 113 as a substance 215A of the buffer. The content data supply module 213 controls the buffer control module 215 to supply the content data stored in the memory 113 to a video decoder control module 216, an audio decoder control module 217, and a subtitle decoder control module 218 according to requests therefrom. In addition, the content data supply module 213 reads content data from the disc 101 so that the content data stored under the control of the buffer control module 215 becomes a predetermined amount.

The decode control module 214 controls the operations of the video decoder control module 216, the audio decoder control module 217, and the subtitle decoder control module 218 according to commands received from the player control module 212. The decode control module 214 has an internal clock function and controls the operations of the video decoder control module 216, the audio decoder control module 217, and the subtitle decoder control module 218 so that video data and audio data are synchronously output.

The buffer control module 215 exclusively uses a part of the memory 113 as the substance 215A of the buffer. The buffer control module 215 stores a data start pointer and a data write pointer. The buffer control module 215 also has as internal modules a video read function, an audio read function, and a subtitle read function. The video read function has a video read pointer. The video read function has a register that stores information au_information( ) as access unit information. The audio read function has an audio read pointer. The subtitle read function has a subtitle read pointer and a subtitle read function flag. The subtitle read function flag controls enabling/disabling of the subtitle read function according to its value. When for example "1" is written to the subtitle read function flag, the subtitle read function is enabled. When for example "0" is written to the subtitle read function flag, the subtitle read function is disabled.

The video read function, the audio read function, and the subtitle read function, which are internal modules of the buffer control module 215, have demultiplexer functions that demultiplex a multiplexed clip AV stream, of which a video stream, an audio stream, and a subtitle stream have been multiplexed, and obtain the video steam, the audio stream, and the subtitle stream. According to this embodiment of the present invention, a clip AV stream is formed of a plurality of elementary streams that are time-division multiplexed according to the MPEG2 system program stream format. Thus, the video read function, the audio read function, and the subtitle read function have a demultiplexer function for MPEG2 system program streams.

Consequently, the video read function reads the value of field stream_id (see FIG. 25) placed at a predetermined position of the video stream and holds the value. Likewise, the audio read function and the subtitle read function read the values of field stream_id and field private_stream_id (see FIG. 25) and hold the values. The values of field stream_id and field private_stream_id are used to analyze the supplied bit stream.

The video decoder control module 216 causes the video read function of the buffer control module 215 to read one video access unit of the video stream from the memory 113 and supply the video access unit to the video decoder 116. The video decoder control module 216 controls the video decoder 116 to decode the video stream supplied to the video decoder 116 in the access unit and generate video data. The video data are supplied to the graphics process module 219.

Likewise, the audio decoder control module 217 causes the audio read function of the buffer control module 215 to read one audio access unit of the audio stream from the memory 113 and supply the audio stream unit to the audio decoder 117. According to this embodiment of the present invention, the access unit (audio frame) that composes an audio stream has a predetermined fixed length. The audio decoder control module 217 controls the audio decoder 117 to decode the audio stream supplied to the audio decoder 117 in the access unit and generate audio data. The audio data are supplied to an audio output module 242.

The subtitle decoder control module 218 causes the subtitle read function of the buffer control module 215 to read one subtitle access unit of the subtitle stream from the memory 113 and supply the subtitle access unit to the subtitle decoder control module 218. According to this embodiment of the present invention, the subtitle access unit that composes the subtitle stream contains length information at the beginning. The subtitle decoder control module 218 has a subtitle decode function that can decode the supplied subtitle stream and generate subtitle image data. The subtitle image data are supplied to the graphics process module 219.

As described above, the video data decoded by the video decoder 116 under the control of the video decoder control module 216 and the subtitle image data decoded by the subtitle decoder control module 218 are supplied to the graphics process module 219. The graphics process module 219 adds the subtitle image data to the supplied video data in a predetermined manner and generates a video signal that is output. The graphics process module 219 generates the menu image and the message image according to commands received from the script control module 211 and the player control module 212 and overlays them with the output video signal.

For example, the graphics process module 219 performs an enlargement process and a reduction process for the supplied subtitle image data and adds the processed image data to the video data in a predetermined manner according to a command received from the script control module 211.

In addition, the graphics process module 219 converts the aspect ratio of the output signal according to the aspect ratio of the predetermined output video device and the output aspect ratio designated in the content reproduced from the disc 101. When the aspect ratio of the output video device is 16:9 and the output aspect ratio is 16:9, the graphics process module 219 directly outputs the video data. When the aspect ratio of the output video device is 16:9 and the output aspect ratio is 4:3, the graphics process module 219 performs a squeezing (reduction) process that matches the height of the image with the height of the screen of the output video device, inserts black portions into left and right sides of the image, and outputs the resultant image. When the aspect ratio of the output video device is 4:3 and the output aspect ratio is 4:3, the graphics process module 219 directly outputs the video data. When the aspect ratio of the output video device is 4:3 and the output aspect ratio is 16:9, the graphics process module 219 performs a squeezing process that matches the width of the image with the width of the screen of the output video device, inserts black portions into the upper and lower areas of the image, and outputs the resultant image.

The graphics process module 219 also performs a process that captures the video signal that is being processed according to a request from the player control module 212 and supplies the requested video signal thereto.

A video output module 241 exclusively uses a part of the memory 113 as a first-in first-out (FIFO) buffer. The video output module 241 temporarily stores video data processed by the graphics process module 219 in the buffer and reads the video data therefrom at predetermined timing. The video data that are read from the buffer are output from the video output interface 118.

The audio output module 242 exclusively uses a part of the memory 113 as a FIFO buffer. The audio output module 242 stores audio data that are output from the audio output interface 119 to the buffer and reads the audio data therefrom at predetermined timing. The audio data that are read from the buffer are output from the audio output interface 119.

When the audio mode of the content is dual monaural (for example, bilingual), the audio output module 242 outputs the audio data according to a predetermined audio output mode. When the audio output mode is "main audio," the audio output module 242 copies audio data of the left channel in for example the memory 113 and outputs audio data of the left channel and audio data of the memory 113. Thus, the audio output module 242 outputs audio data of only the left channel. When the audio output mode is "sub audio," the audio output module 242 copies audio data of the right channel in for example the memory 113 and outputs audio data of the right channel and audio data of the memory 113. Thus, the audio output module 242 outputs audio data of only the right channel. When the audio output mode is "main and sub audio" or the content is stereo, the audio output module 242 directly outputs the audio data.

The user can interactively sets the audio output mode on for example the menu screen that the video content reproduction section 210 generates.

A nonvolatile memory control module 250 writes data to an area in which data are not erased after the operation of the video content reproduction section 210 is completed (this area is referred to as a nonvolatile area) and reads data therefrom according to a command received from the player control module 212. The nonvolatile memory control module 250 has a function that stores a plurality of sets of data Saved_Player_Status and data Saved_Player_Data with a key of a title identification ID (Title_ID). The nonvolatile memory control module 250 stores Backup_Player_Status that the player control module 212 has as data Saved_Player_Status data. Data Backup_Player_Status corresponds to data of for example the player state 323B that exists immediately before the operation of the player control module 212 is completed. Data Saved_Player_Status corresponds to the resume information 324. In addition, the nonvolatile memory control module 250 stores data User_Data that the player control module 212 has as data Saved_User_Data. Data User_Data are predetermined data that the user sets to the player control module 212.

The nonvolatile memory control module 250 correlatively stores a set of data Saved_Player_Status and data Saved_User_Data with the title ID of the disc 101 in a predetermined area of the flash memory of the disc reproduction apparatus 100. The storage medium in which the nonvolatile memory control module 250 stores data is not limited to a flash memory, but a hard disk or the like.

8. State Change Model of Movie Player 8-1. Definition of States of Movie Player

Next, a state change model of the movie player 300 according to an embodiment of the present invention will be described in detail. According this embodiment of the present invention, only the internal states of the movie player 300 are defined. In other words, according to this embodiment of the present invention, the states of the movie player 300 are defined on the basis of the operations and functions thereof.

More specifically, with respect to the operations of the movie player 300, from a view point of the reproduction of a play list, two states of which the movie player 300 is in the play state or the stop state are defined. In addition, with respect to the functions of the movie player 300, two states of whether the movie player 300 accepts control commands from the native implementation platform 301 are defined.

Figure 31:
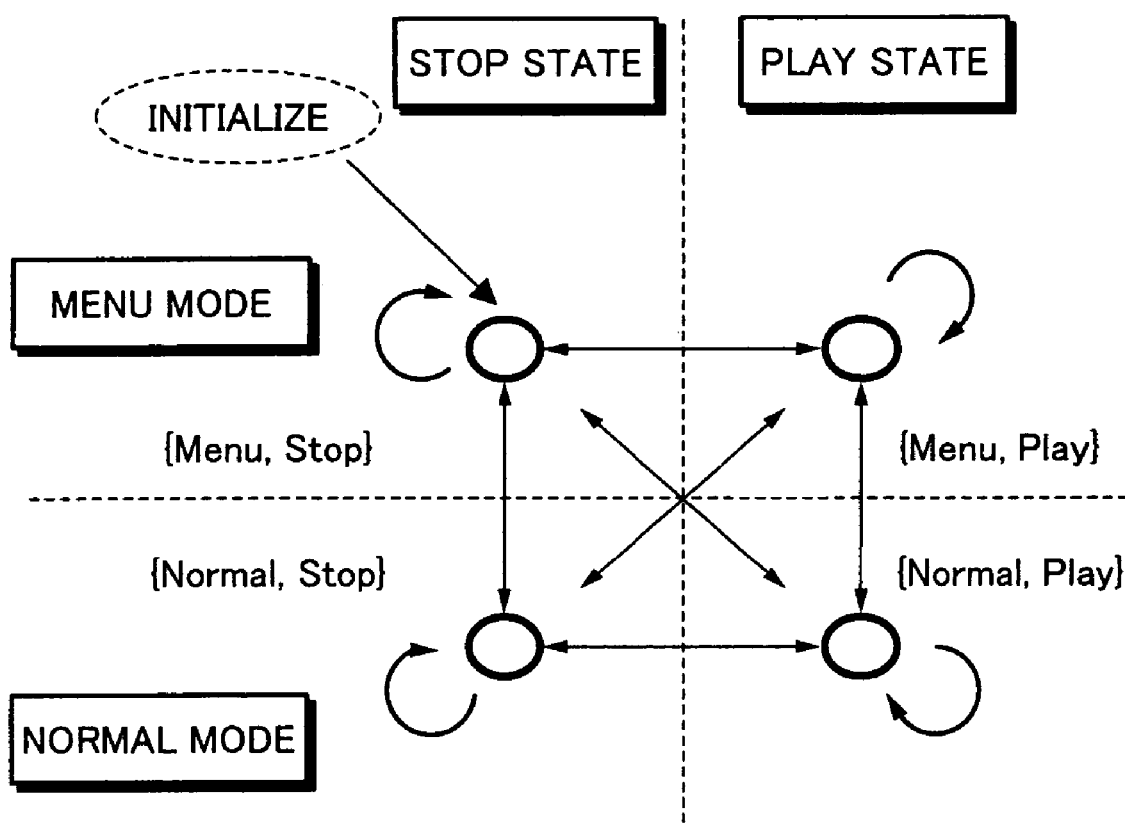
FIG. 31 is a schematic diagram showing the definitions of states of the movie player according to an embodiment of the present invention.

FIG. 31 conceptually shows the definitions of the states of the movie player 300 according to this embodiment of the present invention. First, with respect to the operations of the movie player 300, the states thereof will be described. With reference to FIG. 3, from a view point of the reproduction of a play list, the movie player 300 is in the play state or the stop state. In the play state, the movie player 300 has selected a play list and is reproducing the selected play list. In the stop state, the movie player 300 is not reproducing a play list. In the stop state, the movie player 300 has not selected a play list. In other words, it can be said that the state that the playback module 321 of the movie player 300 is decoding a clip AV stream is the play state and the state that the playback module 321 is not decoding a clip AV stream is the stop state.

The play state is sub-divided into several states. In other words, the play state is sub-divided into normal reproduction of forward normal speed, variable speed reproductions other than normal speed in forward direction and reverse direction, and pause. Step forward and step reverse reproductions are accomplished by alternately performing the normal reproduction and pause. The state that the movie player 300 is reproducing a play list has the same meaning as the movie player 300 is in the play state.

Next, with respect to the functions of the movie player 300, their states will be described. With respect to the functions of the movie player 300, it has a mode in which the movie player 300 accepts the control command 311 from the native implementation platform 301 (this mode is referred to as the normal mode) and a mode in which the movie player 300 ignores the control command 311 (this mode is referred to as the menu mode). The two operation modes of the movie player 300 are defined as states thereof.

In the normal mode, the operation of the movie player 300 can be controlled by the user's input 310 not through a script program in the script layer 302.

On the other hand, in the menu mode, the movie player 300 does not accept the control command 311. The movie player 300 accepts only the method 313 from the script layer 302. Thus, the operation of the movie player 300 can be controlled by a script program in the script layer 302. For example, the user's input 310 is supplied as the event 314 from the native implementation platform 301 to the script layer 302. The script program in the script layer 302 controls the operation of the movie player 300 with the method 313 corresponding to the key event 314.

In other words, with the menu mode, the content creator side can control the operations of the movie player 300. In addition, with the menu mode, various controls can be accomplished using small kinds of keys.

Thus, with respect to the operations, the movie player 300 has two states, which are the play state and the stop state. In addition, with respect to the functions, the movie player 300 has two modes, which are the normal mode and the menu mode. Thus, in the movie player 300, four states as combinations of the two operational states and two functional states are defined. In other words, after the movie player 300 is generated until it is eliminated, the movie player 300 is in one of these four states. The generation and elimination of the movie player 300 will be described later.

When the method 313 that causes the movie player 300 to change the existing state to another state is issued, in the model, the movie player 300 quickly changes the existing state to another state according to the method 313. In a real device, time after the method 313 is issued to the movie player 300 until the movie player 300 has changed the existing state to another state according to the method 313 depends on the implementation of the device.

When the method 313 that causes the movie player 300 that is in a particular state to change the existing state to the same state, the state of the movie player 300 does not change. For example, when the movie player 300 is in the normal mode and in the stop state, even if the method 313 that causes the movie player 300 to change the existing mode and state to the normal mode and the stop state, the existing mode and state of the movie player 300 do not change.

The pause state is included in the play state. To cause the movie player 300 to change the stop state to the pause state, method play( ) with an argument of value pauseMode that designates pause is used.

Next, four states as combinations of the two states and two operation modes of the movie player 300 and state changes among the four states will be described. In the following description, the normal mode and the menu mode of the functional modes of the movie player 300 are referred to as "normal" and "menu," respectively. On the other hand, the play state and the stop state of the operation states of the movie player 300 are referred to as "play" and "stop," respectively. The combinations of the modes and states of the movie player 300 are conveniently denoted by state (mode, state). In the following description, changes of states and modes of the movie player 300 are referred to as state changes.

As is clear from FIG. 31, the movie player 300 has a total of 16 state changes including state changes from the existing state to the same state, namely 4×4=16 state changes. These state changes are performed by the method 313 that is supplied from the script layer 302 to the movie player 300. In other words, the state changes of the movie player 300 are performed outside the movie player 300. In other words, the state changes are not automatically performed in the movie player 300 without methods supplied from the script layer 302. In addition, state changes are not preformed in the movie player 300 with control commands supplied from the native implementation platform 301.

According to this embodiment of the present invention, since combinations of arguments of the method 313 are restricted, it is impossible to perform all 16 state changes that are possible in the movie player 300 with the method.

Next, four states, which are State{Menu, Stop}, State{Normal, Stop}, State{Menu, Play}, and State{Normal, Play}, which are possible in the movie player 300, will be described one after the other.

(1) State{Menu, Stop}

The movie player 300 is not reproducing a play list (in the stop state) and is not accepting the control command 311 from the native implementation platform 301. This state is used for a menu screen or the like on which a moving picture is not reproduced in the background.

To allow a script program to securely control the movie player 300 that has been just generated, it is effective for the movie player 300 not to accept the control command 311 from the native implementation platform 301. Thus, immediately after the movie player 300 is generated, it is placed in State{Menu, Stop}.

(2) State{Normal, Stop}

The movie player 300 is not reproducing a play list (in the stop state), and is accepting the control command 311 from the native implementation platform 301. This state is used when the movie player 300 is not reproducing for example a moving picture. Since the movie player 300 accepts the control command 311 in this state, it is preferred not to use this state immediately after the movie player 300 is generated.

(3) State{Menu, Play}

The movie player 300 is reproducing a play list (in the play state) and is not accepting the control command 311 from the native implementation platform 301. This state is used for a menu screen or the like on which the movie player 300 is reproducing a moving picture in the background.

(4) State{Normal, Play}

The movie player 300 is reproducing a play list (in the play state) and is accepting the control command 311 from the native implementation platform 301. This state is used while the movie player 300 is reproducing a main part of a video content.

Next, a model of which the movie player 300 is generated will be described in brief. For example, when the power of the disc reproduction apparatus 100 is turned on and the operation system 201 gets started by the CPU 112, necessary processes such as initial settings for individual sections are performed. In addition, the video content reproduction section 210 is called from the ROM. The video content reproduction section 210 is executed by the CPU 112. As a result, the movie player 300 is generated. When the power of the disc reproduction apparatus 100 is turned off, the movie player 300 is eliminated.

The movie player 300 is assumed to be an implicit object. Thus, it is not necessary for a script program to explicitly generate the movie player 300.

As described above, immediately after the movie player 300 is generated, it is placed in the menu mode and the stop state (State{Menu, Stop}). Immediately after the movie player 300 is generated, the following properties that the movie player 300 has become indefinite.

Property audioFlag
Property audioNumber
Property chapterNumber
Property playListNumber
Property playSpeed
Property subtitleFlag
Property subtitleNumber
Property videoNumber When the movie player 300 is initialized, the UMD video player that has a "resume reproduction function" that resumes the reproduction to the previous stop position can set values stored in the nonvolatile memory, instead of default values of the properties. For example, the resume information 324 can be used.

8-2. Methods that Cause Movie Player to Change States

Next, the method 313 that causes the movie player 300 to change the existing state to another state will be described. FIG. 32 shows the combinations of the four states of the movie player 300 with respect to the existing State{Mode, State} and State{Mode, State} changed by the method 313. As is clear from FIG. 32, as the method 313 that causes the movie player 300 to change the existing state to another state, there are method Stop( ), method play( ), and method resume( ). The operation of the movie player 300 caused by method resume( ) depends on whether the resume information 324 is present.

Next, method stop( ) will be described. Method stop( ) causes the movie player 300 to change the existing state to the stop state regardless of the existing mode. Method stop( ) has an argument for a mode. Method stop( ) with an argument allows the movie player 300 to change the existing state and mode to the stop state and the mode designated by the argument. As will be described later, when method stop( ) is executed with a particular condition satisfied, the player state 323B is backup up and held as the resume information 324.

Next, method play( ) will be described. Method play( ) causes the movie player 300 to change the existing state to the play state. Method play( ) can have an argument for a mode. Method play( ) allows the movie player 300 to change the existing state and mode to the play state and the state designated by the argument. As will be described later, when method play( ) is executed with a particular condition satisfied, the player state 323B is backed up and held as the resume information 324.

Next, method resume( ) will be described. Method resume( ) is a method that restores the resume information 324 to the player state 323B and resumes the reproduction of the movie player 300. In other words, method resume( ) causes the movie player 300 to resume the reproduction from the position represented with the resume information 324. When method resume( ) is executed without the resume information 324, the movie player 300 does not change.

The conditions of which method resume( ) causes the movie player 300 to restore the resume information 324 are as follows. When method resume( ) is executed, if the resume information 324 is present and the existing state is not State{Normal, Play}, the movie player 300 restores the resume information 324. In other words, when method resume( ) is executed, if the resume information 324 is present and the existing state is one of State{Menu, Stop}, State{Normal, Stop}, and State{Menu, Play}, method resume( ) causes the movie player 300 to change the existing state to State{Normal, Play} and restore the resume information 324.

Method play( ) has a plurality of arguments. For simplicity, it is assumed that method play( ) has three types of arguments that are argument pauseMode, argument menuMode, and argument playListNumber. Specifically, more arguments are defined for method play( ).

Argument pauseMode designates the reproduction mode in the play state. Argument pauseMode has value "x1," value "pause," or value "−1." Value "x1" designates the normal forward reproduction Value "pause" designates the pause. Value "−1" designates the retention of the existing reproduction speed. Thus, argument pauseMode designates the details of the play state of the movie player 300 after the execution of method play( ). When value "pause" is designated, a picture designated by an argument is displayed and the movie player 300 is paused. In this case, if a picture is not designated by an argument, a picture designated according to a predetermined selection rule is displayed and the movie player 300 is paused.

Argument menuMode designates the mode of the movie player 300 (the normal mode or the menu mode) and has one of value "Normal," value "Menu," and value "−1." Value "Normal" designates the normal mode. Value "Menu" designates the menu mode. Value "−1" designates the retention of the existing mode.

Argument playListNumber designates the number of a play list to be reproduced. Argument playListNumber can be omitted. In this case, the currently selected play list is not changed.

Next, with reference to FIG. 33A to FIG. 33E, examples of the state changes of the movie player 300 upon the execution of method play( ) will be described. In FIG. 33A to FIG. 33E, the left side represents a existing state 340A of the movie player 300, whereas the right side represents a changed state 340B after the script program issues the method 313 to cause the movie player 300 to change the existing state 340A. Indicated below the states 340A and 340B are play list numbers (PL1 and PL2) that have been designated in these states.

Figure 33A:
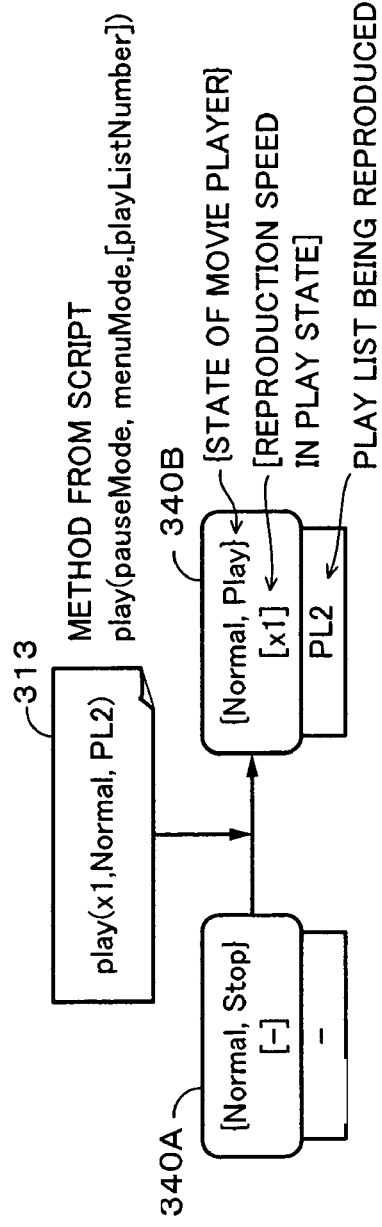
FIG. 33A to FIG. 33E are schematic diagrams describing examples of state changes of the movie player upon the execution of method play( )

FIG. 33A shows an example in the case that method play (x1, Normal, PL2) is issued to the movie player 300 that is in State{Normal, Stop}. Method play(x1, Normal, PL2) causes the movie player 300 to reproduce the play list of play list number "PL2" in the normal mode and at the normal speed. The movie player 300 has changed State{Normal, Stop} to State{Normal, Play}.

Figure 33B:
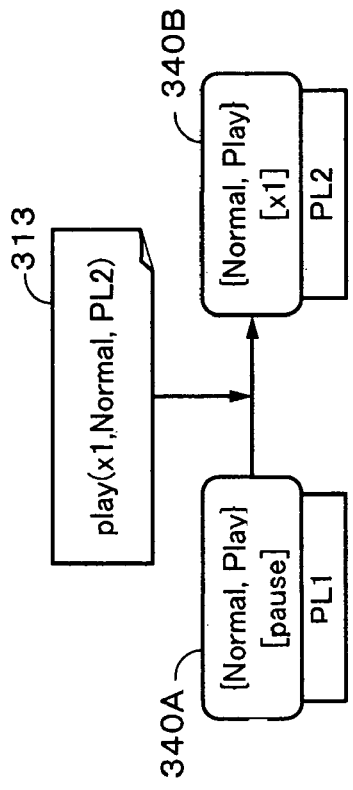

FIG. 33B is an example in the case that method play(x1, Normal, PL2) is issued to the movie player 300 that is in State{Normal, Play} of which the movie player 300 is in the pause state during the reproduction of the play list of play list number "PL1." Method play(x1, Normal, PL2) causes the movie player 300 to change the existing state to a state of which the movie player 300 starts reproducing the play list of play list number "PL2" in the normal mode and at the normal speed. In this case, although the reproduction operation of the movie player 300 is changed from the pause to the normal forward reproduction, the state is kept in State{Normal, Play} before and after method play(x1, Normal, PL2) is issued. Thus, the movie player 300 has not changed the existing state to another state.

Figure 33C:
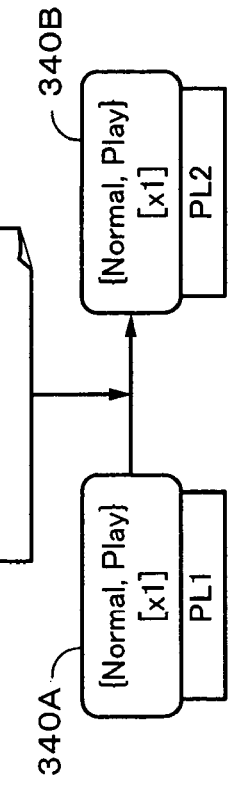

FIG. 33C is an example in the case that method play(−1, −1, PL2) is issued to the movie player 300 that is in State{Normal, Play} of which the movie player 300 is reproducing the play list of play list number "PL1" in the forward direction at the normal speed. Method play(−1, −1, PL2) causes the movie player 300 to change the existing step to a state of which the movie player 300 reproduces the play list of play list number "PL2" in the normal mode at the normal speed. In this case, although the play list that the movie player 300 is reproducing is changed, the state is kept in State{Normal, Play}. Thus, the movie player 300 has not changed the existing state to another state.

Figure 33D:
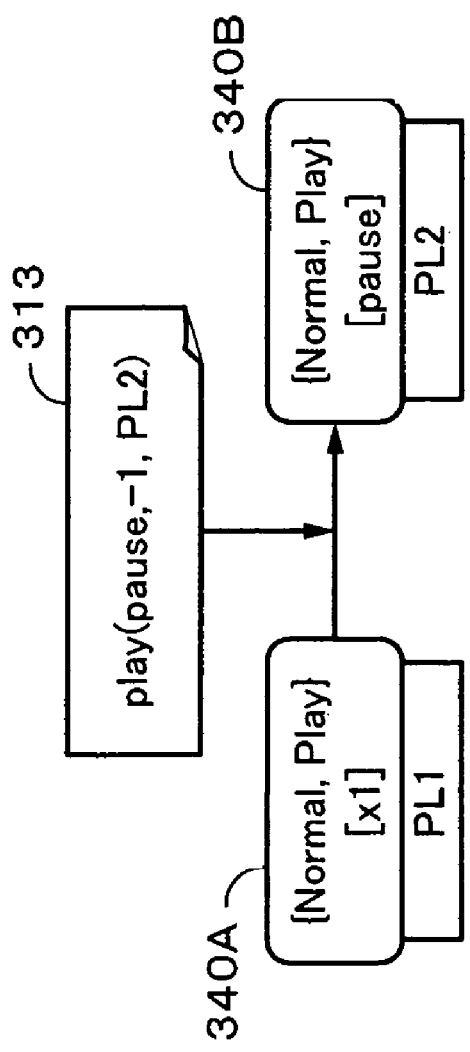

FIG. 33D is an example in the case that method play(pause, −1, PL2) is issued to the movie player 300 that is in State{Normal, Play} of which the movie player 300 is reproducing the play list of play list number "PL1" in the forward direction at the normal speed. Method play(pause, −1, PL2) causes the movie player 300 to select the play list of play list number "PL2" and pause at the beginning of the play list of play list number "PL2" in the normal mode. In this case, although the reproduction operation of the movie player 300 is changed from the forward normal speed reproduction to the pause, the state is kept in State{Normal, Play}. Thus, the movie player 300 has not changed the existing state to another state.

Figure 33E:
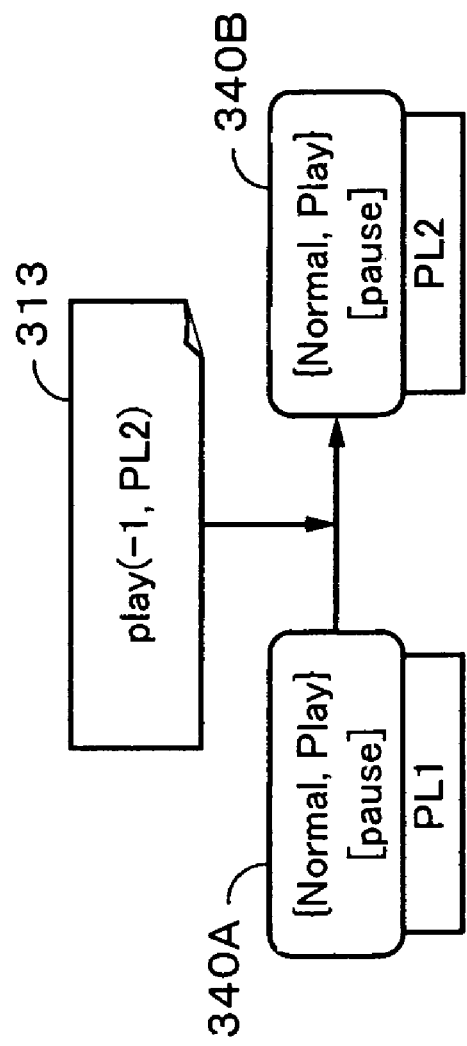

FIG. 33E is an example in the case that method play(−1, Menu) is issued to the movie player 300 that is in State{Normal, Play} of which the movie player 300 pauses during the reproduction of the play list of play list number "PL1". In method play( ), argument playListNumber is omitted. Method play(−1, Menu) causes the movie player 300 to select the play list of play list number "PL1" and pause at the beginning of the play list of play list number "PL1" in the menu mode. The movie player 300 has changed State{Normal, Play} to State{Menu, Stop}.

Thus, the movie player 300 receives method play( ) from the script program the movie player 300 performs various operations. AT this point, depending on a condition, the movie player 300 changes the existing state to another state. When the content creator describes method play( ) with different arguments in the script program, various operations of the movie player 300 can be accomplished.

Only when the movie player 300 executes method play( ) received from the script program, the movie player 300 starts reproducing a play list of a selected play list number. When the reproduction of a play list is started, the movie player 300 that is in the stop state may start reproducing the play list or the movie player 300 that is reproducing the play list may stop reproducing it, select a new play list, and start reproducing the new play list.

When the script program issues method play( ) with an argument to the movie player 300, the value of the argument is set to the player state 323B. When an argument of method play( ) is omitted, a default value or a predetermined value according to the rule for each parameter is set to the player state 323B.

It is not desired to allow a play list to be reproduced in the order that the content creator does not intend. Thus, the control command 311 corresponding to a user's operation is prohibited from causing a play list to be reproduced with a play list number. This is one of features of the operation model of the movie player 300 according to this embodiment of the present invention.

If an invalid play list and a non-existing time is designated for the value of an argument of method play( ), the execution of method play( ) will fail. This means that the script program contains an error and violates the standard. The error handling at this point depends on the implementation of the movie player 306.

Figure 34:
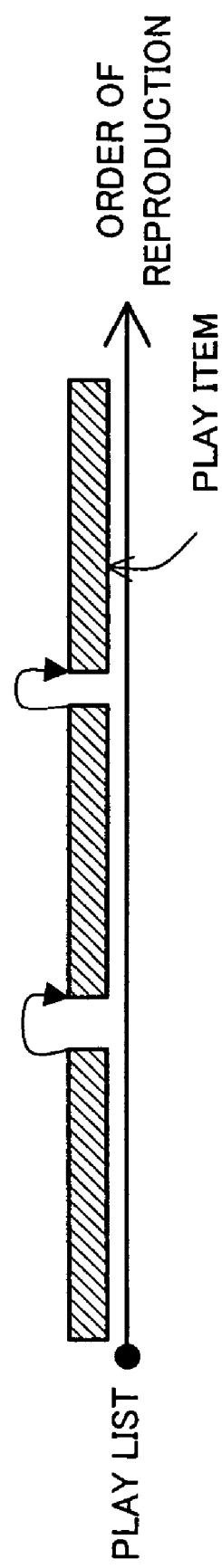
FIG. 34 is a schematic diagram describing a reproduction method of a play item.

Next, the reproduction of a plurality of play items will be described. Once the movie player 300 starts reproducing a play list, the movie player 300 continues to reproduce it until it comes to the end. The reproduction of a play list from the beginning to the end does not need a user's operation and a control of the script program. As shown in FIG. 34, the movie player 300 reproduces play items that compose a play list as designated in play list file "PLAYLIST.DAT" (see FIG. 19). The play items that compose the play list are successively reproduced without control of event handlers.

The operation of the movie player 300 after it reproduces one play item until it reproduces the next play item depends on the implementation thereof, not defined in a format. For example, whether the last picture of a play item is continuously displayed or a black picture is displayed depends on the implementation of the movie player 300. However, when an authoring process of which for example an IN point of a play item is set to a random access point (entry point, see FIG. 28) is performed, the gap time of two play items can be decreased as much as possible.

8-3. Operation of Movie Player During Reproduction of Play List

Next, the operation of the movie player 300 during the reproduction of a play list will be described. A user's variable speed reproduction command for a high speed reproduction such as double-speed reproduction or triple-speed reproduction, low speed reproduction such as ½ speed reproduction, and reveres reproduction is input as the user's input 310 to the native implementation platform 301. Corresponding to the user's input 310, a control command 311 that depends on the implementation of the movie player 300 is supplied from the native implementation platform 301 to the movie player 300.

The speeds of the variable speed reproductions depend on the implementation of the movie player 300. A command having an argument of "faster" or "slower" with which a speed can be designated is supplied from the native implementation platform 301 to the movie player 300. The movie player 300 converts the command into a real speed. The method that accomplishes variable speed reproductions depends on the implementation of the movie player 300. The script program can know the speed that the movie player 300 has designated with method getPlayerStatus( ).

In contrast, method play( ) that the script program sends to the movie player 300 does not designate a speed with an argument. Method play( ) designates only pause (with argument "pause") and normal speed reproduction (with argument "x1").

After the movie player 300 reproduces a play list in the forward direction at a variable reproduction speed, when the existing play item comes to the end, the movie player 300 reproduces the next play item. At this point, the movie player 300 reproduces the next play item in the same direction and at the same reproduction speed to continue the variable speed reproduction.

FIG. 35 shows examples of operations of the movie player 300 when a play list that the movie player 300 is reproducing comes to the beginning or end. After the movie player 300 reproduces a play list in the forward direction, when the play list comes to the end, the movie player 300 displays the last picture and pauses. To clear the last picture, it is necessary to explicitly cause the movie player 300 to stop with method stop( ) described in event handler onPlayListEnd.

When the movie player 300 performs a high speed reproduction at a higher speed than the normal speed, at the end of a play list even if the last picture of the play list is not a jump point, the movie player 300 displays the last picture of the play list.

After the movie player 300 reproduces a play list in the reverse direction, when the existing play list comes to the beginning, the movie player 300 reproduces the preceding play item, namely a chronologically preceding play item in the forward direction. The movie player 300 reproduces the preceding play item from the end to the beginning in the reverse direction at the same reproduction speed. When the play list that the movie player 300 is reproducing comes to the beginning in the reverse direction, the movie player 300 cancels the variable speed reproduction and pauses at the beginning of the play list.

In addition, the movie player 300 pauses with the control command 311 that causes the movie player 300 to pause. When the pause state of the movie player 300 is cancelled, the reproduction direction and the reproduction speed of the play list depends on the implementation of the movie player 300.

Next, events that occur during the reproduction of a play list will be described. As described with reference to FIG. 13, events that occur during the reproduction of a play list are event angleChange, event audioChange, and event subtitleChange corresponding to user's operations and event chapter and event mark corresponding to marks embedded in a play list. Examples of operations upon the occurrence of events are described with reference to FIG. 15.

Next, a process performed at the end of a play list will be described. As described above, the movie player 300 reproduces a play list of play list number designated with method play( ). Once the movie player 300 starts reproducing a play list, the movie player 300 continues to reproduce the play list until it comes to the end without controls of the script program and the control command 311. When the play list the movie player 300 reproduces comes to the end, the movie player 300 informs the script program of event playListEnd no matter how the play list comes to the end. In other words, when the play list comes to the end regardless of whether the movie player 300 performs the normal reproduction, the fast forward reproduction, or the jump reproduction from another play list, the movie player 300 generates event playListEnd.

When the play list that the movie player 300 is reproducing comes to the end and event playListEnd occurs, the movie player 300 pauses and the reproduction time of the play list that the movie player 300 stores matches the last time of the play list. The last time of the play list is the reproduction end time of the last picture of the play list and matches the OUT point of the last play item on the reproduction time axis.

Event playListEnd can be used to successively reproduce a play list and display a menu at a branch point of a multiple story.

When the script program has event handler onPlayListEnd as a program executed upon the occurrence of event playListEnd, the script program executes event handler onPlayListEnd. When event handler onPlayListEnd describes method play( ) that causes the movie player 300 to start reproducing another play list, the movie player 300 starts reproducing the play list. In such a manner, the movie player 300 continues to reproduce the play list.

Figure 36:
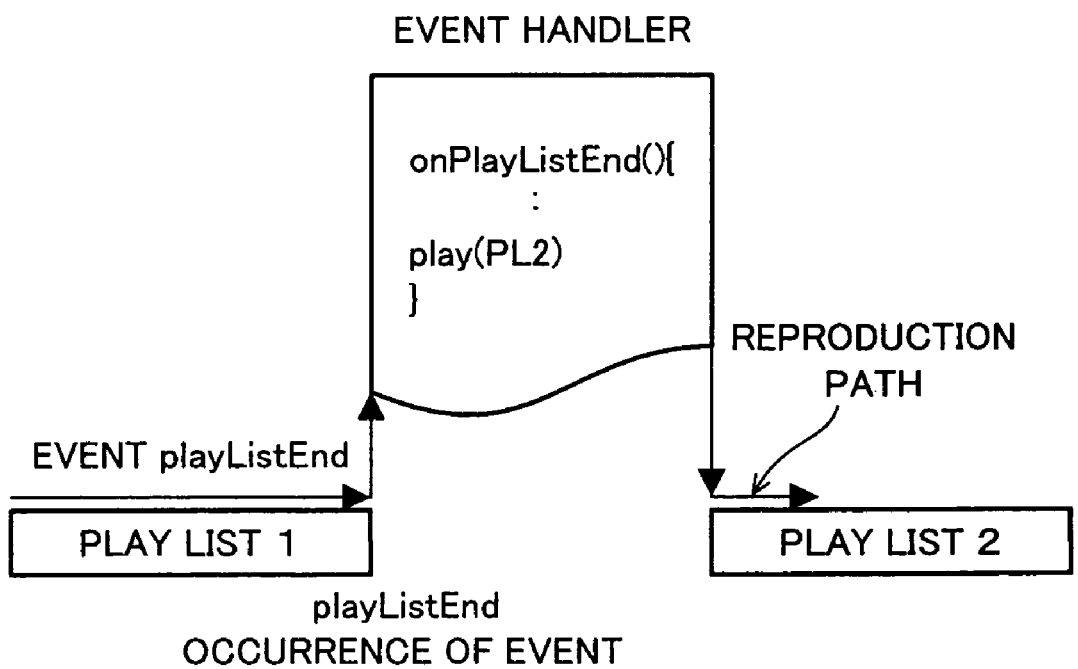
FIG. 36 is a schematic diagram describing the reproduction between play lists.

Next, with reference to FIG. 36, this operation will be described more specifically. When the movie player 300 has reproduced a play list of play list number "PL1," event playListEnd occurs. When event playListEnd occurs, event handler onPlayListEnd that the script program has is executed. Event handler onPlayListEnd designates the reproduction of a play list of play list number "PL2." The movie player 300 receives event handler onPlayListEnd and reproduces the play list of play list number "PL2," which has been designated.

Thus, the reproduction path temporarily changes from the end of the play list of play list number "PL1" to event handler onPlayListEnd and then to the beginning of the play list of play list number "PL2."

When a menu is displayed at a branch point of a multiple story, a command that reproduces a play list that displays a menu screen with a branch point at the end may be described in event handler onPlayListEnd corresponding to event playListEnd.

Figure 37:
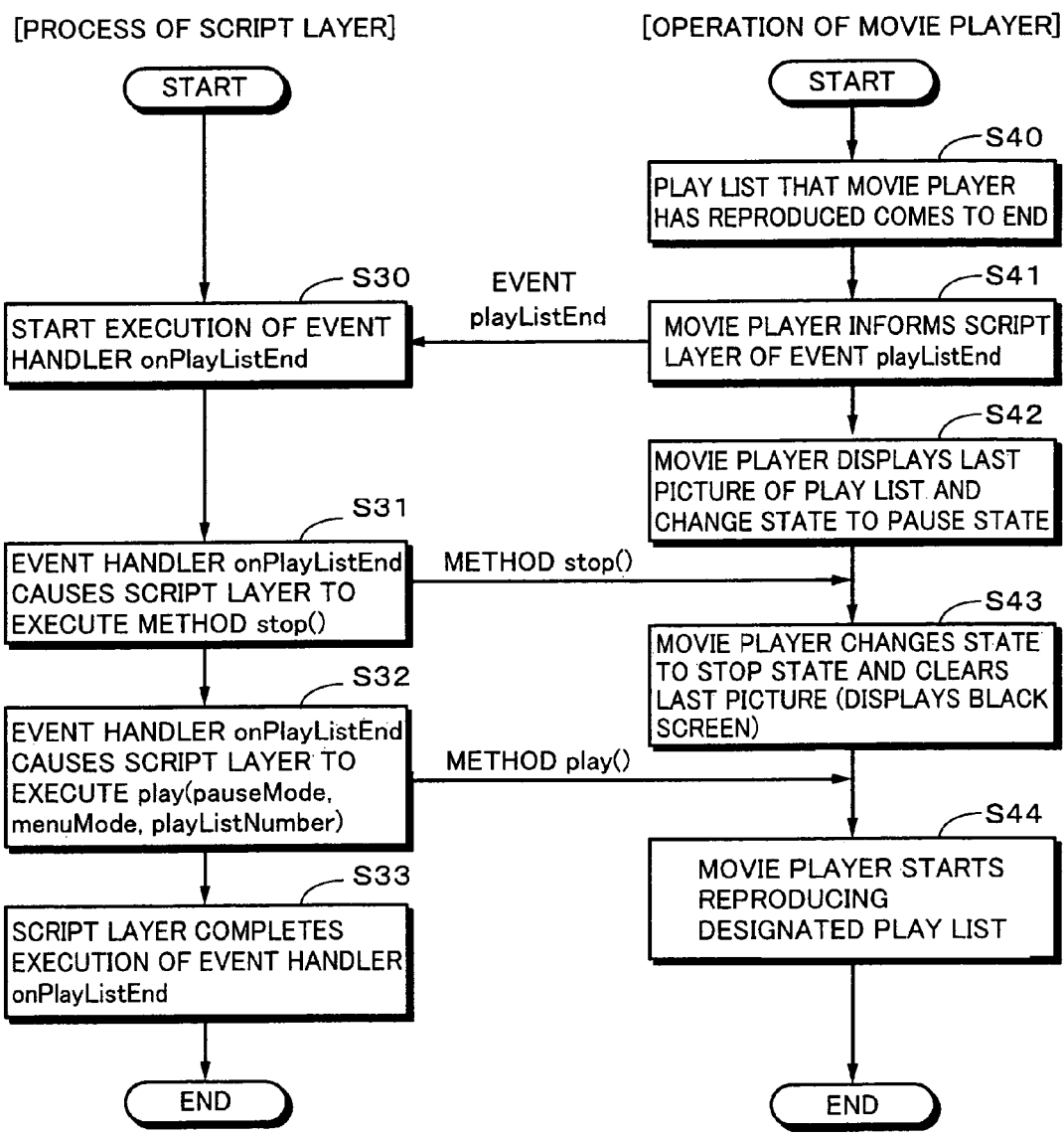
FIG. 37 is a flow chart showing a process in a script layer at the end of a play list and an example of an operation of the movie player.

FIG. 37 shows a flow of a process of the script layer 302 at the end of a play list and an example of the operation of the movie player 300 in detail. In FIG. 37, step S30 to step S33 represent a process on the script layer 302 side, whereas step S40 to step S44 represent a process on the movie player 300 side.

After a play list that the movie player 300 is reproducing comes to the end, to reproduce the next play list, the script program needs to explicitly issue a corresponding command. Since the reproduction order of play lists is decided by the script program, the movie player 300 side is incapable of autonomously deciding a play list to be reproduced next.

When a play list that the movie player 300 is reproducing comes to the end (at step S40), the movie player 300 informs the script layer 302 of event playListEnd (at step S41). The movie player 300 continues to display the last picture of the play list that came to the end and changes the existing state to the pause state (at step S42).

When the script layer 302 receives event playListEnd, the script layer 302 executes event handler onPlayListEnd (at step S30). The operation that the movie player 300 performs next depends on the description of the script program in event handler onPlayListEnd.

After step S40, even if the movie player 300 that pauses receives a method or the control command 311 that cancels the pause state or that causes the movie player 300 to start reproduction in the forward direction, the movie player 300 ignores the method or the control command 311. The methods that cause the movie player 300 to start reproduction in the forward direction are method play( ) and method playStep( ) that have an argument that designates the forward reproduction. The control command 311 that causes the movie player 300 to start reproduction in the forward direction includes command uo_play( ), command uo_playNexChapter( ), command uo_forwardScan( ), command uo_playStep( ), command uo_pauseOn( ), and command uo_pauseOff( ). The movie player 300 ignores these commands when it pauses at the end of a play list.

When the movie player 300 pauses at the end of a play list, method stop( ) and method resume( ) are valid. The mode change is valid when the movie player 300 pauses at the end of a play list.

After event playListEnd occurs, the movie player 300 that operates in the normal mode can accept other than the control command 311 that causes the movie player 300 to start reproduction in the forward direction. In this case, when the script program executes the method 313 for the movie player 300, it operates according to the method 313.

In the example shown in FIG. 37, event handler onPlayListEnd causes the script layer 302 to execute method stop( ) (at step S31). When the script layer 302 executes method stop( ), the movie player 300 cancels the operation caused by the method 311 and changes the existing state to the stop state (at step S43). In the stop state, the movie player 300 clears the last picture of the play list that the movie player 300 has reproduced and displays a block screen.

Event handler onPlayListEnd causes the script layer 302 to execute the method 313 that causes the movie player 300 to reproduce the next play list (at step S32). For example, in method play( ), value "x1" as argument pauseMode, value "Menu" as argument menuMode, and a play list number to be reproduced next as argument playListNumber are designated, respectively. These values cause the movie player 300 to change the existing mode to the menu mode and to reproduce a play list of play list number designated by argument playListNumber at the normal. Thereafter, the script layer 302 completes event handler onPlayListEnd (at step S33). The movie player 300 side changes the existing mode to another mode according to method play( ) designated at step S32. In addition, the movie player 300 reproduces the designated play list at the designated speed (at step S44).

The content creator needs to author (describe) the next operation that the movie player 300 that has reproduced one play list performs in event handler onPlayListEnd for improvement of user's operability so that after the movie player 300 has reproduced the play list, the movie player 300 changes the existing state to the stop state, reproduces the next play list with method play( ), or displays the menu screen.

8-4. Reproduction Resume Function of Movie Player

Figure 38:
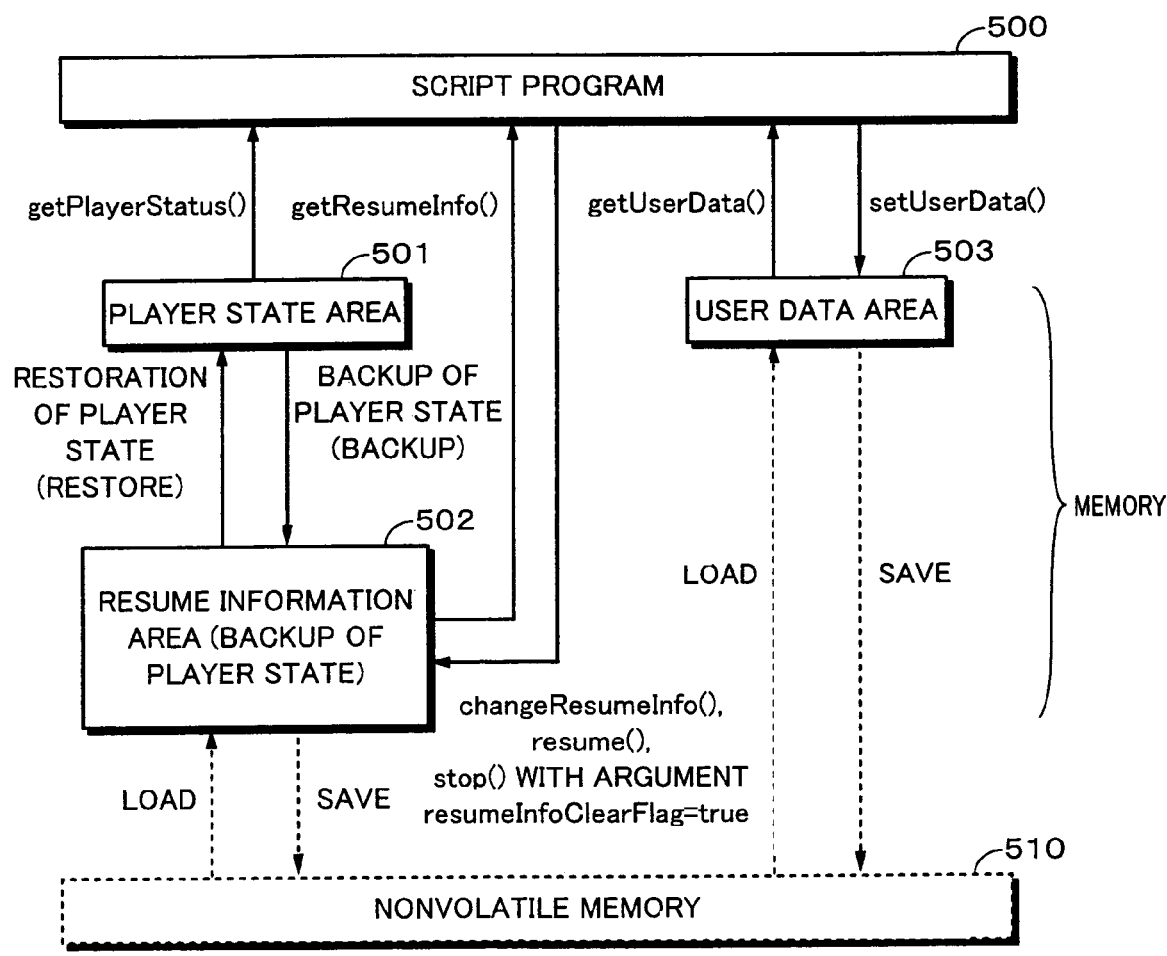
FIG. 38 is a schematic diagram describing three types of memory areas that the UMD video player has.

Next, state changes and reproduction resume function of the movie player 300 will be described. First, with reference to FIG. 38, three types of memory areas that the UMD video player has will be described. In the UMD video player model, a player state area 501, a resume information area 502, and a user data area 503 are defined as three types of essential memory areas. These three types of memory areas 501, 502, and 503 are formed in for example the memory 113. Instead, these memory areas 501, 502, and 503 may be formed in the RAM, which is a work memory of the CPU 112.

The player state area 501 is a memory area that stores information that represents the reproduction state of the movie player 300. In other words, the player state area 501 stores the player state 323B shown in FIG. 3. The contents of the player state area 501 can be read from a script program 500 with method getPlayerStatus( ).

The resume information area 502 is a memory area that temporarily backs up part of information held in the player state area 501. In other words, information of part of the player state area 501 is stored as the resume information 324 shown in FIG. 3 in the resume information area 502. Part of information of the player state area 501, which is backed up in the resume information area 502, is restored to the player state area 501 when necessary. The backup and restoration of information are performed by the native implementation platform 301. Information stored in the resume information area 502 is used for a resume reproduction function that starts reproduction from the previous reproduction stop position.

The script program 500 can read the contents of the resume information area 502 with method getResumeInfo( ). The script program 500 can change a parameter with respect to a stream in the resume information 324 stored in the resume information area 502 with method changeResumeInfo( ).

Information stored in the resume information area 502 is saved to a nonvolatile memory 510 by the native implementation platform 301 when necessary. Likewise, information saved from the resume information area 502 to the nonvolatile memory 510 is loaded from the nonvolatile memory 510 by the native implementation platform 301 and stored in the resume information area 502 when necessary.

The backup of information from the player state area 501 to the resume information area 502 and the restoration of information from the resume information area 502 to the player state area 501 are processes that the movie player 300 automatically performs as it changes the existing state to a predetermined state with predetermined methods.

The user data area 503 is an area that stores information that depends on a content. The content creator can freely use the user data area 503. The user data area 503 can be freely used for such as the history of a reproduction path of a play list of the movie player 300 and correct and incorrect answers corresponding to a content.

The script program 500 can save data to the user data area 503 with method setUserData( ). The script program 500 can read the contents of the user data area 503 with method getUserData( ). The native implementation platform 301 saves information stored in the user data area 503 to the nonvolatile memory 510 when necessary. Likewise, the native implementation platform 301 loads information from the nonvolatile memory 510 and stores the information to the user data area 503 when necessary.

Next, the UMD video player model that accomplishes the reproduction resume function according to an embodiment of the present invention will be described.

First, the resume operation will be described in brief. The operation that resumes the reproduction state with information backed up in the resume information area 502 is referred to as the resume operation. The resume operation is performed with method resume( ).

More specifically, the player state 323B is backed up from the player state area 501 in the resume information area 502 and the reproduction state is resumed with the resume information 324 backed up in the resume information area 502 according to method resume( ). The player state 323B is composed of the state of the movie player 300, namely the number of the play list and the number of the chapter that the movie player 300 is currently reproducing, the selected stream number, and so forth.

The operation of the movie player 300 to which method resume( ) is issued depends on whether the resume information 324 is stored in the resume information area 502. When the resume information 324 is stored in the resume information area 502, the resume information 324 is restored as the player state 323B to the player state area 501. At this point, the resume information 324 stored in the resume information area 502 is discarded.

When a reproduction stream is changed on a menu called during the reproduction of a content, method changeResumeInfo( ) is used. After the resume information 324 stored in the resume information area 502 is changed to designated information with method changeResumeInfo( ), when the resume operation is performed with method resume( ), the existing reproduction stream can be changed to the designated reproduction stream and the reproduction of the designated reproduction stream can be started.

When method resume( ) is executed, the movie player 300 can perform the resume operation. Instead, when the resume information 324 is obtained with method getResumeInfo( ) and method play( ) with an argument designated is executed, the resume operation may be accomplished.

Figure 39:
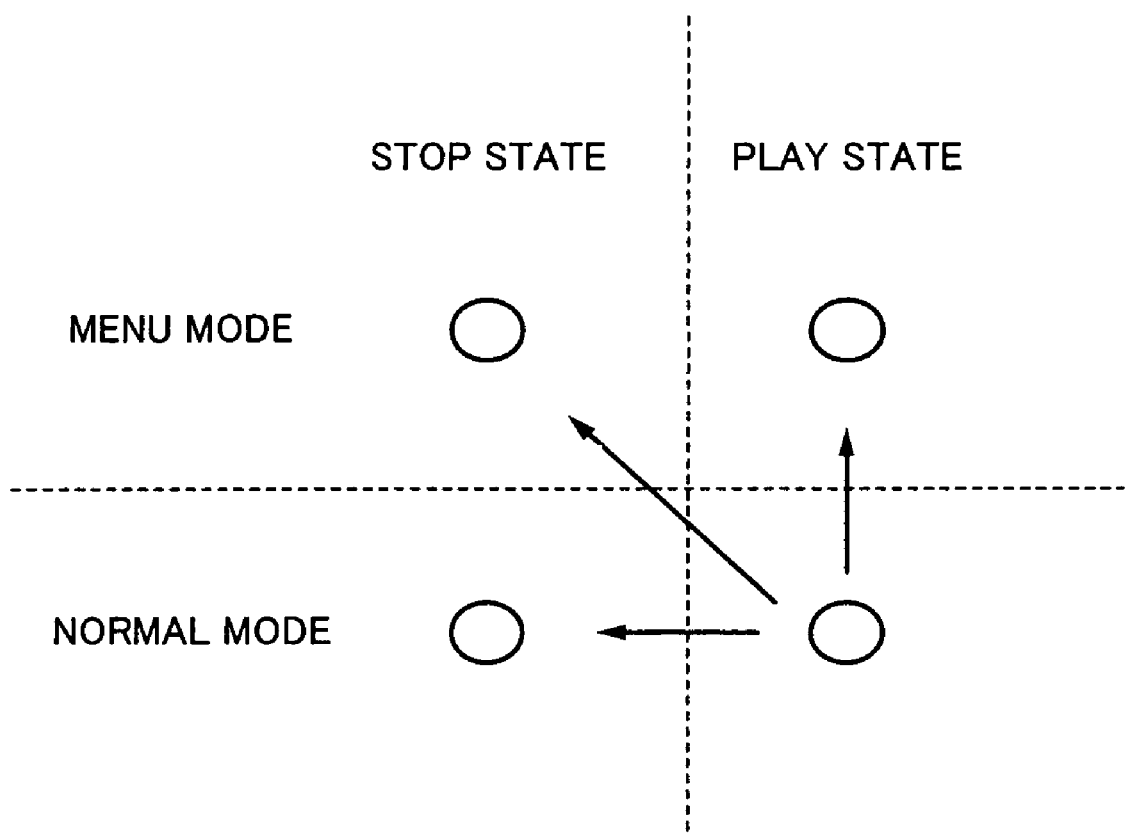
FIG. 39 is a schematic diagram describing backups of player states.

Next, the backup of the player state 323B to the resume information area 502 will be described with reference to FIG. 39 and FIG. 40. FIG. 39 shows a state change of which the player state 323B stored in the player state area 501 is backed up to the resume information area 502 in the four state changes defined in the movie player 300. FIG. 40 shows conditions of which the player state 323B is backed up to the resume information area 502.

When the movie player 300 that is reproducing a play list in the normal mode and the play state (State{Normal, play}) changes the existing state to the stop state, the player state 323B stored in the player state area 501 is backed up to the resume information area 502 and stored as the resume information 324. In the stop state, some values of the player state 323B become indefinite.

In addition, when the movie player 300 changes the existing state, State{Normal, play}, to State{Menu, play}, the player state 323B stored in the player state area 501 is also backed up to the resume information area 502.

In contrast, when the movie player 300 that is reproducing a play list in the menu mode changes the existing state to another state, the player state 323B stored in the player state area 501 is not backed up to the resume information area 502.

In other words, the player state 323B is backed up as the resume information 324 to the resume information area 502.
(1) when the existing state of the movie player 300 is State{Normal, Play} and the movie player 300 directly changes the existing state, State{Normal, Play}, to State{Normal, Play} with the execution of method stop( ), or
(2) when the existing state of the movie player 300 is State{Normal, Play} and the movie player 300 changes the existing state, State{Normal, Play} to State{Normal, Stop} or State{Menu, Stop} with the execution of method stop( ). In this case, the value of argument resumeInfoClearFlag of method stop( ) is "false."

It is expected that the player state 323B is backed up to the resume information area 502 so as to store the return position of the main part of a content. For example, when a sequence of operations that reproduce the main part of a content, jump to a moving picture menu, returns to the main part of the content, and reproduces the main part of the content from the reproduction stop position accomplished, it is expected that the resume information 324, which is data of the player state 323 backed up in the resume information area 502, is used.

Thus, while the main part of a content is being reproduced, namely the existing state of the movie player 300 is State{Normal, Play}, the resume information 324 stored in the resume information area 502 has been discarded. When the movie player 300 changes the existing state, State{Normal, Play}, to another state, the player state 323B is backed up as the resume information 324 to the resume information area 502.

Thus, to accomplish the resume reproduction, the player state 323B is backed up to the resume information area 502 and the resume information 324 stored in the resume information area 502 is discarded as the movie player 300 changes the existing state to another state. When the script layer 302 designates method resume( ), if the resume information 324 is stored in the resume information area 502, the resume information 324 is restored as the player state 323B to the player state area 501.

The script layer 302 can load the resume information 324 from the resume information area 502 with method getResumeInfo( ). A parameter with respect to a stream in the resume information 324 stored in the resume information area 502 can be changed with method changeResumeInfo( ).

In addition, with an argument of method stop( ), the resume information 324 stored in the resume information area 502 can be discarded.

Next, with reference to FIG. 41 to FIG. 44, the restoration of the resume information 324 stored in the resume information area 502 to the player state area 501 and the discard thereof will be described. The resume information 324 stored as a return position of the main part of a content is discarded after the movie player 300 returns to the main part reproduction state, namely State{Normal, Play}. At this point, there are two cases. In the first case, the resume information 324 is restored as the player state 323B to the player state area 501 and then discarded. In the second case, the resume information 324 is discarded, not restored.

In other words, in this model, when the movie player 300 returns to State{Normal, Play}, the resume information 324 stored in the resume information area 502 is discarded. At this point, when the movie player 300 and so forth satisfy predetermined conditions, the resume information 324 stored in the resume information area 502 is restored to the player state area 501 and then discarded. When the resume information 324 is restored to the player state area 501, the reproduction is started from the position designated by the resume information 324. This operation is the resume reproduction.

Figure 41:
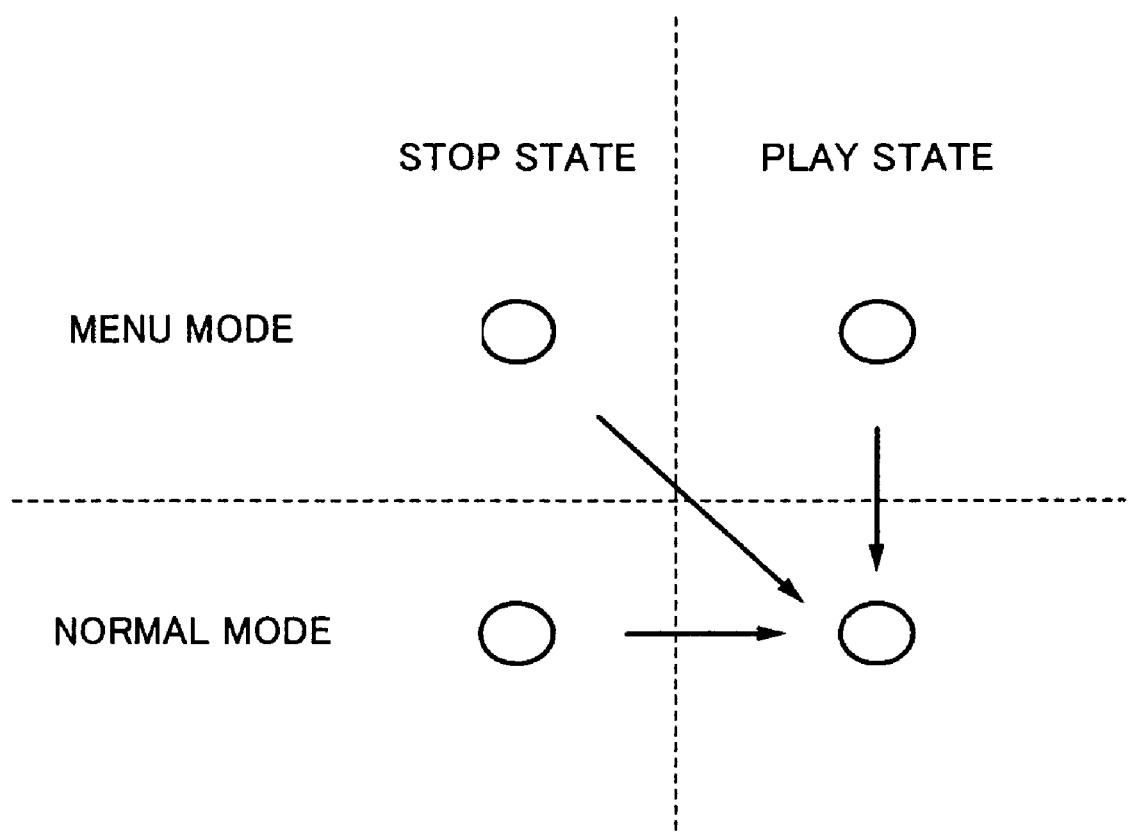
FIG. 41 is a schematic diagram describing restoration and discard of resume information.

FIG. 41 shows a state change of which the resume information 324 is restored to the player state area 501 and then discarded in the four state changes defined in the movie player 300.

When the following three conditions (1) to (3) are satisfied, the resume information 324 is restored and then discarded:
(1) when the existing state of the movie player 300 is State{Menu, Stop}, State{Normal, Stop}, or State{Menu, Play},
(2) when the resume information 324 is stored in the resume information area 502, and
(3) when the movie player 300 changes the existing state to State{Normal, Play} with the execution of method resume( ).

FIG. 42 is a table of these conditions. When the existing state of the movie player 300 is State{Normal, Play}, since the resume information 324 is not stored, the operation in this state is not defined in FIG. 42.

When the resume information 324 is stored in the resume information area 502, if method resume( ) is executed, the movie player 300 changes the existing state to State{Normal, Play}. When the resume information 324 is not stored in the resume information area 502, if method resume( ) is executed, the movie player 300 does not change the existing state to another state. At this point, the movie player 300 remains in State{Mode, State} that occurred immediately before method resume( ) was executed and the player state 323B is not changed.

In contrast, when the following three conditions (4) to (6) are satisfied, the resume information 324 is not restored, but discarded:
(4) when the existing state of the movie player 300 is State{Menu, Stop}, State{Normal, Stop}, or State{Menu, Play},
(5) when the resume information 324 is stored in the resume information area 502, and
(6) when the movie player 300 changes the existing state to State{Normal, Play} with the execution of method play( ).

FIG. 43 is a table of these conditions. When the existing state of the movie player 300 is State{Normal, Play}, since the resume information 324 is not stored in the resume information area 502, the operation in this state is not defined in FIG. 43.

When the resume information 324 is not stored in the resume information area 502, if method play( ) is executed, the movie player 300 changes the existing state to State{Normal, Play}. As a result, the state in which the resume information 324 is not stored in the resume information area 502 remains unchanged.

The resume information 324 stored in the resume information area 502 can be discarded by setting an argument of method stop( ). Specifically, according to this embodiment of the present invention, as an argument of method stop( ), argument resumeInfoClearFlag that designates whether to discard the resume information 324 stored in the resume information area 502 is defined. As shown in FIG. 44, when method stop( ) is executed, if argument resumeInfoClearFlag is designated with value "true," the resume information 324 is discarded.

When the main part of a movie that the movie player 300 reproduces comes to the end and the reproduction of the movie player 300 is stopped, the end position of the main part of the movie is recorded as the resume information 324. Thereafter, when the user operates the movie player 300 to perform the reproduction operation (resume reproduction operation), the movie player 300 jumps to the end of the main part of the movie and pauses. Thus, the operability of the resume reproduction operation in the movie player 300 becomes bad.

To improve the operability of the resume reproduction operation in the movie player 300, it is necessary to provide a section that discards the resume information 324 that is automatically recorded as a characteristic of the model. Since only the movie creator knows the end of the main part of a movie, the script program 500 can designate the discard of the resume information 324 for the movie player 300 with argument resumeInfoClearFlag of method stop( ).

Figure 45:
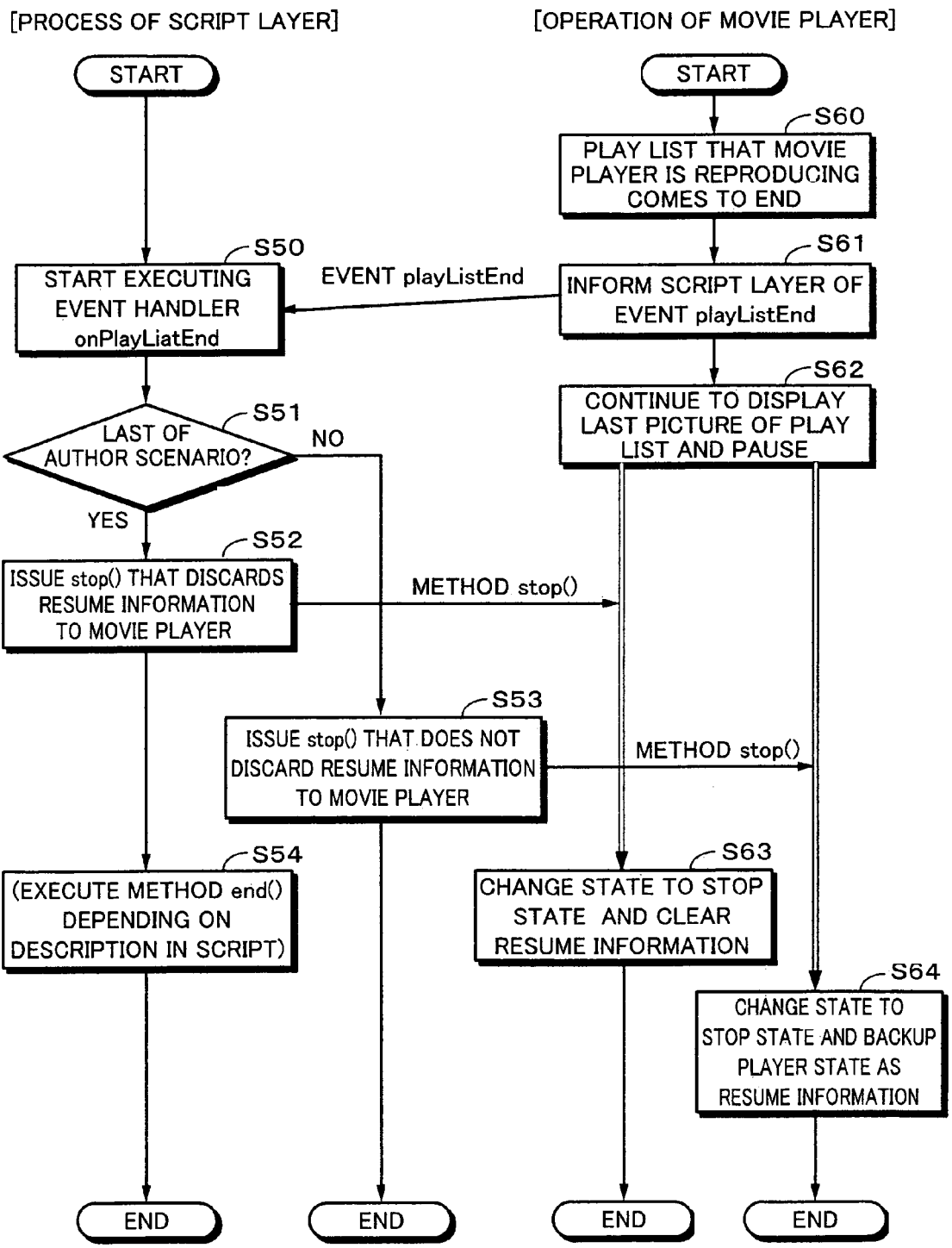
FIG. 45 is a flow chart showing an example of an operation of the UMD video player using argument resumeInfoClearFlag of method stop( )

FIG. 45 shows an example of the operation of the UMD video player when method stop( ) is executed with argument resumeInfoClearFlag. In FIG. 45, step S50 to step S54 show a process on the script layer 302 side, whereas step S60 to step S64 show a process on the movie player 300 side.

When the play list that the movie player 300 is reproducing comes to the end (at step S60), the movie player 300 informs the script layer 302 of event playListEnd (at step S61). The movie player 300 continues to display the last picture of the play list that came to the end at step S60 and pauses (at step S62).

When the script layer 302 receives event playListEnd, the script layer 302 executes event handler onPlayListEnd (at step S50). At step S51, the script layer 302 determines whether the play list corresponding to event playListEnd is the last of the author scenario. In addition, the script layer 302 can determine whether a particular play list is the last play list of a scenario according to for example the script program 500.

When the determined result represents that the play list is not the last play list, the flow advances to step S53. At step S53, the script layer 302 sets argument resumeInfoClearFlag of method stop( ) to value "false" and issues method stop( ) that does not discard the resume information 324 to the movie player 300. When the movie player 300 receives method stop( ), the movie player 300 changes the existing state to the stop state. In addition, the movie player 300 backs up the player state 323B to the resume information area 502 (at step S64).

In contrast, when the determined result at step S51 represents that the play list is the last play list in the scenario, the flow advances to step S52. At step S52, the script layer 302 sets argument resumeInfoClearFlag of method stop( ) to value "True" and informs the movie player 300 of method stop( ) that discards the resume information 324. When the movie player 300 receives method stop( ), the movie player 300 changes the existing state to the stop state. In addition, the movie player 300 discards (clears) the resume information 324 stored in the resume information area 502 (at step S63).

After step S52, the script layer 302 executes method end( ) depending on the description in the script program 500.

8-5. Life Cycles of Individual Data

Next, the life cycles of the player state 323B, the resume information 324, and the user data will be described.

FIG. 46 shows an example of the life cycle of the player state 323B. When the movie player 300 is generated, the player state 323B is also generated. When the movie player 300 is eliminated, the player state 323B is also eliminated. When the movie player 300 is generated, the player state 323B is initialized. When the player state 323B is generated, a property that represents the state of the movie player 300 represents the stop state. The other properties become indefinite. The value of the player state 323B changes according to the change of the reproduction state of the movie player 300. The value of the player state 323B changes when the contents of the resume information area 502 are restored. The player state 323B can be loaded with method getPlayerStatus( ) issued from the script layer 302.

The storage state of the player state 323B depends on the implementation of the movie player 300. As long as the player state 323B can be obtained with method getPlayerStatus( ) issued from the script layer, the player state 323B can be stored in any format.

FIG. 47 shows an example of the line cycle of the resume information 324. When the movie player 300 is generated, a memory area for the resume information 324 is allocated. When the movie player 300 is generated, the resume information 324 is initialized. When the resume information 324 is initialized, the contents of the resume information 324 are discarded. When the movie player 300 is initialized, the UMD video player that accommodates the nonvolatile memory loads the resume information 324 from the nonvolatile memory. At this point, user data are also loaded.

When the movie player 300 changes the existing state, State{Normal, Play}, to another state, the player state 323B is backed up to the resume information area 502.

Parameters videoNumber, audioNumber, audioFlag, subtitleNumber, and subtitleFlag with respect to a stream of the resume information 324 can be changed with method changeResumeInfo( ) issued from the script layer 302.

When the movie player 300 starts reproducing a play list in the normal mode, the contents of the resume information 324 are discarded. At this point, there are two cases. In the first case, before the contents of the resume information 324 are discarded, it is restored to the player state 323B. In the second case, before the contents of the resume information 324 are discarded, it is not restored to the player state 323B. When method stop( ) is executed with argument resumeInfoClearFlag="true," the contents of the resume information 324 are discarded.

When the resume information 324 is stored, it is restored to the player state 323B with method resume( ).

With method getResumeInfo( ), the contents of the resume information 324 can be read from the script layer 302. When the resume information 324 that has been discarded is read, since value "0" is returned as return value playStatus, it can be determined whether the resume information 324 is stored.

When the movie player 300 is completed (eliminated), the resume information 324 is also eliminated. When the movie player 300 is completed (eliminated), the UMD video player that accommodates the nonvolatile memory saves the resume information 324 to the nonvolatile memory. At this point the UMD video player also saves the user data to the nonvolatile memory.

FIG. 48 shows an example of the life cycle of user data. When the movie player 300 is generated, a memory area for user data is allocated. When the movie player 300 is generated, the user data are initialized. When the user data are initialized, the contents of the user data are cleared (with method getUserData( ), an array having a length of "0" is returned). When the movie player 300 is initialized, the UMD video player accommodating the nonvolatile memory loads the user data from the nonvolatile memory. At this point, the UMD video player also loads the resume information from the nonvolatile memory.

When method setUserData( ) is executed, user data are saved to the user data area 503. With method setUserData( ), an integer type array having a data length of 64 bits (maximum) to the user data area 503. Data stored in the user data area 503 can be read with method getUserData( ) issued from the script layer 302. When the user data are not stored, an array having a length of 0 is returned.

The script layer 302 does not have a method that clears the contents of the user data area 503. When the contents of the user data area 503 are overwritten, the contents can be changed.

When the movie player 300 is completed (eliminated), the user data area 503 is also eliminated. When the movie player 300 is completed (eliminated), the UMD video player accommodating the nonvolatile memory saves the data stored in the user data area 503 to the nonvolatile memory. At this point, the UMD video player also saves the resume information 324 to the nonvolatile memory.

9. Process at End of Content

Next, another embodiment of the present invention will be described. According to this embodiment of the present invention, a script program explicitly informs the native implementation platform 301 of an end of a content. When the native implementation platform 301 receives the information, the native implementation platform 301 can accomplish various functions unique to the player after the end of the content.

The content creator intentionally designates an end of a content. Thus, the position of an "end of a content" that the content creator intended is described in only a script program that he or she created. In other words, the end of a play list is not always an end of a content. As with a multi-story content, one content may contain a plurality of ends.

Figure 49:
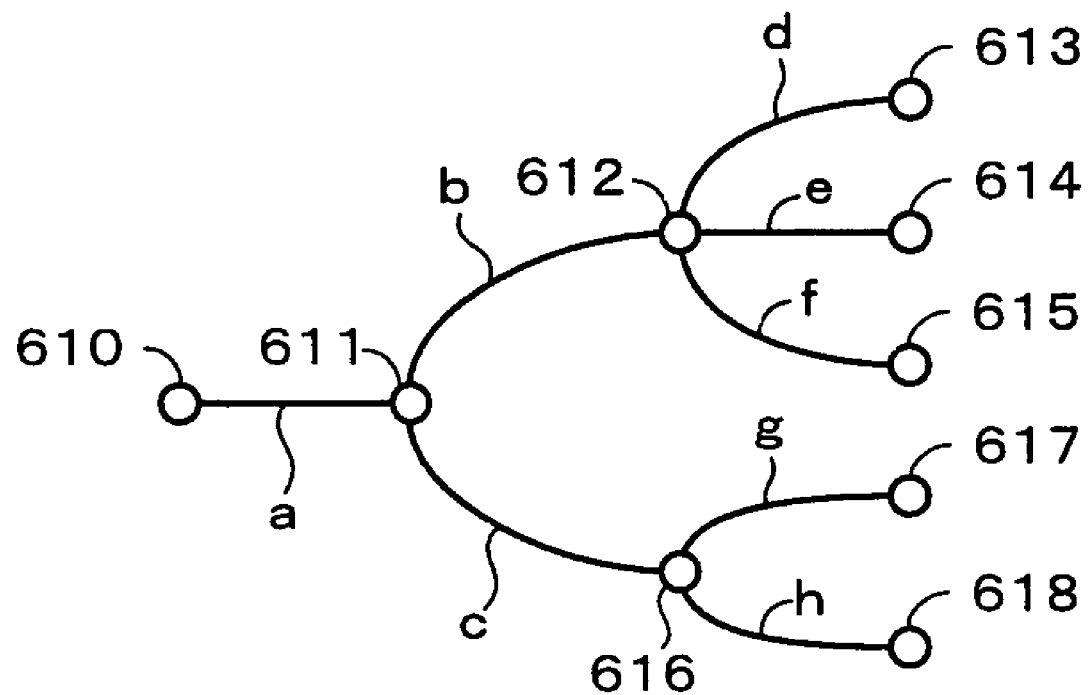
FIG. 49 is a schematic diagram describing that a content may contain a plurality of ends.

Now, a content 600 that has a story structure as shown in FIG. 49 is assumed. The content 600 starts at start point 610. The content 600 is reproduced according to route a composed of at least one play list. When the content comes to branch point 611, one of routes b and c is selected on a predetermined branch menu screen or the like. When route b is selected, one of routes d to f is selected at branch point 612. According to the selected route, the content 600 comes end point 613, 614, or 615. When route c is selected at branch point 611, one of routes g and h is selected at branch point 616. According to the selected route, the content 600 comes to end point 617 or 618.

The content 600, which has such a structure, can have end points 613, 614, 615, 617, and 617. In this case, the content 600 has five "ends of a content." Instead, depending on the structure of a branch menu, branch points 612 and 613 may be designated as "ends of a content." In addition, an "end of a content" may be designated in the middle of a route. When the parental function or the like is used, an "end of a content" may be designated with settings of the player. When the parental function or the like is used, a plurality of "ends of a content" may be designated in a single story content, which does not have story branches.

On the other hand, the script program determines the last position of a content according to the stop position of the movie player 300 and the history thereof. Now, method end( ) that allows the script program to inform the controller object 330 of an "end of a content" is described in the script program so that it executes the method at a position that the program creator desires. Thus, the script program can explicitly inform the native implementation platform 301 of an "end of a content."

For example, in a script program, method end( ) can be described in an event handler corresponding to the event 312 received from the movie player 300 as a play list is reproduced at the end of the content.

Figure 50:
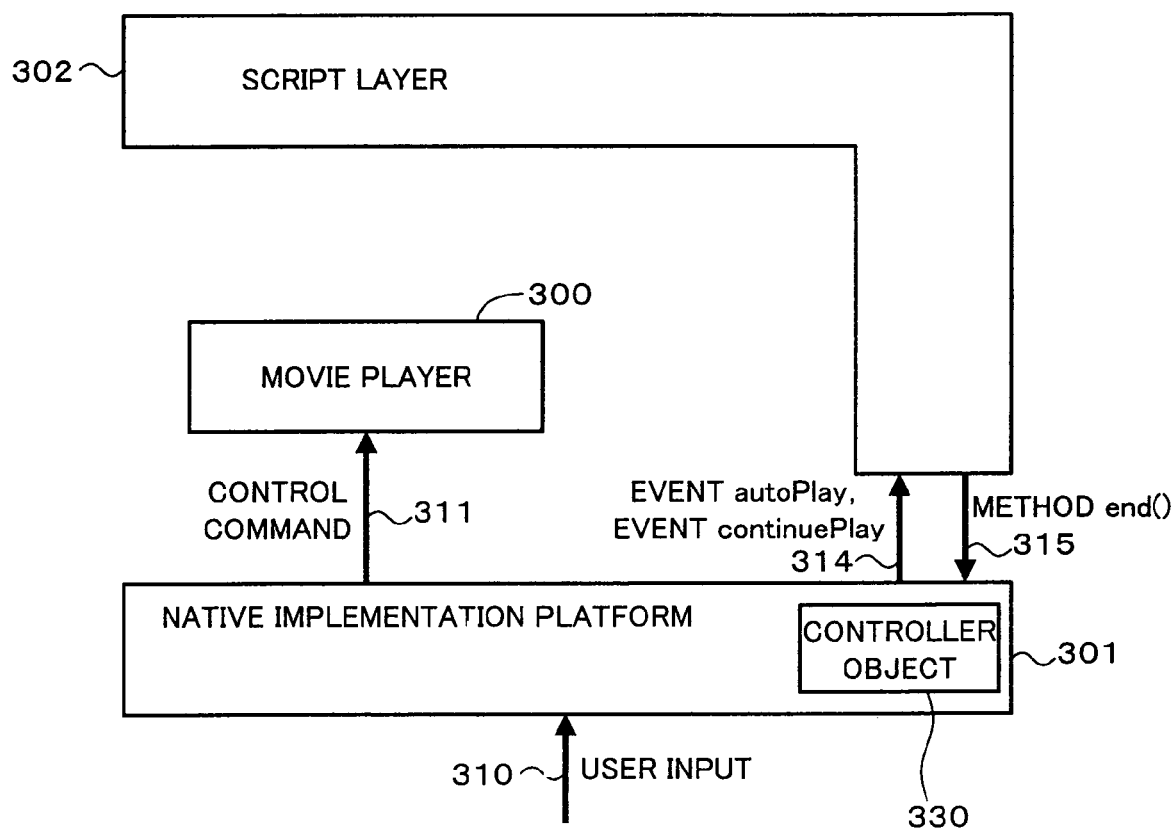
FIG. 50 is a schematic diagram showing sections that execute method end( ) of the player model shown in FIG. 2.

FIG. 50 shows sections that relate to the execution of method end( ) in the player model shown in FIG. 2. As shown in FIG. 50, method end( ) is a method 315 of which the script layer 302 informs the native implementation platform 301 that contains the controller object 330. When the controller object 330 receives method end( ), the controller object 330 can start the operation of a player's unique function.

FIG. 51 shows an example of specifications of method end( ). Method end( ) is a method of the controller object 330 (Controller, end( )) and has no attribute. When method end( ) is executed, a value of Boolean type is returned. The return value of method end( ) represents whether the UMD video player completes the operation for a content without a player's unique operation. When the return value of method end( ) is "true," it represents that the UMD video player does not execute a player's unique function after the execution of an event handler. In contrast, when the return value of method end( ) is "false," it represents that the UMD video player executes a player's unique function after the execution of an event handler.

The script program informs the native implementation platform 301 of an end of the content with method end( ). In addition, since the script program obtains the return value of method end( ) from the native implementation platform 301, the'script program can know whether a player's unique function is performed and perform the next operation.

When the return value of method end( ) is "false" and the script program has determined that a player's unique function is performed, the script program can suppress the execution of another method so that it does not prevent the operation of the player's unique function. In contrast, when the return value of method end( ) is "true" and the script program has determined that a player's unique function is not performed, the script program can call a menu screen so that user's operability is improved.

Next, a specific example of the operation using method end( ) will be described. First, an example of which a disc repeat function is accomplished using method end( ) will be described. The disc repeat function is a function that automatically starts reproduction of a content from the beginning after it comes to the end.

Figure 52:
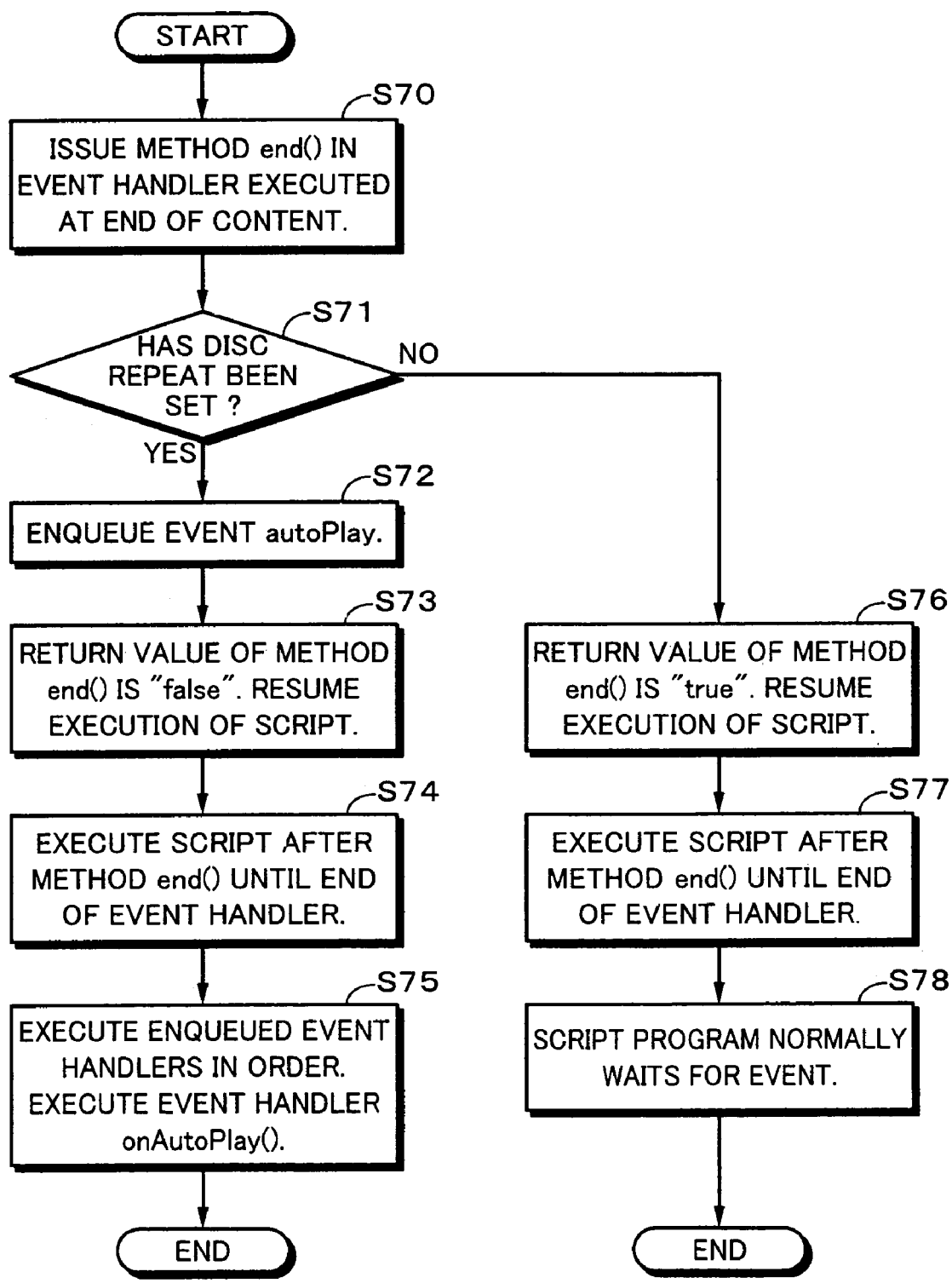
FIG. 52 is a flow chart showing an example of a process that performs a disc repeat function with method end( )

FIG. 52 is a flow chart showing an example of a process that performs the disc repeat function using method end( ). Before the execution of the flow chart, the content creator describes method end( ) in the script program to designate his or her desired position as an end of a content. When the content is reproduced and it comes to the position designated as the end, in the script program, an event handler executed at the end of the content issues method end( ) (at step S70).

Method end( ) is supplied to the native implementation platform 301. When the native implementation platform 301 receives method end( ), the native implementation platform 301 determines whether the disc repeat function has been set to the UMD video player (at step S71). For example, the disc repeat function is set to the native implementation platform 301 and written to the read-only memory 323A (not shown in FIG. 7A).

When the determined result represents that the disc repeat function has been set, the flow advances to step S72. At step S72, the native implementation platform 301 issues event autoplay to the script layer 302. At this point, since method end( ) has not been complete, event autoplay is enqueued (at step S72). Since the disc repeat function has been set, the return value of method end( ) at step S70 is "false" (at step S73).

The script layer 302 executes the script program after method end( ) to the end of an event handler executed at the end of the content (at step S74). Events that were enqueued earlier than event autoPlay are executed. Thereafter, event handler onAutoPlay corresponding to event autoplay is executed (at step S75). As described with reference to FIG. 12 and FIG. 14, event handler onAutoPlay is an event handler corresponding to event autoPlay that causes the script program to be automatically executed when the disc is loaded into the player. Event handler onAutoPlay is executed when data of the disc are reproduced from the beginning. When event handler onAutoPlay is called, the content is reproduced from the beginning.

On the other hand, when the disc repeat function has not been set at step S71 and the UMD video player completes the operation without any special operation, the flow advances to step S76. At step S76, method end( ) returns value "true" as the return value. At this point, the script program is executed after method end( ) until the end of the event handler (at step S77). The next operation of the UMD video player depends on the script program. When the script program does not describe any code after method end( ), the UMD video player becomes a standby state, waiting for an event (at step S78). For example, the UMD video player displays a black screen and waits for an event. Instead, the UMD video player may display a menu screen depending on the description of the script program. At steps S77 and S78, the native implementation platform 301 does not perform any process.

In the example of which the disc repeat function is accomplished with method end( ), if the disc repeat function has not been set to the player, the return value of method end( ) is "true." After an event handler that contains method end( ) has been executed, the UMD video player becomes a standby state, waiting for an event.

At this point, if the movie player 300 has reproduced a play list and has stopped the operation, the movie player 300 may display no data (namely, a black screen). When the script program waits for an event and a user's operation, if the black screen appears, the user may think that the player stops the operation. Since no guide appears on the display screen, the user will get confused about what to do the next. In other words, it can be said that this situation results from lacking of consideration for the user.

This situation may take place when the content creator does not provide a script program that navigates the user so that the menu screen appears after the completion of the reproduction of a content.

To prevent such an operation, which is strange or unhelpful to the user, method end( ) can be used.

Figure 53:
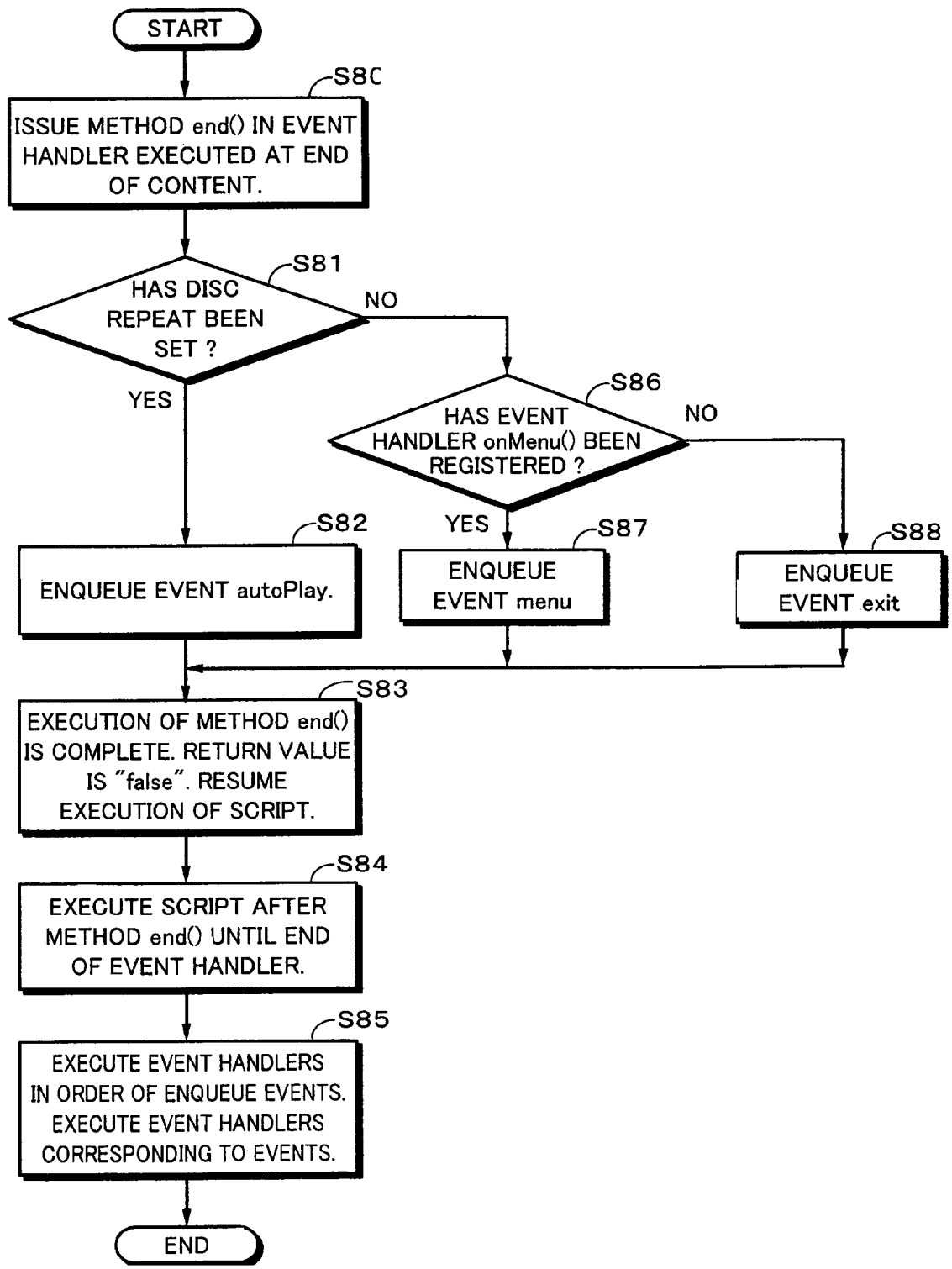
FIG. 53 is a flow chart showing an example of a process that executes a player's unique function at an end of a content with method end( ).

Next, an example of which a player's unique function is executed at an end of a content using method end( ), which prevents such an operation from taking place, will be described with reference to a flow chart shown in FIG. 53.

Before the execution of the flow chart, the content creator has described method end( ) in a script program to designate his or her desired position as an end of a content. When the content has been reproduced and it comes to the end, the script program issues method end( ) in an event handler executed at the end of the content (at step S80).

Method end( ) is supplied to the native implementation platform 301. When the native implementation platform 301 receives method end( ), the native implementation platform 301 references for example the read-only memory 323A and determines whether the disc repeat function has been set to the UMD video player (at step S81).

When the determined result represents that the disc repeat function has been set, the flow advances to step S82. At step S82, the native implementation platform 301 issues event autoPlay to the script layer 302. The script layer 302 enqueues event autoPlay. Thereafter, the flow advances to step S83.

In contrast, when the determined result at step S81 represents that the disc repeat function has not been set, the flow advances to step S86. At step S86, the native implementation platform 301 determines whether event handler onMenu has been registered to the script program. When the content creator has described event handler onMenu in the script program and when the script program is initially executed, event handler onMenu is registered to the interpreter that executes the script program. When event handler onMenu has been registered it can be executed. In this case, the flow advances to step S87. At step S87, event menu corresponding to event handler onMenu is enqueued. Thereafter, the flow returns to step S83.

In contrast, when the determined result at step S86 represents that event handler onMenu( ) has not been registered, the flow advances to step S88. When event handler onMenu has not been registered, the disc repeat function has not been set. In addition, there is no event handler that causes the UMD video player to display a menu. In this case, a process that causes the UMD video player to complete the operation and causes the native implementation platform 301 to display a menu is performed. In other words, the flow advances to step S88. At step S88, the native implementation platform 301 enqueues event exit. As described with reference to FIG. 12, event exit is an event that causes the UMD video player to complete the operation. Thereafter, the flow advances to step S83.

As described at step S82, step S87, and step S88, in this example, when method end( ) is issued, the native implementation platform 301 enqueues one of event autoPlay (at step S82), event menu (at step S87), and event exit (at step S88). With one of these events, the UMD video player executes a player's unique function after the execution of the event handler. Thus, only value "false" is returned as the return value of method end( ) (at step S83). Thereafter, the execution of the script program is resumed.

At step S83, the execution of method( ) is complete. After the return value has been obtained, the script program is executed. When the script program comes to the end of an event handler that contains method end( ) (at step S84), enqueued events are executed in the order (at step S85).

When event autoplay was enqueued at step S82, event handler onAutoPlay is executed at step S85. Event handler onAutoPlay causes the UMD video player to reproduce the content from the beginning.

When event menu was enqueued at step S87, event handler onMenu is executed at step S85. In many cases, however, depending on the intention of the content creator, it is expected that event handler onMenu contains a code that causes the UMD video player to display a menu screen. Thus, in many cases, the menu screen is displayed.

When event exist was enqueued at step S88, event handler onExit is executed at step S85. Event handler onExit causes the UMD video player to complete the operation. After the UMD video player completes the operation, control is transferred to for example a player's unique system menu with which the player can be set for its hardware.

As described above, according to this embodiment, method end( ), which causes the script layer 302 to inform the native implementation platform 301 of an end of a content, is defined. An operation of the player to be performed at an end of a content can be designated according to for example a setting of the player of whether the disc repeat function has been set and the state of the content of whether a menu screen is provided. Thus, an improper situation for example appearance of a black screen, which results from lack of the consideration for the user, can be prevented from taking place. In addition, a user-friendly interface can be provided.

When the content creator only describes method end( ) at a portion that he or she wants to designate as an end of a content, the player automatically performs a proper process without need to provide a complicated program. Thus, a lot of time and effort to create the content can be saved.

The foregoing embodiments of the present invention are applied to the disc reproduction apparatus 100 that processes both an audio stream and a video stream. Instead, these embodiments of the present invention may be applied to the disc reproduction apparatus 100 that reproduce either an audio stream or a video stream.

In the foregoing embodiments of the present invention, as the record medium for content data, a disc-shaped record medium is described. Instead, as the record medium for content data, a semiconductor memory may be used.

In the foregoing embodiments of the present invention, the disc reproduction apparatus 100 is composed of dedicated hardware. Instead, the structure of the disc reproduction apparatus 100 except for the disc drive may be accomplished by software that runs on a computer device. In this case, the software that accomplishes the disc reproduction apparatus 100 may be provided by a record medium such as a Compact Disc-Read Only Memory (CD-ROM) or a Digital Versatile Disc-ROM (DVD-ROM). In this case, the record medium for software that accomplishes the disc reproduction apparatus 100 is loaded into the disc drive of the computer device and the software recorded on the record medium is installed to the computer device. When the disc drive device according to the UMD is connected to the computer device, the same structure as the disc reproduction apparatus 100 according to the foregoing embodiments of the present invention can be accomplished. The software may be recorded on a record medium for a UMD video content.

It should be understood by those skilled in the art that various modifications, combinations, sub-combinations and alternations may occur depending on design requirements and other factors insofar as they are within the scope of the appended claims or the equivalents thereof.

What is claimed is:

1. A reproduction apparatus that reproduces content data recorded on a recording medium, comprising:
   player means;
   read means for reading data from the recording medium on which the content data containing at least one of a video data stream and an audio data stream and a reproduction control program controlling the reproduction of the content data are recorded;
   input means for accepting an input from a user;

output means for outputting the content data that are reproduced;
content reproduction means for reproducing the content data according to the reproduction control program; and
interface means for interfacing among the content reproduction means, the reproduction control program, and the player means,
the reproduction control program including a command, executed at a predetermined execution point of a process flow of the reproduction control program, that distinguishes an end of a playlist, from a plurality of ends corresponding to a plurality of playlists included within the content data, from an end point of the content data as an end of the content data that are reproduced, the reproduction control program supplying the command to the interface means upon reproduction of the end of the playlist distinguished as the end of the content data,
the interface means executing an automatic display of a menu in accordance with the command,
the input means accepting user input indicating a selection of another playlist from the plurality of playlists, the selected another playlist included in the displayed menu, and
content associated with the selected another playlist being reproduced.

2. The reproduction apparatus as set forth in claim 1, wherein the command is described at a plurality of positions of the content data to designate them as a plurality of ends of the content data.

3. The reproduction apparatus as set forth in claim 1, wherein the interface means causes the player means to execute a unique function of the player means according to the command.

4. The reproduction apparatus as set forth in claim 3, wherein the unique function is a disc repeat function.

5. A reproduction method of reproducing content data from a recording record medium, comprising:
reproducing the content data from the recording medium according to a reproduction control program that is read from the recording medium on which the content data containing at least one of a video data stream and an audio data stream and the reproduction control program controlling the reproduction of the content data are recorded;
interfacing among the content reproduction step, the reproduction control program, and player means having read means for reading data from the recording medium, input means for accepting an input from a user, and output means for outputting the content data that are reproduced;
executing a command included in the reproduction control program at a predetermined execution point of a process flow of the reproduction control program that distinguishes an end of a playlist, from a plurality of ends corresponding to a plurality of playlists included within the content data, from an end point of the content data as an end of the content data that are reproduced, the reproduction control program supplying the command to the interface step upon reproduction of the end of the playlist distinguished as the end of the content data;
executing an automatic display of a menu in accordance with the command;
receiving user input indicating a selection of another playlist from the plurality of playlists, the selected another playlist included in the displayed menu; and
reproducing content associated with the selected another playlist.

6. A non-transitory computer readable storage medium having instructions stored therein as a reproduction program which, when executed by a processor, causes the processor to execute a reproduction method of reproducing content data from the recording medium, the reproduction method comprising:
reproducing the content data from the recording medium according to a reproduction control program that is read from the recording medium on which the content data containing at least one of a video data stream and an audio data stream and the reproduction control program controlling the reproduction of the content data are recorded;
interfacing among the content reproduction step, the reproduction control program, and player means having read means for reading data from the recording medium, input means for accepting an input from a user, and output means for outputting the content data that are reproduced;
executing a command included in the reproduction control program at a predetermined execution point of a process flow of the reproduction control program that distinguishes an end of a playlist, from a plurality of ends corresponding to a plurality of playlists included within the content data, from an end point of the content data as an end of the content data that are reproduced, the reproduction control program supplying the command to the interface step upon reproduction of the end of the playlist distinguished as the end of the content data
executing an automatic display of a menu in accordance with the command;
receiving user input indicating a selection of another playlist from the plurality of playlists, the selected another playlist included in the displayed menu; and
reproducing content associated with the selected another playlist.

7. A non-transitory computer readable recording medium having stored therein content data containing at least one of a video stream and an audio stream and a reproduction control program controlling the reproduction of the content data, which, when executed by a processor, causes the processor to execute a method comprising:
reproducing the reproduction control program and the content data according to the reproduction control program;
interfacing with player means having read means for reading data from the recording medium, input means for accepting an input from a user, and output means for outputting the content data that are reproduced;
receiving, from the reproduction control program, a command, executed at a predetermined execution point of a process flow of the reproduction control program, that distinguishes an end of a playlist, from a plurality of ends corresponding to a plurality of playlists included within the content data, from an end point of the content data as an end of the reproduced content data;
executing an automatic display of a menu in accordance with the command;
receiving user input indicating a selection of another playlist from the plurality of playlists, the selected another playlist included in the displayed menu; and
reproducing content associated with the selected another playlist.

8. The non-transitory computer readable recording medium according to claim 7,
wherein the command is described at a plurality of positions of the content data to designate them as a plurality of ends of the content data.

9. A reproduction apparatus that reproduces content data recorded on a recording medium, the apparatus comprising:
- a player section;
- a read section configured to read data from the recording medium on which the content data containing at least one of a video data stream and an audio data stream and a reproduction control program controlling the reproduction of the content data are recorded,
- an input section configured to accept an input from a user;
- an output section configured to output the content data that are reproduced;
- a content reproduction section configured to reproduce the content data according to the reproduction control program; and
- an interface section configured to interface among the content reproduction section, the reproduction control program, and the player section,
- the reproduction control program including a command, executed at a predetermined execution point of a process flow of the reproduction control program that distinguishes an end of a playlist, from a plurality of ends corresponding to a plurality of playlists included within the content data, from an end point of the content data as an end of the content data that are reproduced, the reproduction control program supplying the command to the interface step upon reproduction of the end of the playlist distinguished as the end of the content data,
- the interface section executing an automatic display of a menu in accordance with the command,
- the input section accepting user input indicating a selection of another playlist from the plurality of playlists, the selected another playlist included in the displayed menu, and
- content associated with the selected another playlist being reproduced.

* * * * *